US012792619B2

(12) United States Patent
Elsayyad et al.

(10) Patent No.: US 12,792,619 B2
(45) Date of Patent: Nov. 10, 2026

(54) MACHINE LEARNING-BASED ALGORITHMS FOR IMPROVED GENERATION OF A SEARCH RESPONSE

(71) Applicant: RISE HEALTHCARE TECH, INC., Pleasanton, CA (US)

(72) Inventors: Ahmed Elsayyad, Miami, FL (US); Andrii Martynyshyn, Lviv (UA); Carlyle Braganza, North York (CA); Chase Feiger, Austin, TX (US); Daniel Vorhaus, Green Cove Springs, FL (US); Danielle Hay, Encino, CA (US); David Opdahl, Glenside, PA (US); Georg Peters, Denville, NJ (US); Gurjeev Singh, New York, NY (US); Keith Badinelli, Beaverton, OR (US); Mark Bidewell, Telford, PA (US); Matthew Bedan, Tampa, FL (US); Michael Reppy, Wilmington, DE (US); Raymond Gilbert, Lansdale, PA (US); Vasyl Matiiash, Cracow (PL); Volodymyr Horbenko, Nepean (CA)

( * ) Notice: Subject to any disclaimer, the term of this patent is extended or adjusted under 35 U.S.C. 154(b) by 0 days.

(21) Appl. No.: 19/445,283

(22) Filed: Jan. 9, 2026

(65) Prior Publication Data

US 2026/0203328 A1 Jul. 16, 2026

Related U.S. Application Data

(60) Provisional application No. 63/744,064, filed on Jan. 10, 2025.

(51) Int. Cl.

*G06F 16/00* (2019.01)
*G06F 16/2457* (2019.01)

(Continued)

(52) U.S. Cl.

CPC ...... *G06F 16/24578* (2019.01); *G06F 16/334* (2019.01); *G06F 16/335* (2019.01);

(Continued)

(58) Field of Classification Search

CPC .... G06F 16/334; G06F 16/338; G06F 16/335; G06F 16/24578; Y10S 707/99933; Y10S 707/99934; H04L 51/21

See application file for complete search history.

(56) References Cited

U.S. PATENT DOCUMENTS

| | | | | |
|---|---|---|---|---|
| 7,739,259 | B2 * | 6/2010 | Hartwell | G06F 16/332 707/706 |
| 10,437,836 | B2 | 10/2019 | Allen et al. | |

(Continued)

OTHER PUBLICATIONS

Ahluwalia, A., Sutradhar, B., Ghosh, K., Yadav, I., Sheetal, A., & Patil, P. (2024). Hybrid semantic search: Unveiling user intent beyond keywords. arXiv preprint arXiv:2408.09236. (Year: 2024).

(Continued)

*Primary Examiner* — Cheryl Lewis

(57) ABSTRACT

Techniques for improved generation of a search response are disclosed herein. An example computer-implemented method includes receiving an initial input from a user; determining, by applying at least a keyword search transformer and a semantic search transformer to the initial input, a plurality of search queries; applying, at least a keyword search engine and a semantic search engine corresponding to the keyword search transformer and the semantic search transformer to process the plurality of search queries to obtain a plurality of search results; ranking the plurality of search results based on their respective search scores; and generating by applying a large language model to the ranked plurality of search results and the initial input, a search response.

20 Claims, 18 Drawing Sheets

(51) Int. Cl.
*G06F 16/334* (2025.01)
*G06F 16/335* (2019.01)
*G06F 16/338* (2019.01)
*G06F 16/953* (2019.01)
*H04L 51/21* (2022.01)

(52) U.S. Cl.
CPC .......... *G06F 16/338* (2019.01); *G06F 16/953* (2019.01); *H04L 51/21* (2022.05)

(56) References Cited

U.S. PATENT DOCUMENTS

| | | | | |
|---|---|---|---|---|
| 12,008,621 | B1 | 6/2024 | Atef | |
| 12,235,882 | B1 | 2/2025 | Chawla et al. | |
| 12,254,272 | B1 | 3/2025 | Cetoli et al. | |
| 12,259,913 | B1 | 3/2025 | Muschett et al. | |
| 12,346,337 | B1 | 7/2025 | Palatnik De Sousa et al. | |
| 12,423,312 | B1 | 9/2025 | Symborski et al. | |
| 12,468,747 | B2 | 11/2025 | Cui et al. | |
| 12,481,686 | B1 | 11/2025 | Uthappa et al. | |
| 12,650,818 | B2 | 6/2026 | Kehres | |
| 2014/0149383 | A1* | 5/2014 | Diamond | G06F 16/9535 707/710 |
| 2019/0005329 | A1 | 1/2019 | Misra et al. | |
| 2019/0294670 | A1 | 9/2019 | Jagan et al. | |
| 2021/0192133 | A1 | 6/2021 | La Rocca et al. | |
| 2023/0088722 | A1 | 3/2023 | Ahrens et al. | |
| 2024/0273793 | A1 | 8/2024 | DeCharms | |
| 2024/0303262 | A1* | 9/2024 | Lanka | G06F 16/3347 |
| 2024/0320476 | A1 | 9/2024 | Chandrasekaran | |
| 2024/0362248 | A1 | 10/2024 | Bendeck et al. | |
| 2024/0380719 | A1* | 11/2024 | Prabhu | G06F 3/04817 |
| 2024/0386015 | A1 | 11/2024 | Crabtree et al. | |
| 2024/0419705 | A1 | 12/2024 | Kotaru | |
| 2025/0006182 | A1 | 1/2025 | Ingel et al. | |
| 2025/0061138 | A1 | 2/2025 | Madisetti et al. | |
| 2025/0086190 | A1 | 3/2025 | Azarmi | |
| 2025/0117423 | A1 | 4/2025 | Setlur et al. | |
| 2025/0139140 | A1 | 5/2025 | Gopalan et al. | |
| 2025/0200100 | A1 | 6/2025 | Hintz et al. | |
| 2025/0217572 | A1 | 7/2025 | DeCharms | |
| 2025/0245249 | A1 | 7/2025 | Thunuguntla et al. | |
| 2025/0252124 | A1 | 8/2025 | Aviyam et al. | |
| 2025/0252661 | A1 | 8/2025 | Wannerberg et al. | |
| 2025/0272062 | A1 | 8/2025 | Kehres | |
| 2025/0322326 | A1 | 10/2025 | Vasanth et al. | |
| 2025/0368219 | A1 | 12/2025 | Thompson, III | |
| 2026/0037523 | A1* | 2/2026 | Jain | G06F 16/24578 |
| 2026/0050738 | A1 | 2/2026 | Bensoussan et al. | |

OTHER PUBLICATIONS

He, G., Dai, Z., Zhu, J., Zhao, B., Hu, Q., Li, C., . . . & Yuan, B. (2024). Zero-indexing internet search augmented generation for large language models. arXiv preprint arXiv:2411.19478. (Year: 2024).

Martellozzo, S. (2024). Integrating semantic and keyword search: a transformer-based approach for content discovery. Master's Thesis in Computer Science and Engineering Computer Engineering. Milano Polytechnic School of Industrial and Information Engineering. https://hdl.handle.neU10589/219787 (Year: 2024).

* cited by examiner

MACHINE LEARNING-BASED ALGORITHMS FOR IMPROVED GENERATION OF A SEARCH RESPONSE

CROSS-REFERENCE TO RELATED APPLICATIONS

This application is related to U.S. patent application Ser. No. 19/036,907, filed Jan. 24, 2025, and entitled "MACHINE LEARNING-BASED ALGORITHMS FOR IMPROVED GENERATION OF A SEARCH RESPONSE," and claims the benefit of U.S. Provisional Application No. 63/744,064, filed Jan. 10, 2025, and entitled "MACHINE LEARNING-BASED ALGORITHMS FOR IMPROVED GENERATION OF A SEARCH RESPONSE," which are incorporated herein by reference in their entirety.

FIELD OF THE DISCLOSURE

The present disclosure relates to systems/architectures leveraging machine learning and, more particularly, to improving search response generation utilizing multiple search engines and machine learning techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The rise of large language models (LLMs) has transformed how search systems understand and respond to user queries, offering capabilities to interpret natural language, generate coherent responses, and contextualize information. However, relying solely on LLMs for search response generation introduces several challenges. For example, LLMs often generate responses based on probabilistic reasoning across vast generalized datasets, which can lead to issues like hallucinations, where responses sound plausible but are factually incorrect or contextually irrelevant. Such existing LLM utilization thereby fails to consistently provide accurate and/or relevant search responses.

Furthermore, LLM-driven searches typically lack transparency and control. The underlying reasoning behind a response is not always apparent, making it difficult to assess the validity or accuracy of the provided information. This opacity is compounded by the inability to explicitly tune LLMs for domain-specific needs without extensive, resource-intensive retraining processes. In many cases, such retraining may not even be feasible due to regulatory or compliance constraints. For instance, in highly regulated domains like healthcare, training an LLM directly on datasets containing sensitive or protected health information (PHI) may violate data protection regulations, such as the Health Insurance Portability and Accountability Act (HIPAA). As a result, LLMs often rely on generalized training data, which limits their ability to accurately interpret and reflect nuanced domain-specific terminology, user intent, or the priorities of a given application.

SUMMARY

In some aspects, the techniques described herein relate to a computer-implemented method for improving generation of a search response, the computer-implemented method including: receiving, by one or more processors, an initial input from a user; determining, by applying at least a keyword search transformer and a semantic search transformer to the initial input, a plurality of search queries; applying, by the one or more processors, at least a keyword search engine and a semantic search engine corresponding to the keyword search transformer and the semantic search transformer to process the plurality of search queries to obtain a plurality of search results, wherein each search engine has differently tuned parameters to output a search score for a search result; ranking, by the one or more processors, the plurality of search results based on their respective search scores; and generating, by applying a large language model to the ranked plurality of search results and the initial input, a search response, wherein the keyword search engine and the semantic search engine operate independently from the large language model.

In some aspects, the techniques described herein relate to a computer system for improving generation of a search response, the computer-implemented method including: one or more processors; and a non-transitory program memory coupled to the one or more processors and storing executable instructions that, when executed by the one or more processors, causes the computer system to: receive an initial input from a user; determine, by applying at least a keyword search transformer and a semantic search transformer to the initial input, a plurality of search queries; apply at least a keyword search engine and a semantic search engine corresponding to the keyword search transformer and the semantic search transformer to process the plurality of search queries to obtain a plurality of search results, wherein each search engine has differently tuned parameters to output a search score for a search result; rank the plurality of search results based on their respective search scores; and generate, by applying a large language model to the ranked plurality of search results and the initial input, a search response, wherein the keyword search engine and the semantic search engine operate independently from the large language model.

In some aspects, the techniques described herein relate to a tangible, non-transitory computer-readable medium storing executable instructions for improving prompt engineering, the instructions, when executed by one or more processors of a computer system, cause the computer system to: receive an initial input from a user; determine, by applying at least a keyword search transformer and a semantic search transformer to the initial input, a plurality of search queries; apply at least a keyword search engine and a semantic search engine corresponding to the keyword search transformer and the semantic search transformer to process the plurality of search queries to obtain a plurality of search results, wherein each search engine has differently tuned parameters to output a search score for a search result; rank the plurality of search results based on their respective search scores; and generate, by applying a large language model to the ranked plurality of search results and the initial input, a search response, wherein the keyword search engine and the semantic search engine operate independently from the large language model.

DETAILED DESCRIPTION

Figure 1:
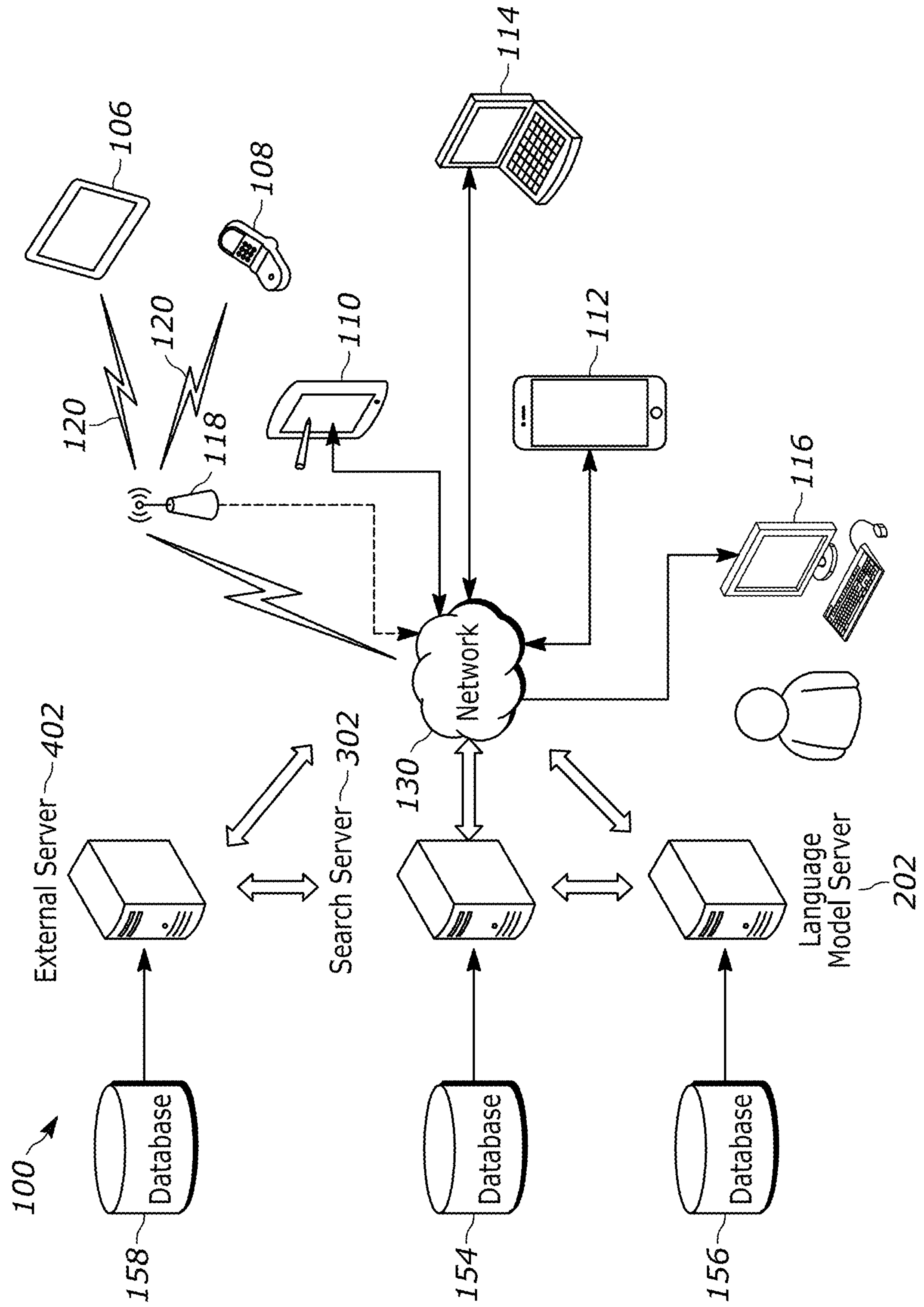
FIG. 1 is a block diagram of an example communication system in which a method for improved search response generation can be implemented.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Broadly speaking, the techniques of the present disclosure relate to generating a search response by utilizing a plurality of search engines and a large language model. The plurality of search engines may include at least a keyword search engine and a semantic search engine, each configured with different parameters and weights to produce multiple search results. In operation, the plurality of search engines receives an initial input (e.g., a query) from a user, and collectively generates a plurality of search results (e.g., relevant articles) based on the user's query. A large language model may then receive the plurality of search results and generate a search response that incorporates those results.

As mentioned, LLMs are applicable to a growing number of use cases, but hallucinations and unpredictable responses have limited their real-world adoption, particularly in query response systems. This challenge is relevant, for example, in health-related contexts, where a single inaccurate response can impact life and death situations. Accordingly, the present techniques aim to improve the accuracy and reliability of search response generation performed by an LLM by, e.g., constraining the LLM's generation of responses to reference search results generated by the search engines and generating a search response by selecting one or more search results from the search results.

Conventional LLMs rely on vast, generalized datasets that often contain incomplete or low-quality information, which frequently causes them to generate speculative or factually inaccurate content, termed "hallucinations". These hallucinations arise when the model, lacking direct verifiability or domain-specific constraints, attempts to fill gaps present in its training data by inferring details from patterns rather than from verified sources. To reduce and/or eliminate hallucinations and the negative impacts arising therefrom, the present techniques confine the LLMs' usable dataset to targeted and verifiable results (e.g., the plurality of search results), thereby eliminating such vast, generalized datasets existing LLMs typically utilize to consequently reduce hallucinations. For instance, if the initial input is, "What is a treatment plan for eczema?", the plurality of search engines may retrieve multiple accurate and verifiable articles directly related to eczema treatments. The LLM may then rely on these articles to generate a more accurate and reliable search response than existing techniques are capable of achieving. Additionally, rather than generating a response by inferring details from existing data, which inherently carries a risk of hallucination, the present techniques constrain the LLM to select the most relevant article(s) from a set of accurate, verifiable sources. This selection-based approach effectively eliminates the possibility of hallucinations altogether.

The initial input may be routed through a plurality of search transformers, such as a keyword search transformer and a semantic search transformer. Existing techniques often lack such specialized transformers, instead relying on a single generalized transformer that does not distinguish between specific approaches (e.g., keyword-based and semantic-based). For instance, a single generalized transformer might merely tokenize the initial input and apply the tokenized query for both the keyword-based and semantic-based engines. This tokenized query will likely yield imprecise, inaccurate, and/or irrelevant search results at least because using the same tokenized query for both engine types can lead to a loss of nuanced query meaning or intent. Namely, tokenization alone may not capture the query's full semantic context, on which semantic-based engines rely. This "one-size-fits-all" approach of many existing techniques thus restricts each search engine from leveraging its specialized functionality, such as a semantic engine's vector-based contextual analysis, and consequently yields imprecise, inaccurate, and/or contextually irrelevant queries.

By contrast, the transformers utilized as part of the present techniques produce a set of tailored queries for each search engine, enabling the engines to optimize their search results based on their respective capabilities. For example, a keyword search transformer may generate precise queries for the keyword search engine, while the semantic search transformer generates context-aware queries suitable for semantic search engines utilizing vector embeddings. By routing queries through individually tailored transformers, each search engine necessarily receives an optimized query aligned with its unique strengths, improving retrieval quality. The present techniques therefore ensure each search engine receives comprehensive and accurate indications of the user's intent and query context, enhancing both precision and relevance in the resulting search outputs relative to existing techniques.

The plurality of search results may also be scored based on their relevance to the initial input, and the present techniques may rank the plurality of search results in accordance with their respective scores. Many existing methods do not prioritize or rank search results in a meaningful way, sometimes presenting them merely in the order retrieved or sorted by simplistic factors like date/time. As a result, an LLM relying on these conventional methods could frequently utilize results that are inaccurate or only tangentially relevant to the query, yielding similarly inaccurate and/or irrelevant search responses. By contrast, the present techniques utilize a ranking to enable the LLM to determine which results are most pertinent to the initial input, such that the LLM focuses on higher-ranked search results to improve the quality of the LLM's results analysis and search response generation. Consequently, the LLM generates a response that is more accurate and aligned with the user's original input/query than existing techniques are able to provide.

Therefore, the techniques of the present disclosure provide multiple layers of safeguards against hallucinatory search results, and provide a more relevant search response to the user's original inquiry. By leveraging the plurality of search transformers to tailor the initial input into optimized queries for the plurality of search engines, the present techniques ensure the plurality of search engines outputs accurate, relevant search results. Further, by ranking these results based on relevance and having the LLM select a response based on the ranked results, the present techniques cause the LLM to minimize or eliminate the likelihood of hallucinations and further improve the reliability of the generated search response.

Moreover, each search engine may be configured with independently tuned parameters, each weighted differently to generate scores for its respective search results. Existing techniques often employ a single, uniform set of parameters for all search engines, limiting their ability to address varied tasks or contexts. Because these existing approaches apply the same parameter weights universally, they generally lack the flexibility to create "agents" specialized for different goals or domains. By contrast, the techniques of the present disclosure may instantiate distinct "agents," each specialized for a particular task and powered by the correspondingly tuned search engines to yield domain- or application-specific customization that maximizes search result relevance and accuracy. For example, in a healthcare context, a recommendation agent may tune weights of each search engine in the plurality of search engines in such a way to prioritize verified sources or Promotional Review Committee (PRC)-approved content, while a coverage-checking agent may tune weights of each search engine in such a way to prioritize insurance-related data. By permitting each search engine to independently adapt its parameters, the present techniques support a high degree of flexibility and specialization that enhances the overall performance of the search system, particularly when compared to the inflexibility suffered by existing techniques.

Notably, the search engines may be tuned independently of the LLM, effectively rendering the search engines agnostic to whichever LLM is used. As mentioned, many conventional methods require tuning and/or re-training the LLM itself to handle specialized tasks, a process that typically demands substantial computational power and vast datasets. However, the present techniques training/tuning the relatively simpler search engines to be independent of any LLM offers significant advantages in resource management relative to these existing approaches, such as requiring substantially fewer computational resources and significantly smaller datasets. For instance, in healthcare scenarios subject to strict privacy and compliance regulations, the present techniques may train the search engines using narrowly scoped datasets that adhere to these standards. Furthermore, as the search engines of the present techniques are LLM-agnostic, this architecture permits seamless replacement or updating of the LLM without necessitating a complete retraining of the entire system, thereby further reducing the computational resources required as part of existing techniques.

In some embodiments, the present techniques further improve the functionality of computing devices by enabling multi-modal communication processing that extends the search response generation capabilities across diverse communication channels. By receiving initial input via electronic mail messages transmitted to an electronic mail address, parsing the electronic mail message to extract the initial input from a message body, and transmitting the search response as a reply electronic mail message, the present techniques enable asynchronous query processing that existing techniques fail to adequately support. This email-based processing architecture allows the system to handle communications that may contain additional formatting artifacts, such as signatures, threading indicators, and prior reply content, which must be filtered to extract the actual user query. The present techniques address these challenges by implementing a two-stage pipeline that first applies standard text processing to strip headers, reply content, and signatures from the email, and then analyzes the remaining user text for actual user intention through the conversational engine, thereby ensuring accurate query extraction regardless of the communication modality.

The present techniques further enhance multi-turn conversation handling by detecting subsequent electronic mail messages from the user device in response to the reply electronic mail message, extracting follow-up queries from the subsequent electronic mail message, and storing the initial input, the search response, and the follow-up query in a conversation thread data structure that associates the electronic mail messages as a linked sequence of communications. This conversation thread data structure enables the large language model to generate contextually relevant responses based on the conversation history, thereby maintaining conversational continuity across asynchronous email exchanges. By generating a second search response by applying the large language model to the conversation thread and a second ranked plurality of search results corresponding to the follow-up query, the present techniques preserve context across multiple email exchanges in a manner that existing techniques, which typically treat each email as an isolated query, do not achieve.

In certain embodiments, the present techniques improve processing efficiency by receiving initial input via short message service (SMS) messages transmitted from a mobile device, parsing the SMS message to extract the initial input, and transmitting the search response as a reply SMS message to the mobile device. This SMS-based processing architecture enables the system to provide instant, compliant answers using natural language or medical terminology across mobile communication channels without requiring application downloads or portal logins. The present techniques further enhance SMS processing by detecting medical terminology or abbreviations within the SMS message, applying a medical terminology normalization engine to convert the detected medical terminology or abbreviations into standardized terms, and determining the plurality of search queries by applying the keyword search transformer and the semantic search transformer to the standardized terms. This normalization capability addresses challenges of SMS communications, where abbreviations and informal language are common, ensuring that the search engines receive properly formatted queries that accurately reflect user intent.

The present techniques further improve SMS processing accuracy by detecting misspellings within the SMS message by comparing terms against a medical terminology dictionary, applying a spelling correction engine to generate corrected terms based on the detected misspellings, and determining the plurality of search queries based on the corrected terms. The present techniques may store each SMS message exchanged between the mobile device and the designated telephone number in a conversation thread data structure associated with a unique session identifier to maintain conversational continuity across SMS exchanges. The system can further generate proactive follow-up SMS messages based on analyzing the conversation thread data structure to identify a user characteristic and determining that additional information relevant to the user characteristic has not yet been requested, thereby enabling intelligent engagement that anticipates user needs.

In certain embodiments, the present techniques also improve personalization and contextual relevance by establishing a communication interface with a customer relationship management (CRM) system via an application programming interface (API) to transmit a user identifier and receive user profile data associated with the user. The present techniques may generate the search response by applying the large language model to the ranked plurality of search results, the initial input, and the user profile data retrieved from the CRM system, and thereby provide personalized responses accounting for the user's prior interactions, preferences, or characteristics stored in the CRM system. This CRM integration allows the system to tailor search responses to provide contextually relevant information based on historical engagement patterns and stored profile attributes, enhancing the relevance and utility of the search response in a manner that existing techniques lacking such integration cannot achieve.

In certain embodiments, the present techniques further improve upon existing techniques by determining the initial input corresponds to a high-intent action based on analyzing the initial input against a predefined set of high-intent action indicators, and in response, executing a high-intent workflow. This workflow evaluates the communication modality associated with the initial input and constraints of the communication modality to determine whether the communication modality supports an identified and relevant follow on action, for example a representative contact form, scheduling interface, sample request, payment assistance, or other relevant action or workflow. When the communication modality does not support such interfaces or other relevant follow on actions, the present techniques may generate a uniform resource locator (URL) that encodes a session identifier associated with the initial input and routes the user to a web application configured to present the representative contact form or scheduling interface while preserving conversation context associated with the session identifier. This cross-modality handoff capability ensures users can complete complex actions requiring web interfaces even when initiating queries through constrained modalities such as SMS, without losing conversational context.

In some embodiments, the present techniques improve the reliability and accuracy of search response generation by constraining the large language model to select one or more results exclusively from the ranked plurality of search results derived from the pre-approved content and data. This constraint ensures the large language model cannot generate responses based on its general training data, which may contain incomplete or inaccurate information, but must instead rely solely on verified, compliant content approved in accordance with applicable regulations. The present techniques thus eliminate the possibility of hallucinations or out-of-compliance content when drawing from unverified sources, and ensure every search response is grounded in accurate, pre-approved content and data. This can be particularly influential in certain domains, such as healthcare, where inaccurate and/or unapproved information could have significant consequences.

Therefore, and in accordance with the above, the techniques of the present disclosure improve the functionality of a computing device (e.g., a hosting server such as a central server) at least by utilizing both search engines and an LLM as part of a search system to generate search responses. In particular, the present techniques utilize the search engines to ground the LLM's responses in verified/reliable, accurate sources, and select a source among the sources in generating a search response. This search system of the present techniques (and by extension, the underlying computing device) can thus more dependably generate accurate, reliable, and/or relevant search responses than conventional approaches that depend more exclusively on LLMs, which often generate false, misleading, and/or otherwise irrelevant outputs.

Additionally, the techniques of the present disclosure improve the functionality of a computing device at least by utilizing fewer computational resources and conserving energy relative to existing techniques when generating search responses. Such existing techniques often devote significant computational resources, time, and energy to train or fine-tune LLMs with millions—or even billions—of parameters to unilaterally generate search responses. By contrast, the present techniques train relatively simpler search engines to perform a portion of the search response generation process, which require fewer training datasets and less preprocessing complexity. Consequently, the search engines of the present techniques operate with a significantly reduced computational footprint relative to existing LLMs, while enabling the LLM to generate accurate and relevant search responses that are tailored to the user's query. As a result, the systems of the present disclosure achieve a more efficient and scalable approach to accurate search response generation than existing techniques can accomplish.

Moreover, the present disclosure includes effecting a transformation or reduction of a particular article to a different state or thing, e.g., reducing/eliminating the inaccuracies of a computing system (and associated subsystems/components/devices) from a non-optimal or error state (e.g., prone to hallucinations) to an optimal (or closer to optimal) state by constraining search responses to a query using a plurality of search results that are associated with the query.

Still further, the present disclosure includes specific features other than what is well-understood, routine, conventional activity in the field, or adding unconventional steps that demonstrate, in various embodiments, particular useful applications, e.g., receiving an initial input from a user; determining, by applying at least a keyword search transformer and a semantic search transformer to the initial input, a plurality of search queries; applying at least a keyword search engine and a semantic search engine corresponding to the keyword search transformer and the semantic search transformer to process the plurality of search queries to obtain a plurality of search results; ranking the plurality of search results based on their respective search scores; and/or generating, by applying a large language model to the ranked plurality of search results and the initial input, a search response among others.

Of course, it should be appreciated that the advantages and technical improvements described above and elsewhere herein are not the only advantages and/or technical improvements that may be realized as a result of the techniques described herein. Other advantages and/or technical improvements to the functioning of a computer itself or other technologies or technical fields may be apparent to one of ordinary skill in the art. Moreover, while described herein primarily in the medical context, the techniques described herein may be readily applied in any suitable field for any suitable purpose.

Referring to FIG. 1, an example comprehensive search system 100 includes a language model server 202, a search server 302, an external server 402, and client devices 106-116 which may be communicatively connected through a network 130, as described below. In some embodiments, one or more of these servers may be consolidated into a single server (e.g., the language model server 202 and the external server 402), and the comprehensive search system 100 may not always include the external server 302.

Each of the client devices 106-116 may interact with the language model server 202 to transmit an initial input (e.g., query) to receive a search response. The client devices 106-116 can enable users to access a language model of the language model server 202 from different environments and contexts. Upon receiving the query, the language model server 202 can process the initial input (e.g., the query) using the language model to generate the search response. The language model server 202 can then transmit the search response back to the client devices 106-116.

Each of the client devices 106-116 may also interact with the search server 302 to generate an improved search response to the initial query. The search server 302 may employ a search system comprising a plurality of search engines (e.g., keyword search engine, semantic search engine, etc.) to determine a plurality of search results. Upon determining the plurality of search results, the search server 302 may transmit the initial input and the plurality of search results to the language model server 202 to generate a search response by applying the large language model to the plurality of search results and the initial input. The language model server 202 can then transmit the search response back to the client devices 106-116. In some embodiments, the search server 302 may only transmit the plurality of search results to the language model server 202, and the client devices 106-116 may transmit the initial input directly to the language model server 202. In further embodiments, the language model server 202 may transmit the search response back to the search server 302, and the search server 302 may transmit the search response to the client devices 106-116. In some embodiments, the search server 302, after receiving the search response from the language model server 202, may perform additional tasks (e.g., scheduling an appointment) based on the search response.

In some embodiments, the search server 302 may interact with the external server 402 to generate an improved search response to the initial query. The external server 402 may be a third-party server that implements a chatbot or similar interface hosted by the search server 302 while maintaining the capability to store and manage user profile data (via database 158). When a user using the client devices 106-116 transmits an initial input to the search server 302, the search server 302 may communicate with the external server 402 to obtain relevant user profile data to the user via user's approval. The user profile data may comprise preferences, previous chat history, contextual information, etc. The search server 302 may then utilize the relevant user profile data when generating the plurality of search results. The search server 302 may additionally communicate the user profile data with the language model server 202, and the language model server 202 may use the user profile data when generating a search response.

The language model server 202 may be communicatively connected to a database 156. The database 156 may store training data that the language model server 202 can use to train its language model. The database 156 may comprise a generalized dataset that includes diverse sources such as publicly available text corpora, domain-specific literature, and curated content. This generalized dataset may allow the language model to learn a wide range of linguistic patterns, contextual nuances, and domain-specific terminologies.

The search server 302 may be communicatively connected to a database 154. The database 154 may store information associated with resources that the search server 302 may use to determine a plurality of search results. For example, the resources may comprise general health data that the search server 302 may use to determine a plurality of search results for an initial input related to health. In some embodiments, the resources may comprise pre-approved data that were approved based on one or more regulations. For example, the database 154 may store health-related resources that comply with HIPAA or other regulatory frameworks to ensure that sensitive information is protected. These resources may include pre-approved patient education materials, clinical guidelines, or regulatory-compliant datasets that the search server 302 can use to generate accurate and compliant search results. The pre-approved data may be periodically updated with newly approved data.

The pre-approved data may comprise a plurality of articles. Each article in the plurality of articles may include different article components. For example, each article may include a title component, which may serve as a concise, user-visible summary of the article's content and acts as the primary identifier during search queries. A description component may provide a user-visible brief overview of the article's content, offering context and aiding in user comprehension. The search description component may provide a short summary or keyword analog of the article. A search content component may represent the full content of the document, enabling comprehensive search capabilities and facilitating matches to detailed information within the article. A search text component may include a processed version (e.g., undergone various text transformations such as lowercasing, removing stop words, etc.) of the article's content optimized for internal search operations.

As an illustrative example, consider an article with the title component "How to Bake a Classic Vanilla Cake," which concisely states the main subject and serves as the primary identifier in search results. A description component might read, "A quick and easy recipe for a moist, homemade vanilla cake, complete with frosting tips," offering a brief overview to help readers gauge whether the article is relevant. A search description component could be "cake, baking, homemade, vanilla, frosting," acting as a keyword-rich summary for rapid matching. The search content component may contain the entire article—everything from ingredient lists to step-by-step instructions—so that users can find detailed information through comprehensive queries. Finally, the search text component could include a processed version of this full text, where common words might be removed, text lowercased, and words stemmed or lemmatized (e.g., "baking," "baked," "bakes"→"bake") to optimize internal search operations.

In some other embodiments, the database 154 may comprise a plurality of databases that a plurality of search engines may use to determine a plurality of search results. For instance, the search server 302 may employ the pre-approved data to a keyword search transformer to determine keyword search data, and store the keyword search data to a keyword search database. In other embodiments, the database 154 may comprise one or more databases that one or more search engines may use to determine one or more search results. A keyword search engine may then utilize the keyword search data to obtain one or more keyword search results. In another instance, the search server 302 may employ the pre-approved data to the semantic search transformer to determine semantic search data, and store the semantic search data to a semantic search database. A semantic search engine may then utilize the semantic search data to obtain one or more semantic search results. Details of storing the plurality of databases are further described in the data inclusion module 312 of FIG. 3.

In further embodiments, the search server 302 may apply a machine learning model to general health data to identify candidate data among the general health data for potential inclusion in the pre-approved data. For example, the machine learning model may analyze patterns, relevance, and context within the general health data to flag sections or subsets of data that align with regulatory guidelines, such as HIPAA or FDA requirements. In some further embodiments, the search server may apply the machine learning model to the general health data to generate candidate data for potential inclusion in the pre-approved data. For example, the machine learning model could synthesize new educational content, create structured summaries, or generate patient-friendly explanations by transforming technical medical information into more accessible formats. The candidate data, upon approval in accordance with the one or more regulations, may then be part of the newly approved data that may be stored in the database 154. In some embodiments, another machine learning model (which may be fine-tuned based on different healthcare professional or domain experts) may be used to approve the candidate data generated by the machine learning model, verifying whether the candidate data is aligned with the one or more regulations. Details of storing the candidate data are further described in the data inclusion module 312 of FIG. 3.

Therefore, the database 154 may store information that is verified and/or compliant with one or more regulations. As a result, the plurality of search results generated by the plurality of search engines that utilize the database 154 are all highly reliable, accurate, and/or tailored to meet regulatory standards. This ensures that users receive information that is both relevant, accurate, and compliant with applicable regulations, such as HIPAA, FDA guidelines, or other industry-specific requirements. Such approval process minimize the risk of misinformation and enhances the overall trustworthiness of the search results.

In some embodiments, the language model server 202 may comprise a plurality of language model servers, each hosting a different language model tailored to specific tasks. The search server 302 may utilize different language model servers for various functions in generating a search response. For example, the search server 302 may transmit the plurality of search results along with the initial input to a language model server for generating a coherent and contextually appropriate search response by selecting one or more contextually relevant search results. In another example, the search server 302 may transmit the initial input to a different language model server designed to validate the contextual relevance of the input to the resources stored in the database 154. For instance, if the initial input is "What is the temperature in Chicago" while the database 154 contains only health-related data, the language model server can determine that the input is not contextually relevant. It may then generate a search response indicating that the initial input is outside the scope of the database's 154 resources. This multi-model approach allows for task-specific optimization, improving the overall accuracy and efficiency of the search system while maintaining the relevance and reliability of the responses.

The one or more language models of the language model server 202 that use a machine learning model may be configured to implement machine learning, such that the model/engine "learns" to analyze, organize, and/or process data without being explicitly programmed. Machine learning may be implemented through machine learning methods and algorithms. In one exemplary embodiment, a machine learning module may be configured to implement machine learning methods and algorithms.

In some embodiments, at least one machine learning method and algorithm may be applied, which may include but is not limited to: linear or logistic regression, instance-based algorithms, regularization algorithms, decision trees, Bayesian networks, naïve Bayes algorithms, cluster analysis, association rule learning, neural networks (e.g., convolutional neural networks, deep learning neural networks, combined learning module or program), deep learning, combined learning, reinforced learning, dimensionality reduction, support vector machines, k-nearest neighbor algorithms, random forest algorithms, gradient boosting algorithms, Bayesian program learning, voice recognition and synthesis algorithms, image or object recognition, optical character recognition, natural language understanding, and/or other ML programs/algorithms either individually or in combination. In various embodiments, the implemented machine learning methods and algorithms are directed toward at least one of several categorizations of machine learning, such as supervised learning, unsupervised learning, and reinforcement learning.

In one embodiment, the one or more language models may employ supervised learning, which involves identifying patterns in existing data to make predictions about subsequently received data. Specifically, the one or more language models may be "trained" using training data, which includes example inputs and associated example outputs. Based upon the training data, the one or more language models may generate a predictive function which maps outputs to inputs and may utilize the predictive function to generate machine learning outputs based upon data inputs.

In another embodiment, the one or more language models may employ unsupervised learning, which involves finding meaningful relationships in unorganized data. Unlike supervised learning, unsupervised learning does not involve user-initiated training based upon example inputs with associated outputs. Rather, in unsupervised learning, the one or more language models may organize unlabeled data according to a relationship determined by at least one machine learning method/algorithm employed by the one or more language models. Unorganized data may include any combination of data inputs and/or machine learning outputs as described above.

In yet another embodiment, the one or more language models may employ reinforcement learning, which involves optimizing outputs based upon feedback from a reward signal. Specifically, the one or more language models may receive a user-defined reward signal definition, receive a data input, utilize a decision-making model to generate a machine learning output based upon the data input, receive a reward signal based upon the reward signal definition and the machine learning output, and alter the decision-making model so as to receive a stronger reward signal for subsequently generated machine learning outputs. Other types of machine learning may also be employed, including deep or combined learning techniques.

After training, machine learning programs (or information generated by such machine learning programs) may be used to evaluate additional data. Such data may be and/or may be related to intent data, user device data, and/or other data that was not included in the training dataset. The trained machine learning programs (or programs utilizing models, parameters, or other data produced through the training process) may accordingly be used for determining, assessing, analyzing, predicting, estimating, evaluating, or otherwise processing new data not included in the training dataset.

It is to be understood that supervised machine learning and/or unsupervised machine learning may also comprise retraining, relearning, or otherwise updating models with new, or different, information, which may include information received, ingested, generated, or otherwise used over time.

Moreover, although the methods described elsewhere herein may not directly mention machine learning techniques, such methods may be read to include such machine learning for any determination or processing of data that may be accomplished using such techniques. In some aspects, such machine learning techniques may be implemented automatically upon occurrence of certain events or upon certain conditions being met. In any event, use of machine learning techniques, as described herein, may begin with training a machine learning program, or such techniques may begin with a previously trained machine learning program.

In some embodiments, the language model server 202, the search server 302, and the external server 402 may communicate via wireless signals 120 over a digital network 130 with the client devices 106-116, which can be any suitable local or wide area network(s) including a Wi-Fi network, a Bluetooth network, a cellular network such as 3G, 4G, Long-Term Evolution (LTE), 5G, the Internet, etc. In some instances, the client devices 106-116 may communicate with the digital network 130 via an intervening wireless or wired device 118, which may be a wireless router, a wireless repeater, a base transceiver station of a mobile telephony provider, etc. The language model server 202, the search server 302, and the external server 402 may also communicate with each other over the digital network 130, or may directly communicate with each other wired/wirelessly.

The client devices 106-116 may include, by way of example, a tablet computer 106, a network-enabled cell phone 108, a personal digital assistant (PDA) 110, a mobile device smart-phone 112 also referred to herein as a "mobile device," a laptop computer 114, a desktop computer 116, a portable media player (not shown), a wearable computing device such as Google Glass™ (not shown), a smart watch, a phablet, any device configured for wired or wireless RF (Radio Frequency) communication, etc.

Figure 2:
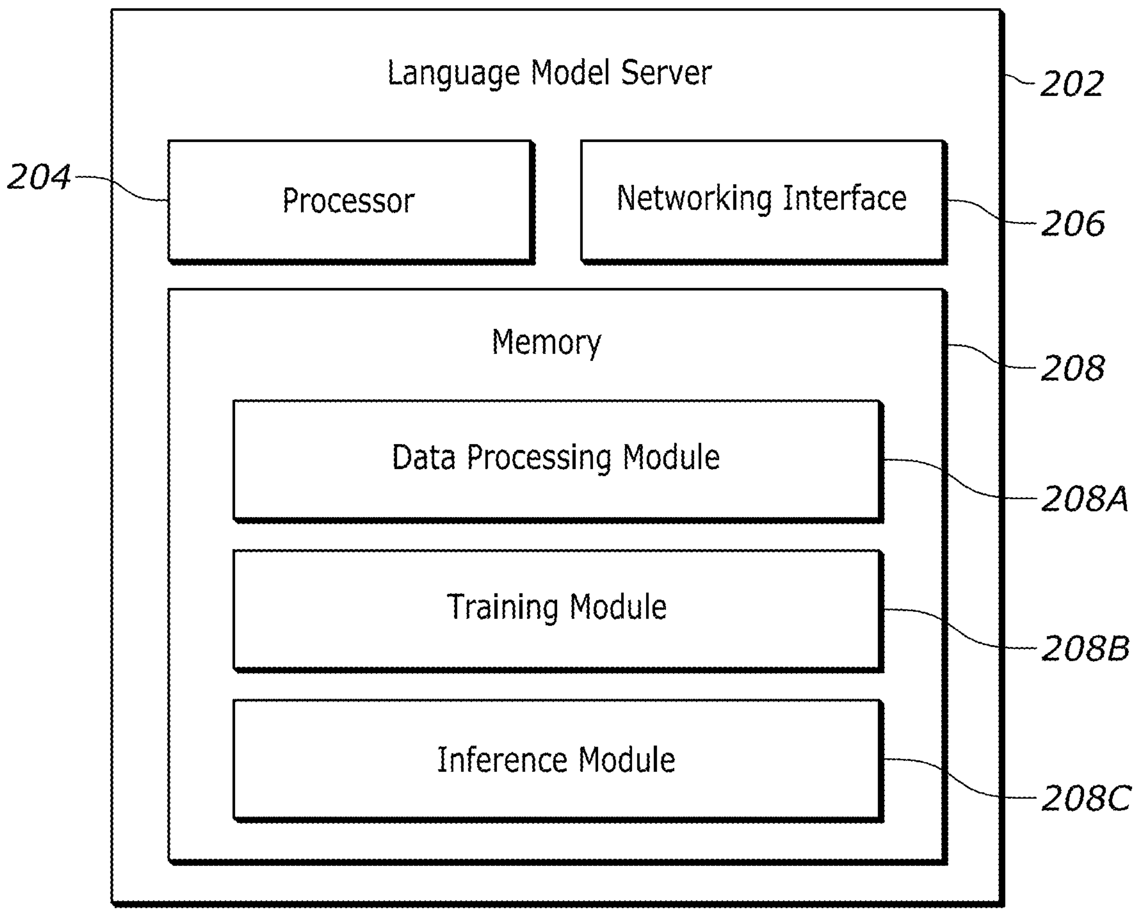
FIG. 2 is a block diagram of an example language model server that can operate in the system of FIG. 1.

Turning now to FIG. 2, the language model server 202 may include one or more processors 204, a networking interface 206, and one or more memories 208. The memories 208 may comprise a data processing module 208A, a training module 208B, and an inference module 208C. The language model server 202 may be connected to a database 154, which stores training data which the language model server 202 can use to train its language model.

As shown in FIG. 2, the memories 208 may store various applications for execution by the processor 204. The language model server 202 may use a training module 208B to train a language model. The training module 208B may employ various machine learning techniques such as supervised learning, unsupervised learning, and reinforcement learning to train the language model as described in FIG. 1. The training module 208B may use the training data from the database 156 to train the language model.

The language model server 202 may use the data processing module 208A to process data before it is used by the training module 208B to train the model. The data processing module 208A can be responsible for tasks such as data cleaning, normalization, tokenization, and feature extraction. These preprocessing steps ensure that the data is in a suitable format for training the language model, enhancing the model's ability to learn effectively from the data. The language model server 202 may additionally use the data processing module 208A to transform initial input (e.g., queries) and/or plurality of search results received from a search server 302 to a format that is suitable for the language model to process and determine a response.

The inference module 208C may use the language model trained by the training module 208B to generate responses to the initial input and/or the plurality of search results. The language model server 202 may receive the initial input and the plurality of search results from the search server 302. In some embodiments, the language model server 202 may receive the plurality of ranked search results from the search server 302. The plurality of ranked search results may rank the search results by their relevance to the initial input. The inference module 208C may first utilize the data processing module 208A to process the initial input to match the format expected by the trained language model. The inference module 208C may then feed the preprocessed queries into the language model to obtain search responses. The inference module 208C may obtain the search response by selecting one or more results among the plurality of search results.

In some embodiments, the data processing module 208A may preprocess the plurality of search results to align them with the input format required by the language model. The inference module 208C may then utilize the language model to generate a search response to the initial input (e.g., query) based on the context and content of the plurality of search results. In further embodiments, the language model may generate a search response to the initial input based on the ranked plurality of search results and/or current chat history data (the current chat history data may refer to chat data of a user in current chat session). For instance, the inference module 208C may utilize the large language model to generate the search response by selecting one or more search results among the ranked plurality of articles based on chat history. In some embodiments, the search response may display sentences or paragraphs from the one or more search results along with the one or more search results.

As an illustrative example, a user may provide an initial input, "What are the best ways to manage diabetes?" to the search server 302. The search server 302 may then transmit the initial input along with a plurality of ranked search results to the language model server 202. The plurality of search results may include articles on diet plans for diabetes, exercise recommendations, information on insulin therapy, and guidelines from medical organizations. The inference module 208C may utilize the data processing module 208A to preprocess the initial query to ensure it is in the correct format for the language model. It may also preprocess the ranked search results to align them with the language model's requirements. The language model may then utilize the plurality of search results to generate a search response to the initial input, such as providing "a peer-reviewed medical article detailing dietary strategies and insulin-therapy guidelines." In some embodiments, the language model may further refine its search response by incorporating current chat history data, such as noting if the user previously asked about diabetes-friendly recipes, to tailor the response to select the results regarding the diabetes-friendly recipes more effectively.

In some embodiments, the language model may additionally utilize a user's profile data to generate a search response. The language model server 202 may receive the user profile data from external server 402 via the search server 302. The language model may then generate a search response to the initial input based on the plurality of search results, current chat history data, and/or the user profile data. The user profile data may include information such as the user's preferences, past interactions, search history, demographic details, and/or any other context relevant to personalizing the response.

In further embodiments, the inference module 208C may perform additional tasks, including: determining a keyword search query by identifying relevant keywords in an initial or preprocessed input; forming a semantic search query by vectorizing the initial or preprocessed input; assessing whether the initial query is contextually relevant to the search server 302; identifying candidate data from general data to be stored in the database 156; generating candidate data for storage in the database 156; and/or carrying out other agent-specific tasks.

The language model server 202 may receive training data from the database 154 via networking interface 206 to train the language model. The language model server 202 may additionally receive initial input (e.g., queries), the plurality of search results, and other types of data (e.g., general health data for identifying candidate data) from the search server 302 and transmit search outputs (e.g., responses) to the client devices 106-116 via the networking interface 206.

The networking interface 206 may enable the language model server 202 to communicate with other devices, and/or any other suitable devices or combinations thereof. The networking interface 206 may support wired or wireless communications, such as USB, Bluetooth, Wi-Fi Direct, Near Field Communication (NFC), etc. The networking interface 206 may enable the language model server 202 to communicate via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc. Moreover, the network may be a single communication network, or may include multiple communication networks of one or more types (e.g., one or more wired and/or PANs or LANs, and/or one or more WANs such as the Internet).

More generally, the one or more processors 204 may include any suitable number of processors and/or processor types. For example, the processors 204 may include one or more CPUs and one or more graphics processing units (GPUs). Generally, each of the processors 204 may be configured to execute software instructions stored in the corresponding one or more memories 208. The memories 208 may include one or more persistent memories (e.g., a hard drive and/or solid-state memory) and may store one or more applications, modules, and/or models, such as the data processing module 208A, the training module 208B, and/or the inference module 208C.

Figure 3:
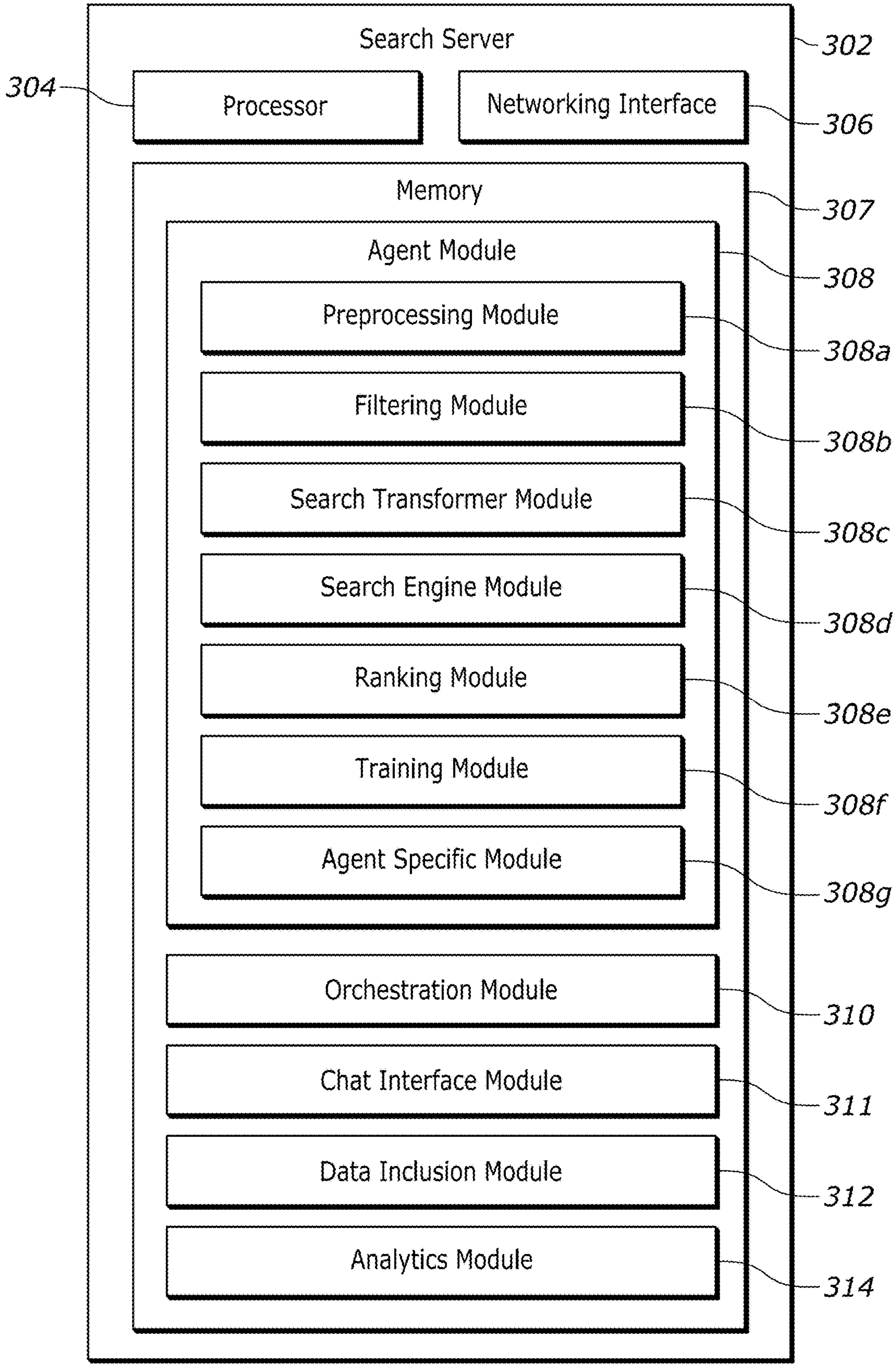
FIG. 3 is a block diagram of an example search server that can operate in the system of FIG. 1.

Referring now to FIG. 3, the search server 302 can include one or more processors 304, a networking interface 306, and one or more memories 307. The memories 307 include an agent module 308, an orchestration module 310, a chat interface module 311, a data inclusion module 312, and analytics module 314. The agent module 308 may comprise a preprocessing module 308*a*, a filtering module 308*b*, a search transformer module 308*c*, a search engine module 308*d*, a ranking module 308*e*, a training module 308*f*, and an agent specific module 308*g*.

Figure 6A:
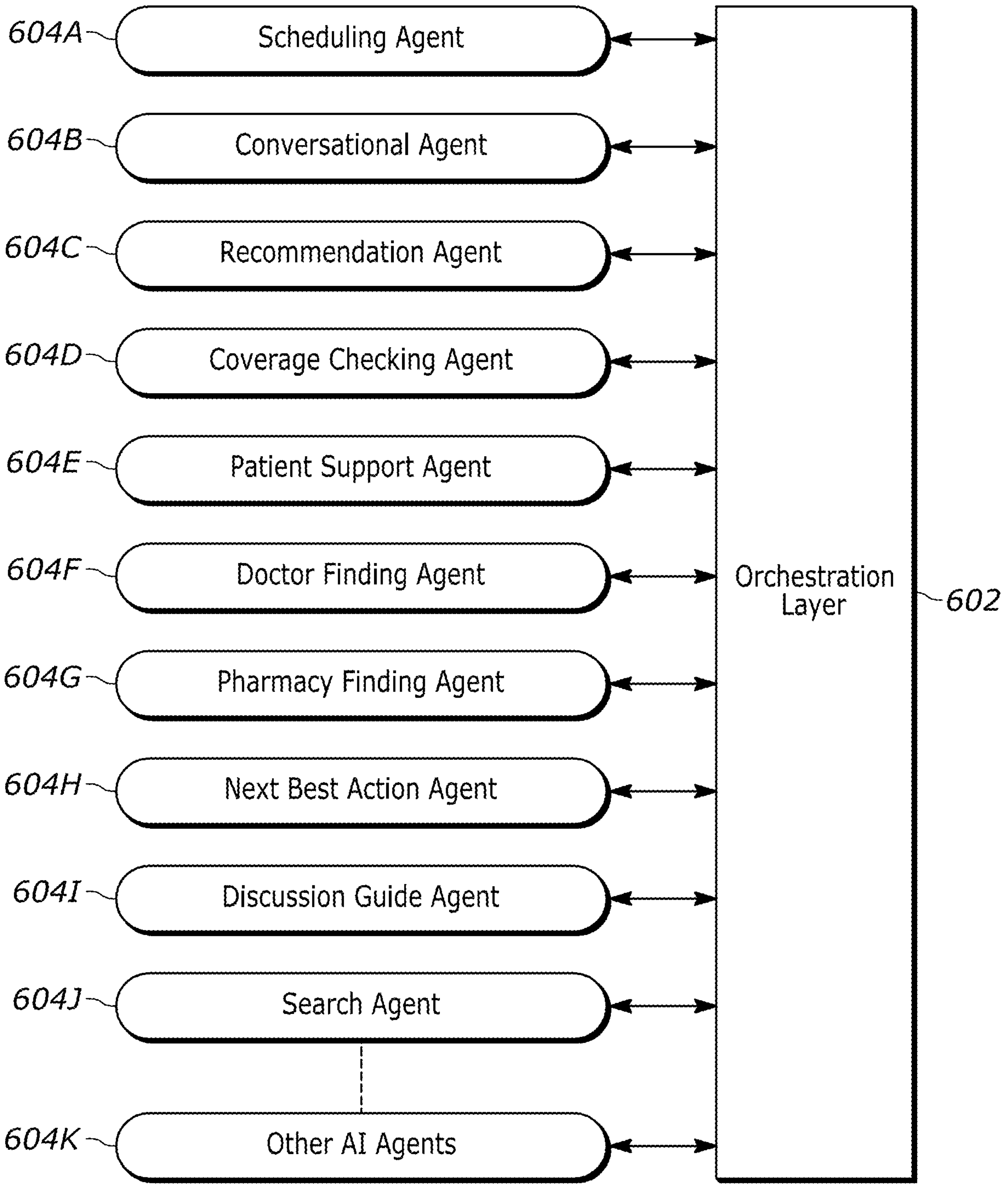
FIG. 6A is a flow diagram of an orchestration module utilizing different agents to generate a search response, according to some embodiments.

The search server 302 may comprise (e.g., store) one or more specialized agents, such as a scheduling agent, a conversational agent, and a recommendation agent, as illustrated in FIG. 6A. The search server may design each agent to perform specific tasks, and each agent may utilize an agent module 308 to execute its functionality. Each agent may be uniquely trained for its respective purpose through the training module 308*f*, ensuring that search engines are optimized to handle their specialized role effectively. Additionally, each agent may incorporate an agent specific module 308*g*, which may perform supplementary steps tailored to enhance the agent's performance and ensure it meets the specific requirements of its designated functionality. Thus, while illustrated in FIG. 3 as a single agent module 308, the search server 302 may include a plurality of agent modules 308. Each agent module 308 of the plurality may be configured to execute the functions described herein (e.g., with respect to each sub-component module 308*a-g*) associated with the respective specialized agent (e.g., scheduling, conversational, recommendation, etc.).

The preprocessing module 308*a* may preprocess an initial input received from a user through the networking interface 306. The initial input may be a user query entered through a chat interface provided by the chat interface module 311. The preprocessing module 308*a* may apply a preprocessing engine to the initial input to generate a preprocessed query. The preprocessing engine may include a profanity filtering engine that removes offensive terms from the input based on a predefined list. For example, if a user inputs "What the hell is diabetes?", the engine may filter out the offensive term "hell," resulting in the preprocessed query "What is diabetes?" Additionally, the preprocessing engine may convert abbreviations, synonyms, or domain-specific slang words in the initial input into their corresponding full terms using a predefined mapping. For instance, if a user inputs "What's the tx for DM?", the engine may expand "tx" to "treatment" and "DM" to "diabetes mellitus," producing the query "What is the treatment for diabetes mellitus?" In some embodiments, the search server may include domain-specific knowledge or recognize a user's frequently used terminologies when defining the predefined mapping, such as technical jargon in a healthcare or legal context. The preprocessing engine may also truncate the initial input to a predefined word limit to ensure compatibility with subsequent processing modules. For example, if the user inputs, "Can you tell me all the details about managing diabetes, including diet, medication, and exercise, for a person over 50?", the engine may truncate the input to "Details about managing diabetes for a person over 50," to meet predefined word count limits while retaining the query's core intent.

The filtering module 308*b* may check if the preprocessed query is contextually relevant to the search server 302. For example, if the preprocessed query asks a legal question about elections, such as "What are the voting laws in New York?" while the resources or databases (stored in database 154) that the plurality of search engines rely on are specifically geared toward health-related data, the filtering module 308*b* may determine that the search query is not contextually relevant. The filtering module 308*b* may utilize an LLM from a language model server 202 to make this determination. The search server may transmit the preprocessed query and metadata stored in the database 154, or preprocessed query and some representative data stored in the database 154 to determine whether the preprocessed query is contextually relevant. For instance, the LLM may analyze the preprocessed query and compare it against the scope of the database 154, which may contain health-related content such as medical guidelines, patient education, and research articles. If the LLM detects a mismatch in context, it may generate a search response indicating that the preprocessed input is not contextually relevant, such as "This system is designed to address health-related questions. Please refine your query." In some embodiments, the large language model used by the filtering module 308*b* may be distinct from the large language model used to determine a search response. For example, the search server 302 may transmit the preprocessed query along with metadata about the database 154 (e.g., its focus on health-related content) to one LLM stored on a language model server 202. This LLM may determine the query's contextual relevance. Separately, the search server 302 may transmit the preprocessed query along with a plurality of search results to a second LLM stored on another language model server 202, which generates a search response.

The search transformer module 308*c* may comprise a plurality of search transformers, such as a keyword search transformer and a semantic search transformer, to determine a plurality of search queries. Each transformer in the plurality of search transformers may transform the filtered preprocessed query into a search query tailored to a corresponding search engine to optimize search results. For example, the keyword search transformer may process the filtered preprocessed query, "What are effective treatments for migraines?" and transform it into a keyword search query tailored to a keyword search engine. The transformer might utilize a large language model in the language model server 202 to identify key terms relevant to the query (e.g., keyword search query), such as "migraine treatments," "effective remedies," and "headache relief." These keywords are then utilized by the keyword search engine, enabling it to return highly relevant results. Similarly, the semantic search transformer may transform the filtered preprocessed query into a semantic search query designed for a semantic search engine. This transformer could use a large language model (e.g., a vector embedding model) in the language model server 202 to generate a vector embedding representation of the filtered preprocessed query. For example, the semantic search transformer may encode the filtered preprocessed query into a high-dimensional vector that captures the query's contextual and semantic meaning, such as the relationship between "migraines" and "treatments." In some embodiments, the semantic search transformer may transform the keyword search query instead of the filtered preprocessed query into the high-dimensional vector (e.g., semantic search query). This vector embedding is then used by the semantic search engine to retrieve results based on contextual similarity.

In another example, a faceted search transformer may identify and extract structured, predefined attributes (or "facets") from the filtered preprocessed query, such as categories, tags, or data ranges, to determine a faceted search query. For example, the faceted search transformer may parse the filtered preprocessed query, "What are effective treatments for migraines?", into different facets like "treatment type," "symptom severity," and/or "patient demographics." The different facets may then be populated in a faceted search query based on the filtered preprocessed query, such as "condition=migraines, treatment=medication, severity=moderate-to-severe." The faceted search engine may then utilize this faceted search query to retrieve more precise results.

In some embodiments, along with the filtered preprocessed query, the search transformer module 308*c* may utilize current chat history and user profile information obtained through the external server 402. This additional information may provide valuable contextual insights that the search transformer module can use to refine and tailor the plurality of search queries. For example, if a user queries, "What are good exercises for beginners?" the current chat history may reveal that the user previously asked about managing knee pain. The search transformer module 308*c* could incorporate this context to generate a search query emphasizing low-impact exercises suitable for individuals with knee issues. Similarly, user profile information, such as age, fitness level, or medical conditions, could further refine the query, ensuring that the search results are highly relevant and personalized. In another scenario, if the user query is "Find recipes for a healthy diet," and the profile data indicates dietary preferences or restrictions (e.g., vegetarian or gluten-free), the search transformer module may adjust the search query to include those parameters. For instance, it might generate search queries like "vegetarian recipes for a healthy diet" or "gluten-free recipes for weight management," ensuring that the results align with the user's needs and preferences.

Each resource stored in the database 154 may be an article comprising different components such as a title component, a description component, a search description component, a search content component, and a search text component. Additionally, the database 154 may store a plurality of databases, where each database may store search data tailored to a specific search process (e.g., search transformer and/or search engine). Each search transformer may transform each component of the article into search data corresponding to the search engine. For example, the keyword search transformer may apply to each component of the article to determine title component keywords, search description component keywords, search content component keywords, and search text component keywords. These keyword search data may then be stored into a keyword search database. Similarly, the semantic search transformer may apply to each component of the article to determine title component semantic vector(s), search description component semantic vectors(s), search content component semantic vector(s), search description component semantic vector(s), search content component semantic vector(s), and search text component semantic vector(s). The semantic search transformer may apply the vector embedding model to each word, sentence, and/or paragraph when determining semantic vector(s). These semantic search data may then be stored into a semantic search database.

The search engine module 308*d* may comprise a plurality of search engines, such as a keyword search engine and a semantic search engine, to process the plurality of search queries and obtain a plurality of search results. In some embodiments, a single search engine may comprise a plurality of search features. For example, a hybrid search engine may comprise both keyword search function of the keyword search engine, and semantic search function of the semantic search engine. In other embodiments, the search engine module 308*d* may comprise one or more search engines. Each search engine in the plurality of search engines processes a search query determined by a corresponding search transformer to generate one or more search results. For example, the keyword search engine may utilize a keyword search query generated by the keyword search transformer, which may consist of relevant keywords extracted from the filtered preprocessed query. The keyword search engine compares these keywords with entries in the keyword search database stored in the database 154 to retrieve matching resources (e.g., articles or documents). If the query is "flu treatment," the keyword search engine might locate entries in the keyword search database containing exact matches or related terms like "treatment for influenza" or "flu remedies." Similarly, the semantic search engine may process a semantic search query, which may be represented as a vector generated by the semantic search transformer. This vector may capture the contextual and semantic meaning of the original query. The semantic search engine may compare this vector against vector embeddings of resources (e.g., articles or documents) stored in the semantic search database to identify the resources that are semantically similar. For instance, if the semantic search query vector represents "effective treatments for colds," the semantic search engine may retrieve resources such as "home remedies for common colds," "over-the-counter medications for colds," or "best practices for cold recovery." These results may be determined based on their proximity in the vector space, reflecting conceptual similarities.

In addition, the faceted search engine may process a faceted search query generated by the faceted search transformer. This faceted search engine may identify and utilize structured attributes (e.g., medical specialty, insurance provider, or provider ratings) extracted from the filtered preprocessed query. For example, if the user's query is "Find a cardiologist near me who accepts Blue Cross and has a four-star rating or higher," the faceted search transformer may generate a faceted query specifying "specialty=cardiology," "location=near me," "insurance=Blue Cross," and "rating=4+ stars." The faceted search engine may then filter results in the faceted search database by these attributes, systematically narrowing the search space to cardiologists who match the user's location, accept Blue Cross, and meet the specified rating threshold.

Each search engine may output a score depending on the relevance of the search results to the respective search query. For example, the keyword search engine may determine one or more scores for the keyword search results based on the frequency of relevant keywords from the keyword search query appearing in the search results. For instance, if the keyword search query is "flu symptoms," the search engine might analyze the frequency and prominence of the terms "flu" and "symptoms" in the search results. An article with multiple occurrences of "flu symptoms" might receive a higher score compared to one where these terms appear only sparsely. The semantic search engine, on the other hand, may determine one or more scores for the semantic search results based on the semantic similarity between the vector embedding of the semantic search query and the vector embeddings of the search results. This similarity can be quantified using metrics such as cosine similarity or Euclidean distance, or any other suitable metric(s), where a smaller vector distance indicates a closer semantic match. For instance, if the semantic search query represents "effective treatments for migraines," an article vector embedding related to "managing migraine pain" or "best migraine medications" might have a smaller vector distance and therefore receive a higher score than an article about "headache prevention," which is less contextually aligned with the original query.

Each search engine may comprise different parameters tuned with different weights or options to output a search score for a search result. For instance, the semantic search engine may comprise several configurable parameters to fine-tune its behavior and scoring. The score range for each search engine, as well as the maximum number of search results returned, can be configured. These parameters may include choosing a vector embedding model (e.g., emb_model parameter) among different vector embedding models, choosing a specific metric (emb_metric parameter) to calculate vector distance (e.g., cosine distance, Euclidean distance, etc.), scoring threshold or range (e.g., emb_threshold parameter), and/or the maximum amount of results (e.g., articles) in a semantic search (e.g., emb_max_results parameter).

In another instance, the keyword search engine may comprise several configurable parameters to fine-tune its behavior and relevance scoring. These parameters may include a fuzziness parameter to determine the number of allowed changes (e.g., substitutions, deletions, or additions) in the keywords in the keyword search query, and a fuzzy transposition option to allow or disallow swapping of adjacent characters. It may also support a zero terms query parameter, which specifies how to handle keywords in the keyword search query with no meaningful terms (e.g., "or," "of," "and"), such as by returning default results or prompting for refinement. Additionally, the keyword search engine may include a word match operator parameter, which defines how to combine keywords in the keyword search query (e.g., "capital" OR "Hungary" OR "Europe" or "capital" AND "Hungary" AND "Europe").

The configurable parameters may also include a scoring mechanism parameter. The scoring mechanism parameter may offer flexibility through different search query modes. A best field mode may determine the score based on matching keywords found in the single best article component (e.g., title, description, etc.). For example, if the keywords are "brown fox," an article with the "brown" and "fox" in the title would score higher than one with just "brown" in the title and just "fox" in the description. A most field mode may combine the scores from all matching keywords across multiple components of an article. For instance, if the keywords are "renewable solar energy," and the title contains "solar," the description contains "energy," and the search text contains "renewable," the scores from all the components would be combined, favoring articles with broader keyword coverage. A cross-field mode may treat certain components of an article as a single combined component to capture matches across multiple sections. For example, if the keywords are "renewable resources," title and description may be viewed as a combined component, and an article with "renewable" in the title and "resources" in the description would be treated as a single match, ensuring relevance even when terms are distributed across components. A phrase mode retrieves results based on exact phrases of the keywords in the keyword search query, scoring them based on their match within the best component. For example, if the query is "climate change impacts," the scoring would prioritize articles where the phrase "climate change impacts" appears exactly in one component, rather than having just "climate" or "change." A phrase prefix mode may enable matches for keywords with partially completed terms (e.g., prefixes) and determine the score based on the single best-matching component of an article. For example, if the keywords are "bro ani," an article with the phrase "brown" and "animal" in the title would score higher than one with just "brown" in the title and just "animal" in the description. A Boolean prefix mode may enable matches for keywords with prefixes while combining the scores from all matching prefix keywords across multiple components of an article. For instance, if the keywords are "renew solar energy," and the title contains "solar," the description contains "energy," and the search text contains "renewable," the scores from all the components would be combined, favoring articles with broader comprehensive coverage.

Other configurable parameters may include, e.g., a maximum expansion parameter, which sets the maximum number of terms to which the keywords in the keyword search query may be, and a prefix length parameter, which specifies the number of initial characters that must remain unchanged for fuzzy matching. Additionally, a custom filters parameter may allow the integration of custom filters in the key word search engine, enabling tailored adjustments to refine search results based on specific needs. A stemmer parameter may provide a mechanism to reduce words to their essential stem, enhancing the keyword search engine's ability to recognize variations of a term. A stop words parameter may enable the use of a language dictionary to exclude common stop words, such as "and" or "the," ensuring they do not interfere with the relevance of search results. Furthermore, a text search type parameter may allow control over switching different search mode in the keyword search engine, enabling toggling between full-text searches and phrase-based searches to better match the user's intent. These configurable parameters are not limited to those listed here, as additional parameters may be added to adapt the keyword search engine for different contexts and requirements.

In some embodiments, the search engine module **308*d* may tune the boost weights of each article component parameter to emphasize certain components as more important in determining relevance. These weights may be applied as multipliers to the scores determined for each article component, adjusting their impact on the overall score of the search results. For example, if the title of an article is deemed more significant for a specific search query type, a higher weight might be assigned to it. For instance, if the base score for a title match is 5 and the weight for the title is set to 2, the adjusted score for the title would become 10. Conversely, components like the search text, which may include the full content of an article, might be assigned a lower weight to reduce their influence if they are considered less relevant for the query. The search engine module 308*d* may additionally have a minimum boost weight for all components of the article. For example, if the title has a weight of 0.1 and the minimum boost weight is 0.2, the title weight would be ignored and the minimum boost weight will then be used. The search engine module 308*d*** may comprise additional overall weight that could be multiplied to all the components in addition to the specific component boost weight.

Different search engines may assign varying boost weights to components depending on their search methodologies. For instance, in a keyword search engine, the boost weight for the title may be set to 3 to reflect the title's critical role in matching keywords, whereas in a semantic search engine or a hybrid search engine (which combines keyword and semantic search methods), the boost weight for the title might be set to 1, reflecting a broader distribution of relevance across components.

The ranking module **308*e* may rank the plurality of search results based on their respective search scores. To ensure fair and accurate ranking, the ranking module 308*e* may adjust for differences in scoring systems across various search engines. For instance, the overall score from the keyword search engine may be inflated because its scoring range is from 1 to 100, while the semantic search engine operates on a scoring range from 0 to 1. The ranking module 308*e* may normalize these scores to a common scale, ensuring that the results are compared and ranked fairly regardless of their original scoring system. Additionally, the ranking module 308*e*** may be tuned to prioritize search results from certain search engines over others based on context or application requirements. For example, in a scenario where exact keyword matches are more important (e.g., legal document searches), the ranking module may assign higher weight to results from the keyword search engine. Conversely, in contexts where conceptual understanding is more valuable (e.g., medical research queries), the module may prioritize results from the semantic search engine by giving their scores greater influence in the overall ranking. The dynamic and adaptable ranking system enables the plurality of search engines to produce results that best meet the intent and context of the user query while leveraging the strengths of different search engines.

In some embodiments, the scores from multiple search engines may be combined for search results that overlap across different engines. For example, if a search result generated by the keyword search engine matches a result generated by the semantic search engine, the scores from both engines may be aggregated to produce a composite score for that result. This aggregated score may then be used in ranking by the ranking module **308*e***. In other embodiments, a hybrid search engine, which integrates both keyword and semantic search functionalities, may already calculate a unified score that reflects contributions from the both functionalities.

Upon determining the ranked plurality of search results, the search server 302 may transmit the initial input (e.g., the user's query) and the ranked plurality of search results to a large language model hosted on the language model server 202. The large language model may generate a search response to the initial input based on the ranked plurality of search results. It may operate independently of the plurality of search engines, meaning it may not rely on or interact with the processes used by the search engines to generate the search results. Instead, the search engines may independently process the initial query to retrieve relevant articles, delegating the task of formulating a search response to the large language model. This task of formulating a search response (e.g., by selecting one or more search results among the plurality of search results) based on the plurality of search results may be a generalizable function that other language models can also perform. Therefore, in some embodiments, the large language model may be replaced with other language models hosted on different language model servers, ensuring flexibility and adaptability in the system design.

The training module 308*f* may be designed to train the weights and configure various parameters for different search engines. The training module 308*f* may allow users to manually adjust the weights and parameters to fine-tune the performance of each search engine. In some embodiments, the training module 308*f* may automatically update these weights or parameters using a simulation tool that iteratively modifies the parameters until each search engine produces the desired reference search results. The training module 308*f* may include training data comprising a plurality of initial inputs and corresponding search results. For example, it may consist of predefined keyword search queries and their corresponding desired keyword search results. During training, if the keyword search engine fails to produce the expected results, the module may iteratively adjust the weights and parameter options until the desired results are achieved. Similarly, the training module 308*f* can also tune the weights of different article components to improve the relevance of search results. For instance, it may adjust the boost parameters assigned to specific article components, such as titles, descriptions, or search content, to ensure the desired keyword search results are obtained. In further embodiments, the training module 308*f* may additionally train the parameters for the ranking module 308*e* to obtain desired ranked plurality of search results. This comprehensive approach enables precise tuning of search engine parameters, article component weights, and ranking parameters, ensuring that the system delivers accurate and contextually relevant search results.

The plurality of search engines and/or a large language model may include other tunable (e.g., trainable) parameters. The training module 308*f* may configure these parameters to optimize performance based on specific requirements. The abbreviations parameter (Boolean) can enable pre-search abbreviation substitution, allowing the system to replace commonly used abbreviations with their full forms before processing a query. The elastic_stopwords parameter (Boolean) can enable the stopword function of the plurality of search engines to disregard common, insignificant words during searches. Similarly, the elastic_synonyms parameter (Boolean) can allow for synonym equivalence within the plurality of search engines, ensuring a broader match for semantically related terms. The emb_metric parameter (string) can specify the function used for semantic similarity matching, with "cosine" being the default metric. The emb_model parameter (string) can define the vector embedding model used for semantic searches, including the vendor (e.g., Google Vertex AI or OpenAI) and the specific trained model. The emb_threshold parameter (float) can set the cutoff for vector similarity, ensuring that only results above a certain semantic similarity score are included. The embed_abbreviations parameter (Boolean) can enable abbreviation substitution during indexing, improving consistency in search results. The hybrid_search_min_score parameter (float) can establish the minimum score for results to be included in the final result set. The llm_model parameter (string) can specify the name and vendor of the large language model used for chat completions. The llm_moderation parameter (Boolean) can enable search result moderation and reranking through the LLM. The max_results (integer) parameter can define the maximum number of results returned. The query_max_len (integer) can truncate initial input text beyond a specified length to ensure efficiency. The query_relevancy_validation parameter (Boolean) can enable a pre-search relevancy check using an LLM to ensure the query aligns with the system's context. The query_rewrite parameter (Boolean) can allow for pre-search LLM-driven rewriting of queries from phrases to keywords for improved search accuracy. The web_purify parameter (Boolean) can pass initial input through a profanity check during preprocessing, ensuring that inappropriate language is filtered out.

The simulation tool may iteratively refine search engine parameters, article component weights, and ranking parameters to achieve desired performance benchmarks. By utilizing the training data comprising a plurality of initial inputs and corresponding search results, the simulation tool may ensure that for each given input, the search engines produce the expected outputs. In some embodiments, the simulation tool may also generate its own training data, allowing it to autonomously create diverse test cases to iteratively modify parameters and meet performance goals.

The simulation tool may use predefined reference search results—either from the provided training data or the data it generates—as benchmarks for relevance and accuracy. By comparing the search engine outputs to these benchmarks, the simulation tool may identify discrepancies and adjust parameters accordingly. These adjustments may involve fine-tuning weights assigned to specific article components, recalibrating keyword matching thresholds, or modifying vector distance metrics in semantic search engines. Advanced optimization techniques, such as gradient-based learning or reinforcement learning, may guide these adjustments to ensure iterative and systematic improvement.

Additionally, the simulation tool may incorporate variability into its test cases, introducing elements such as synonyms, abbreviations, and domain-specific terminology. This adaptability may ensure that the search engines are well-equipped to handle diverse and evolving user queries, delivering accurate, relevant, and contextually appropriate search results.

Depending on the specific task assigned to a specialized agent, the training module 308*f* may train the weights and configure various parameters for different search engines to optimize their outputs for the agent's needs. For example, the training module 308*f* may train the plurality of search engines for a conversational agent to prioritize search results that are more user-friendly, concise, and contextually relevant for natural language interactions. These results might emphasize articles with straightforward explanations or FAQs that align with conversational use cases. In contrast, the plurality of search engines for a scheduling agent may be trained to prioritize search results that include actionable data, such as doctor availability, contact information, and links to appointment booking pages. These results may focus on extracting structured information relevant to scheduling tasks, ensuring that the agent can perform its function effectively.

The agent specific module 308*g* may include additional functionalities tailored to the specific tasks of different agents. The search server 302 can configure these agents, such as a scheduling agent, conversational agent, recommendation agent, and others described in reference to FIG. 6A, to perform various tasks, including scheduling appointments with doctors, identifying appropriate healthcare providers, or locating suitable pharmacies. The functionalities of the agent specific module 308*g* are designed to align with the type of agent and the specific task it is assigned to perform. These functionalities may integrate with one or more third-party APIs to execute tasks using the ranked plurality of search results. For example, for a scheduling agent, once the plurality of search results (e.g., a doctor's website as identified in the initial query from relevant articles) has been determined, the agent specific module 308*g* may use a third-party API to schedule an appointment with the doctor directly.

The orchestration module 310 may coordinate a plurality of specialized agents, each equipped with an agent module 308. Each agent may comprise its own plurality of search engines, trained to generate search results tailored to the agent's specific task (by using the training module 308*f*), and an agent specific module 308*g* that provides additional functionalities required to fulfill the task effectively. The orchestration module 310 may analyze the user's initial input and determine the most appropriate specialized agent to handle the request. It can then transmit the user's input to the selected agent, ensuring the response is tailored to the user's query. For example, if the user asks a question regarding medication coverage, the orchestration module 310 may select a coverage-checking agent to provide the relevant information. Alternatively, if the user requests to schedule an appointment with a doctor, the orchestration module 310 may delegate the task to a scheduling agent, which can handle the appointment booking.

The orchestration module 310 may leverage a large language model (e.g., from the language model server) to determine which specialized agent is best suited to handle the user's initial input. This large language model may be the same as, or different from, the one used to generate a search response. To make this determination, the orchestration module 310 may provide the large language model with descriptions of the available agents, including their specific functionalities, along with the user's initial input. Based on this information, the large language model analyzes the input and identifies the most appropriate agent to handle the task, ensuring that the query is routed efficiently and accurately.

The chat interface module 311 may provide a chatbot or a chat interface to one or more client devices 106-116, allowing users to input queries and view search responses. The chat interface may display the user's chat history for the current session and, in some cases, may incorporate user profile information, including past chat history retrieved from an external server 402. The search server 302 may utilize the plurality of search engines to process the plurality of search queries along with the chat history data when determining the search results. Similarly, the large language model may reference the chat history data when generating the search response, ensuring that the search response is contextually relevant and tailored to the ongoing interaction. This integration of chat history enhances continuity and personalization in the user experience. Examples of the chat interface are further illustrated in FIGS. 7A-7D.

The data inclusion module 312 may identify data to be included in the database 154, which may store pre-approved data that is compliant with one or more regulations and/or specific to a particular domain. To achieve this, the data inclusion module 312 may analyze general data (e.g., specific to a particular domain such as healthcare) to identify candidate data for potential inclusion in the pre-approved data, ensuring it satisfies the required regulatory standards (e.g., specific to a particular domain). The module may leverage a machine learning model to analyze patterns, relevance, and context within the general data that align with these regulations. In some embodiments, the data inclusion module 312 may not only identify but also generate candidate data. For example, the machine learning model may synthesize new content, such as summaries, explanations, or refined datasets derived from the general data. In some embodiments, the data inclusion module 312 may implement another machine learning model (which may be fine-tuned, e.g., by utilizing inputs from different professionals or domain experts) to approve the candidate data identified or generated by the machine learning model, verifying whether the candidate data is aligned with the one or more regulations.

The data inclusion module 312 may transmit the candidate data to a regulatory agency for evaluation, ensuring compliance with one or more regulations before inclusion in the pre-approved data. Upon receiving a response from the regulatory agency, the data inclusion module 312 may utilize a machine learning model to interpret the response. The module may then filter out candidate data that were excluded based on the regulatory agency's feedback and include only the approved candidate data in the pre-approved data stored within the database 154. Furthermore, the machine learning model may adapt and refine its understanding of regulatory requirements by training on the responses received from the regulatory agency. This iterative process enables the model to improve its ability to identify and generate candidate data that align with the regulatory agency's standards, ensuring future submissions are more likely to meet approval criteria.

As an illustrative example, the data inclusion module 312 may analyze general health data to identify candidate data for potential inclusion in the pre-approved data while ensuring compliance with regulations such as HIPAA or FDA requirements. The data inclusion module 312 may leverage a machine learning model to evaluate patterns and context within the health data, enabling it to identify or generate candidate data that aligns with regulatory standards. Once the candidate data is identified, the data inclusion module 312 transmits it to a health regulatory agency for review and approval. Upon receiving a response from the regulatory agency, the data inclusion module 312 employs the machine learning model to interpret the feedback. Approved candidate data is then incorporated into the pre-approved data stored in the database, ensuring compliance and enhancing the reliability of the database. This streamlined process allows the system to dynamically adapt to regulatory requirements while maintaining the integrity of the data.

In some embodiments, the data inclusion module 312 may receive data to be included in the database 154 from external servers. The data received from the external servers may be pre-approved data that is compliant with one or more regulations and/or specific to a particular domain. In some other embodiments, the data inclusion module 312 may utilize analytics data (from analytics module 314) to request additional content (e.g., relevant articles) to an external server (e.g., external server 402) based on these analytics. For example, if the system detects a high volume of inquiries about "headaches," the search server 302 may request that external server 402 provide more relevant articles related to "headaches." The data inclusion module 312, upon request, may receive the additional content from the external server and add the additional content to the database 154 (e.g., update the pre-approved data with additional content). The search server may then utilize the additional content in the database 154 when generating a response to the user inquiry.

Regardless, the data inclusion module 312 may store the candidate data, ensuring that the database 154 remains highly reliable and accurate. This rigorous process ensures that the search results generated by the plurality of search engines based on the database 154 are relevant, accurate, and fully compliant with the required regulations. By minimizing the risk of misinformation, the search server 302 can support the development of high-quality, trustworthy search results.

The analytics module 314 may analyze various aspects of user interactions to improve the system's performance and enhance the user experience. For instance, the analytics module 314 may evaluate different requests made by users, identify the types of responses that users found most helpful or engaging, and recognize abbreviations or shorthand commonly used by users in their queries. Additionally, the analytics module 314 may track the types of queries submitted, the frequency of specific topics, and/or patterns in user behavior over time. The analytics made by the analytics module 314 may be utilized to refine different aspects of the search server 302. For example, if the analytics module identifies that users frequently use abbreviations like "BP" for "blood pressure" or "HR" for "heart rate," the analytics module 314 may relay this information to the agent module 308 (specifically preprocessing module 308*a*) to ensure that the system recognizes and correctly processes these abbreviations in future queries. The user responses may also be utilized by the training module 308*f* to tune one or more search engines to generate search results that are more tailored to the user. By leveraging these insights, the analytics module 314 may help optimize the system's functionality, ensuring that it delivers more relevant, accurate, and user-centric search results and responses. The analytics module 314 may employ machine learning models and/or various analytic techniques (e.g., data clustering, correlation analysis, or anomaly detection) to perform these analyses.

The networking interface 306 may enable the search server 302 to communicate with other devices, and/or any other suitable devices or combinations thereof. The networking interface 306 may support wired or wireless communications, such as USB, Bluetooth, Wi-Fi Direct, Near Field Communication (NFC), etc. The networking interface 306 may enable the search server 302 to communicate via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc. Moreover, the network may be a single communication network, or may include multiple communication networks of one or more types (e.g., one or more wired and/or PANs or LANs, and/or one or more WANs such as the Internet).

More generally, the one or more processors 304 may include any suitable number of processors and/or processor types. For example, the processors 304 may include one or more CPUs and one or more graphics processing units (GPUs). Generally, each of the processors 304 may be configured to execute software instructions stored in the corresponding one or more memories 307. The memories 307 may include one or more persistent memories (e.g., a hard drive and/or solid-state memory) and may store one or more applications, modules, and/or models, such as the agent module 308, orchestration module 310, chat interface module 311, etc.

Figure 4:
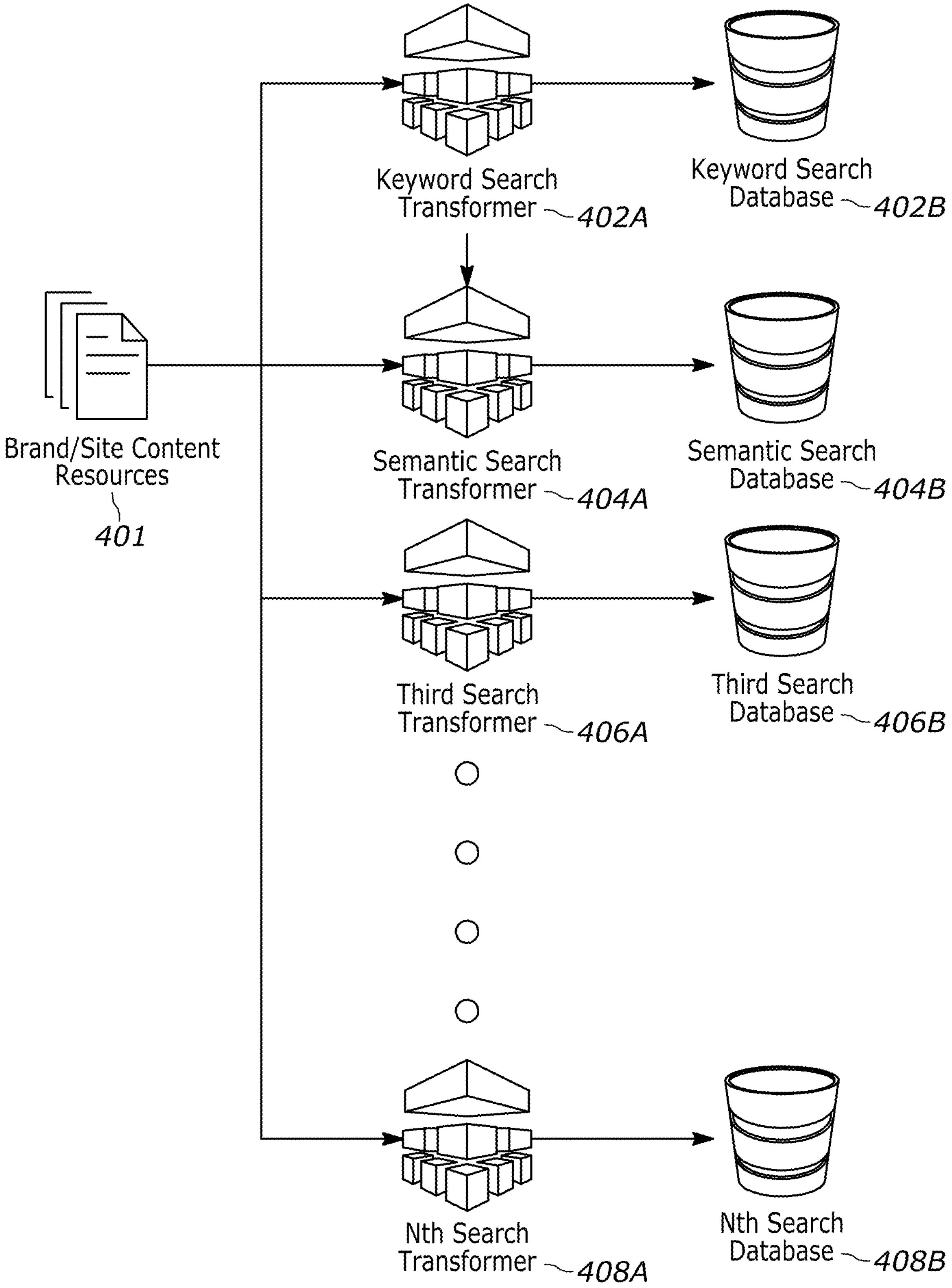
FIG. 4 is an example flow diagram of resources (e.g., pre-approved data) being stored into respective databases utilizing different search transformers.

FIG. 4 illustrates an example flow diagram of how resources 401 are stored into respective databases using different search transformers. These respective databases may collectively reside within the database 154, as depicted in FIG. 1. The resources 401 may serve as the foundational dataset that the search engines utilize to generate one or more search results. The resources 401 may consist of articles or documents specific to a particular domain, ensuring that the search system is tailored to its intended use case. In some embodiments, the resources may include pre-approved data that complies with one or more regulatory requirements. Each article or document may be organized into distinct components, such as a title component, description component, search component, search description component, search content component, and search text component, to facilitate precise indexing and retrieval during search operations.

The resources 401 may be transformed by a plurality of search transformers to generate a plurality of search data, with each search data tailored for storage in a respective search engine database. For instance, a keyword search transformer 402A may process the resources to extract relevant keywords, which are then stored in a keyword search database 402B. Similarly, a semantic search transformer 404A may analyze the resources to create vector embeddings that represent the semantic meaning of the content, which are subsequently stored in the semantic search database 404B. By transforming and distributing the resources into these specialized search engine databases, the search server ensures that each search engine can efficiently find relevant search results.

As an illustrative example, if the resources 401 include an article on "renewable energy innovations," the keyword search transformer 402A may identify and store keywords such as "renewable," "energy," and "innovations" in the keyword search database 402B. Concurrently, the semantic search transformer 404A can generate vector embeddings of the article and store them in the semantic search database 404B. When a user queries "latest advancements in green technology," the keyword search engine can retrieve the article by matching the stored keywords ("renewable," "energy," "innovations"), while the semantic search engine can compare the query's vector embeddings against the article's embeddings. If they lie in close proximity—indicating conceptual similarity—the semantic search engine will also retrieve that article as a relevant result.

In some embodiments, the articles may consist of multiple components. To optimize search functionality, the search server 302 may apply the plurality of search transformers to each individual component of the article and store the relevant search data accordingly. For instance, the keyword search transformer 402A may extract relevant keywords separately from the title component, description component, search content component, and other article components. These keywords that may be separated per component of the article may then be stored in the keyword search database 402B.

When the keyword search engine retrieves one or more search results in response to a keyword search query, it may analyze the keywords from the query across each component of the article. The keyword search engine may then determine the score of the article based on various criteria, such as the number of matching keywords within a single component or the cumulative keyword matches across all components. This granular approach ensures precise scoring and ranking of articles, allowing the system to deliver search results that are both accurate and contextually relevant to the user's query.

The search transformers and search databases may not be limited to keyword searching and semantic searching, but may include other search techniques. This may include, but is not limited to, faceted searching, which may categorize or tag queries according to structured attributes (e.g., domain-specific categories, price ranges, user-defined tags) to systematically narrow results; geographic searching, which focuses on location-based queries and stores spatial data for retrieving region-specific results; temporal searching, which prioritizes time-sensitive data such as publication dates or event schedules to answer queries requiring chronological context; image-based searching, which may analyze visual data and store corresponding features, enabling retrieval of results based on image similarity; and hybrid searching, which may combine multiple search techniques to provide comprehensive results. Any of these search techniques may be embodied by the third search transformer 406A and/or the Nth search transformer 408A, where N is any integer value. The search server may utilize transformers 406A, 408A to transform the resources into specialized search data and store the specialized search data in their respective search databases, such as the third search database 406B and the Nth search database 408B. The search server may then utilize one or more corresponding search engines (e.g., geographic search engine, temporal search engine, image-based search engine, hybrid search engine, etc.) to find relevant search results based on respective search databases (third search database 406B and the Nth search database 408B).

Figure 5:
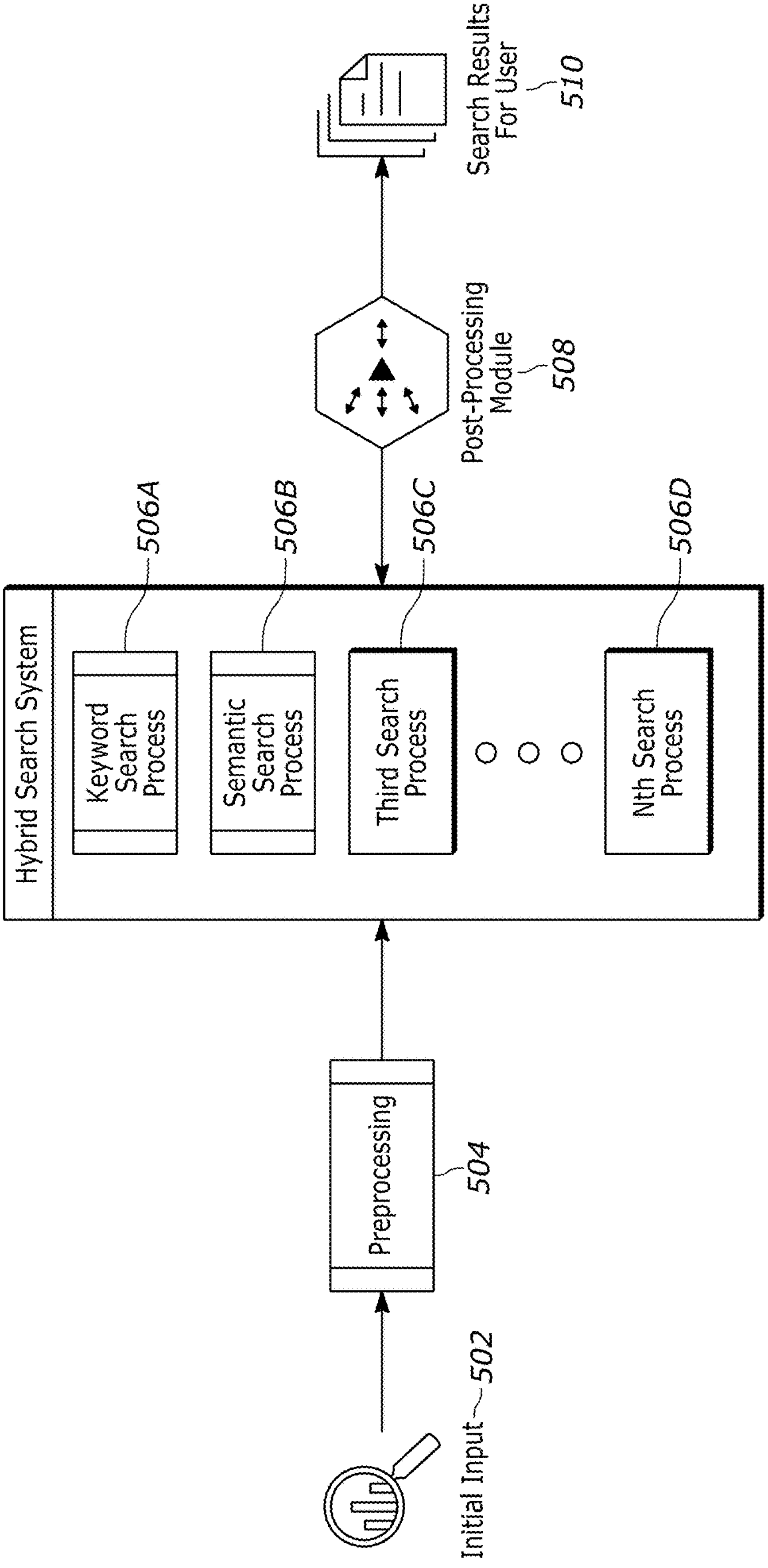
FIG. 5 is a flow diagram of generating a plurality of search results, according to some embodiments.

FIG. 5 illustrates a flow diagram of a search server (e.g., search server 302) generating a plurality of search results 510 for an initial input 502. Upon receiving the initial input 502, the preprocessing 504 module may preprocess the initial input by performing tasks such as removing offensive terms, converting abbreviations, truncating the input to a predefined word limit, and more. Further details about the preprocessing functionality are described in the preprocessing module 308*a*. The preprocessing 504 may also check whether the preprocessed query is contextually relevant to the search server 302. The process of determining contextual relevancy is detailed in the filtering module 308*b*.

Once the filtered preprocessed query is determined, the plurality of search processes 506 may process the query to generate one or more search results. Each search process consists of a search transformer and a search engine. For instance, a keyword search process 506A may include a keyword search transformer and a keyword search engine. Similarly, a semantic search process 506B may include a semantic search transformer and a semantic search engine. Each search transformer processes the filtered preprocessed query to generate a corresponding search query, which the associated search engine uses to retrieve one or more search results. The search processes are not limited to keyword and semantic search processes; they can include other search techniques as well (as illustrated in search processes 506C and 506D). The search server may then score retrieved search results based on their relevance to the initial input 502. Details of the search transformers can be found in the search transformer module 308*c*, and details about the search engines can be found in the search engine module 308*d* of FIG. 3.

As an illustrative example, the keyword search transformer may transform the filtered preprocessed query into a keyword search query consisting of keywords relevant to the initial input. The keyword search engine may then compare the keywords with keyword search data stored in the keyword search database and determine one or more keyword search results.

Each search process within the plurality of search processes 506 may generate one or more search results. A post-processing module 508 may then ranks the plurality of search results from the plurality of search processes 506 according to the scores assigned by each search process. Further details about the ranking procedure are described in the ranking module 308*e* of FIG. 3. The search server 302 may then generate the ranked plurality of search results 510. Although not illustrated in FIG. 5, the ranked plurality of search results 510 may be transmitted along with the initial input 502 to a large language model to generate a final search response.

As an illustrative example, the search server may be implemented on a healthcare provider (HCP)-focused site for an oncology patient support program. A user query (e.g., initial input), such as "Who is a nurse," may indicate the user's intent to learn about the nurse advocate program. The search server may process the initial input through a series of steps to generate a ranked set of search results tailored to the query.

Upon receiving the user query, the search server may first evaluate the query for profanity. In this example, no offensive terms were detected. The search server may then apply an abbreviation substitution process as requested by the client, expanding the query to "Who is a nurse (Your Nurse Advocate)." The search server may subsequently be evaluate the query for relevancy, where it achieved a score of 4/5, indicating sufficient relevance for further processing (with 0 indicating rejection). These steps may all be part of the preprocessing step (preprocessing 504).

The search server may rewrite the query to focus on specific keywords (e.g., keyword search transformer), generating the keyword search query "nurse advocate." The search server may then process the keyword search query using the keyword search engine using various configuration settings. The search server may additionally rewrite the keyword search query into a vector to generate a semantic search query using a semantic search transformer. The search server may then process the semantic search query using the semantic search engine using various configuration settings. The configuration may include parameters such as a text title boost of 8, text description title boost of 2, text search description boost of 10, and text search text boost of 1. These may be the boost parameters of article components for keyword search engine. Similarly, parameters for dense vector-based (i.e., semantic) searches include dense title boost of 2.2, dense description title boost of 2, dense search description boost of 8, dense search text boost of 2, and dense search contents boost of 2. Other search configurations may include setting fuzziness to 0 (no fuzzy searching), disabling fuzzy transpositions, allowing zero-term queries, employing a "best fields" scoring method, a maximum of one fuzzy expansion, and a 25-character prefix preventing fuzzy transpositions. Additional configurations may include the use of an "OR" operator, a default stemmer, English stopwords, no custom filters, and a full-text search type. These steps process may be part of the plurality of search processes 506.

The plurality of search processes may retrieve five articles, each ranked based on their respective scores derived from various matching components. The top-ranked article, "Will I always be speaking to the same Oncology Nurse Advocate?", achieved a total score of 65.3. This score included a boosted match in the search description (e.g., keyword match), contributing 42.8 to the total score. Additionally, the dense vector similarity (e.g., semantic match) contributed scores of 14.8 in the search description, 4.1 in the title, and 3.7 in the search text.

The second-ranked article, "Day-to-Day Living Support," received a total score of 60.3. This score was derived from a boosted match in the search description, which added 38.2 to the total score. Dense vector similarity further contributed 14.8 in the search description, 3.7 in the description, and 3.6 in the title, emphasizing its relevance to the query.

The third article, "Meet Your Nurse Advocate," obtained a total score of 54.3. The score included a boosted match in the title, which accounted for 42.7, making the title the most significant contributor to the ranking. Dense vector similarity added scores of 4.3 in the title, 3.7 in the description, and 3.6 in the search contents, reinforcing its alignment with the query.

The fourth-ranked article, "Bridge Supply," achieved a total score of 42.9. This score included a boosted match in the search description, contributing 39.3 to the total. Dense vector similarity in the description added 3.6 to the overall score, highlighting its relevance despite ranking lower than the preceding articles.

Finally, the article "What is the role of Oncology Nurse Advocates?" ranked fifth with a total score of 41.7. This score was driven by a boosted match in the search description, contributing 19.0, and dense vector similarity scores of 14.9 in the search description, 4.1 in the title, and 3.7 in the search text. Despite its lower overall score, the article provided relevant context to the query, rounding out the set of retrieved results. These rankings may be part of the post processing performed by the module 508.

The search server may then transmit the plurality of search results and the initial input to the large language model. The large langue model may moderate the plurality of search results appropriately, and return "Meet Your Nurse Advocate," "What is the role of Oncology Nurse Advocates?", and "Will I always be speaking to the same Oncology Nurse Advocate?"

FIG. 6A illustrates a flow diagram of an orchestration module utilizing different agents to generate a search response, according to some embodiments. Upon receiving an initial input, the orchestration module may select an agent best suited to generate a response that effectively addresses the query. Each agent 604 includes an agent module 308 along with a unique agent specific module **308*g* that provides additional functionalities tailored to the agent's specific task. For example, a scheduling agent 604A may include an agent specific module 308*g* that integrates with a third-party API to schedule an appointment with a doctor. Each agent is capable of generating a ranked plurality of search results as outlined in FIG. 5, utilizing the plurality of search processes and post-processing to deliver accurate and relevant results. The agents 604 may include, but not limited to, a scheduling agent 604A, a conversational agent 604B, a recommendation agent 604C, a coverage checking agent 604D, a patient support agent 604E, a doctor finding agent 604F, a pharmacy finding agent 604G, a next best action agent 604H, a discussion guide agent 604I, and a search agent 604**J.

The scheduling agent 604A may specialize in coordinating and scheduling appointments for users. The scheduling agent 604A may utilize the plurality of search processes and determine relevant information regarding the target (e.g., doctors) that are necessary for scheduling. It may interact with third-party APIs to facilitate the booking process, ensuring that appointments align with user preferences and availability. This agent may streamline scheduling by automating the interaction with external systems, providing users with seamless appointment confirmations and reminders.

The conversational agent 604B may engage users in natural language interactions. It may handle general queries, provide guidance, and clarify questions in a user-friendly manner. The conversational agent 604B may utilize the plurality of search processes to generate search responses that can perform tasks to answer queries, provide guidance, and provide clarifications. The conversational agent 604B may create a smooth and intuitive experience for users seeking information or assistance, acting as the first point of interaction for many inquiries.

The conversational agent 604B may comprise response ranking that enables the conversational agent 604B to perform different actions based on how confident the conversational agent 604B is in its response. For example, if the confidence level of the selected response is high, the conversational agent 604B may deliver the response directly to the user. Conversely, if the confidence level is low, the conversational agent 604B may escalate the interaction by offering alternative actions, such as connecting the user to a human operator, redirecting the query to a specialized support team, or providing additional clarification options to refine the query.

The conversational agent 604B may include various prompt templates, each designed to guide specific steps in the agent's process of understanding user queries and selecting appropriate responses. These prompt templates may leverage large language models to enhance their functionality, enabling the conversational agent to interpret user input with greater accuracy. Additionally, each prompt template can be fine-tuned or customized (e.g., giving example instructions) to optimize the agent's ability to generate contextually appropriate and accurate responses.

A user interaction prompt template may determine user intention. The user interaction prompt template may guide the conversational agent in identifying the purpose or context of a user's query by analyzing the input text. By leveraging the user interaction prompt template, the conversational agent can establish a clear understanding of what the user is asking and the underlying intent behind the query. The user interaction template may include instructions or examples that help the AI recognize diverse user intentions, even in cases where the input is ambiguous, expressed in different languages, or includes colloquial terms. Example instructions may include "Summarize the conversation with focus on the latest context," "Keep in that the user query could be in a foreign language, if that is the case, provide the intent in English," and/or "Consider that the intention is in the context of a user on a pharmaceutical brand HCP website." The chat history of the user may also be considered in determining user intent.

As an illustrative example, if the user initially queries "copago," the conversational agent 604B may respond with an "empowering message thread highlighting how the product is suitable." Subsequently, if the user queries, "you are dumb bot," the conversational agent 604B may utilize the user interaction prompt template to analyze the context and determine the user's intention. The user interaction prompt template may interpret the query as "user is asking about copay and is not happy about the previous unrelated answer. Probably user is inquiring about copayments."

A search query prompt template may determine how the conversational agent 604B may convert a user's query into specific search queries. The search query prompt template may guide the conversational agent 604B in mapping the user's intention into actionable queries that can retrieve relevant information. For example, if the user asks, "Is this medication expensive?" the conversational agent 604B may utilize the search query prompt template to identify the user intention as seeking pricing information. Based on this intention, the conversational agent 604B may generate search queries such as "Cost," "Pricing," and "Copay." The chat history of the user may also be considered in determining the search queries.

A response selection prompt template may guide the conversational agent 604B in selecting an appropriate response based on the results of the search query. This response selection prompt template enables the conversational agent to evaluate multiple potential responses and choose the one most relevant to the user's query and intention. For instance, the template may instruct the conversational agent to "Pick one thread to respond with" from a list of candidate threads. The chat history and the user intent may also be considered in determining response.

A relevance ranking prompt template may enable the conversational agent 604B to rank the relevance of potential responses generated by search engines. This relevance may be based on their alignment with the user's query and recent conversation history. This relevance ranking prompt template may help the conversational agent 604B to determine whether a response is highly relevant, partially relevant, or not relevant to the latest user input. For example, the template may include instructions such as "Having the recent conversation history, pick the most suitable relevance option for the latest response."

The conversational agent 604B may comprise other preconfigured information, such as thread information that helps define the scope and context of its responses. Thread information may be a structured dataset that links specific queries to relevant responses, enabling the conversational agent to deliver accurate and contextually appropriate answers. The thread information may include details such as the specific questions that a given message thread answers. For example, multiple question variations can be added, such as "What is it?" alongside "What is [drug name]?" to improve the agent's ability to handle diverse user queries. Additionally, the thread information may contain a broad description of the type of information covered by the message text, such as pricing, usage instructions, or potential side effects, ensuring the agent's responses remain focused and relevant.

Figure 6B:
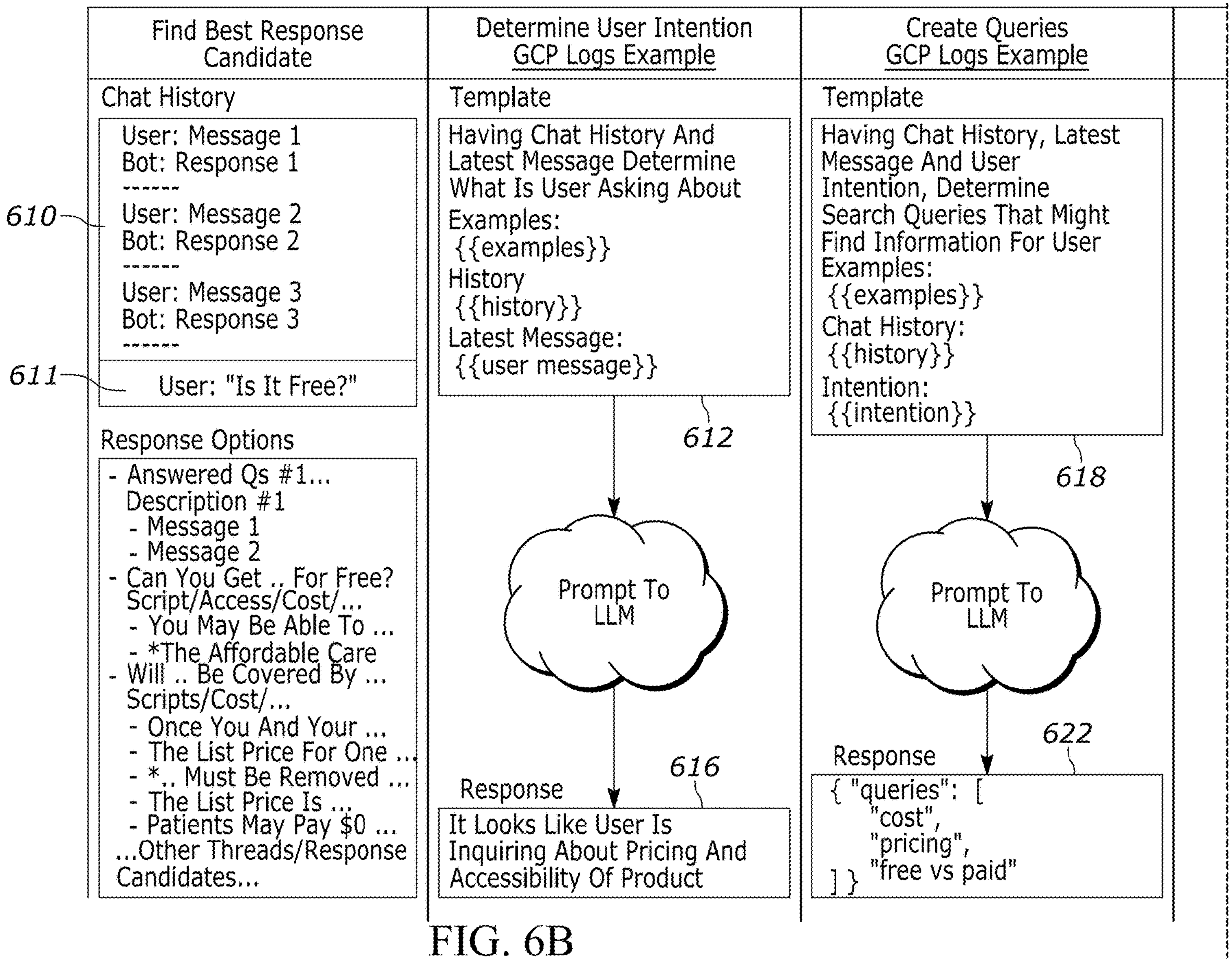
FIG. 6B is an example illustration of a search process for a conversational agent, according to some embodiments.
Figure 6B:
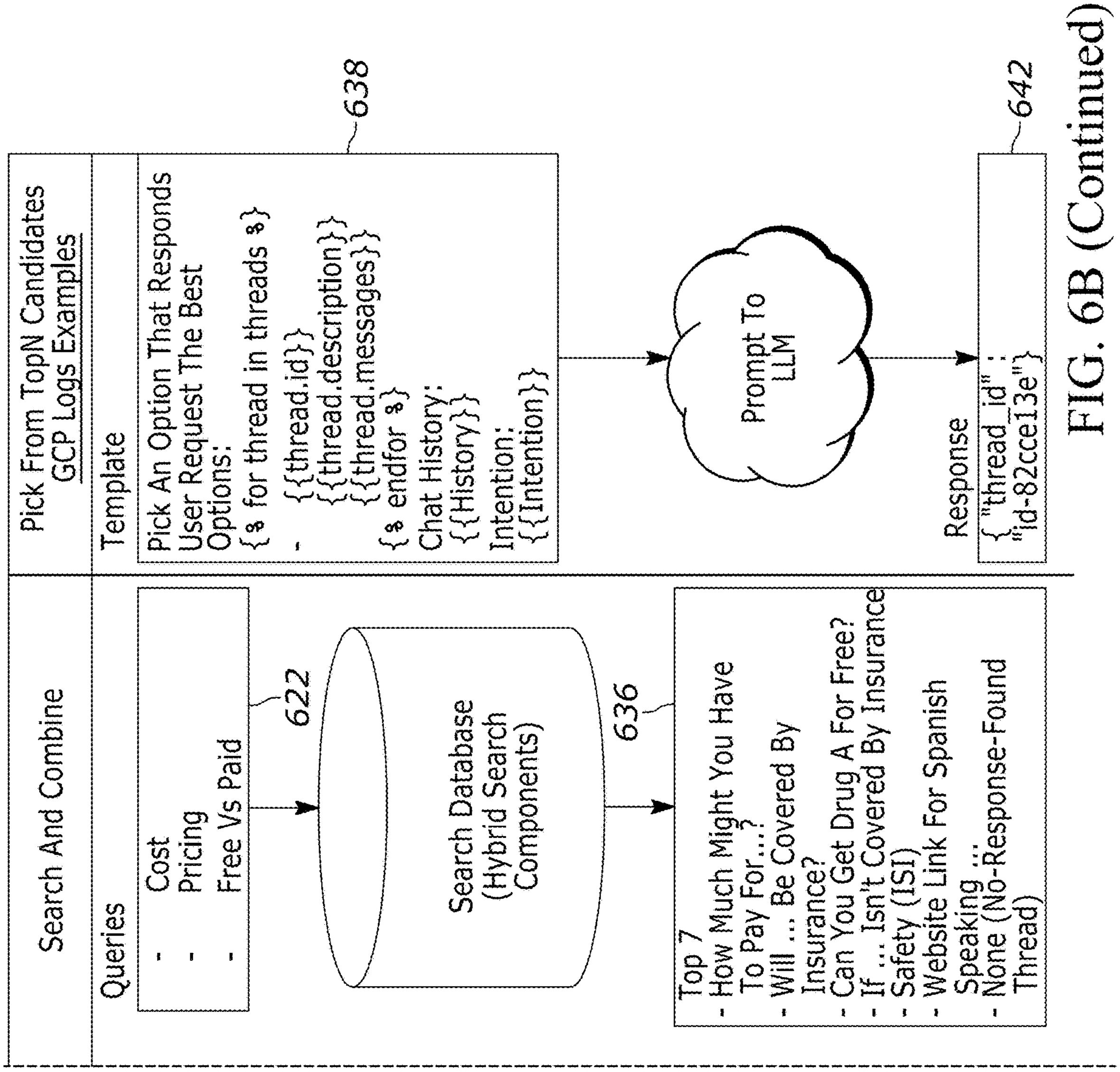

As an illustrative example of the conversational agent 604B process, refer to FIG. 6B. The conversational agent 604B may include a chat history 610 and a user query 611. For instance, the user query 611 might ask, "Is it free?" A user interaction prompt template 612 analyzes both the user query 611 and the chat history 610 to determine the user's intention. The user interaction prompt template 612 may leverage a large language model to interpret the user's intent, identifying it as, "It looks like the user is inquiring about pricing and accessibility of the product."

Based on the chat history 610, user query 611, and user intention 616, a search query prompt template 618 may transform the text input of the user query 611 into structured search queries 622. The search query prompt template 618 may also utilize a large language model to generate these queries, determining them to include terms like "Cost," "Pricing," and "Free vs. Paid." A plurality of search processes (search transformers and/or search engines) may then use the search queries 622 to generate a set of search results 636. Although not shown in FIG. 6B, a relevance ranking prompt template may rank the plurality of search results 636, prioritizing options such as "How much might you have to pay for . . . ?", "Will . . . be covered by insurance?", "Can you get Drug A for free?", "If . . . isn't covered by insurance?", "Safety (ISI)," "Website Link for Spanish Speaking . . . ," and "None."

Once the ranked search results 636 are determined, a response selection prompt 638 utilizes the chat history 610, user intention 616, and the ranked search results 636 to select the most appropriate result to generate a response 642. The response selection prompt 638 may employ a large language model to finalize and deliver the selected response 642. The chosen response 642 is then sent to the user, ensuring a contextually relevant and accurate interaction.

The recommendation agent 604C may offer personalized suggestions based on user input and contextual data (e.g., chat history, user profile data, etc.). Whether it is recommending healthcare providers, treatments, or products, this agent may provide suggestions to meet user needs and preferences, leveraging search results and user-specific data to deliver targeted recommendations.

The coverage checking agent 604D may assist users in understanding their insurance coverage. The coverage checking agent 604D may retrieve and present information about costs, coverage options, and eligibility for treatments or medications. By addressing queries about insurance, this agent may simplify complex coverage details, ensuring users have clarity on their benefits.

The patient support agent 604E may provide users with emotional and practical support. The patient support agent 604E may offer health tips, step-by-step guidance for managing conditions, and assistance with navigating treatment processes. This agent may be particularly valuable for users seeking encouragement or advice on health-related matters.

The doctor finding agent 604F may help users locate healthcare professionals tailored to their needs. The doctor finding agent 604F may use search processes to identify providers based on specialty, location, and availability. This agent may ensure that users can quickly find qualified doctors suited to their specific requirements.

The pharmacy finding agent 604G may help users in locating nearby pharmacies to fill prescriptions or purchase over-the-counter medications. The pharmacy finding agent 604G may provide details such as pharmacy locations, hours, and available services, ensuring users can access the medications they need conveniently.

The next best agent 604H may enable real-time suggestion to the next most relevant piece of content or action. The next best agent 604H may leverage More Like This (MLT) functionality, utilizing chat history or user profile data to analyze previously visited articles. The next best agent 604H may identify the top K terms with the highest term frequency-inverse document frequency (tf-idf) scores from the previously visited articles and searches for similar documents based on the K terms. For example, if a user recently interacted with an article titled "*Machine Learning in Healthcare*," which contains terms such as "machine learning," "healthcare," and "AI diagnostics," the agent may prioritize these high-scoring terms and suggest related content, such as "*AI in Medical Imaging*" article or "*Deep Learning Transforming Radiology*" article. Additionally, the next best agent 604H may analyze specific components of the articles, such as titles, descriptions, or metadata, when performing similarity matching. In some embodiments, the next best agent 604H may also consider articles that were previously recommended but not clicked on by the user, incorporating this data to avoid suggesting content that may not align with the user's preferences. These not interested articles may be stored in the chat history or user profile data.

The next best agent 604H may integrate multiple data points, including the user's initial input (e.g., initial query), previously visited articles, and articles marked as uninteresting, to provide tailored and relevant search results. In some embodiments, the next best agent 604H may employ a feedback loop to iteratively refine its recommendations. This feedback loop may allow the next best agent 604H to learn from user behavior, such as click-through rates or time spent on suggested content, enhancing the accuracy and personalization of future suggestions.

The discussion guide agent 604I may prepare users for interactions with healthcare providers. The discussion guide agent 604I may generate personalized discussion points, questions, or checklists based on the user's medical history, concerns, or upcoming appointments. This agent may ensure users are well-prepared for productive conversations with their providers.

The search agent 604J may provide users with efficient and effective access to relevant information, such as articles or other content. The search agent 604J may utilize the plurality of search engines to determine the plurality of search results, leveraging keyword, semantic, hybrid, and/or other search processes to retrieve and rank results based on the user's query. The search functionality of identifying relevant articles or generating a plurality of search results may be performed by other specialized agents, and the search agent 604J may serve as a foundational, default agent within the system. The orchestration module 602 may rely on the search agent 604J when no other specialized agent is better suited to address the user's initial input.

As an illustrative example, if the orchestration module 602 receives an initial input asking, "Where is the nearest pharmacy?" it may route the query to a pharmacy-finding agent 604G. This agent, upon receiving the initial input, may generate a plurality of search results using relevant search engines and then employ a large language model to analyze the results and determine the closest pharmacy location. This modular and dynamic approach ensures that user queries are handled by the most appropriate agent, delivering precise and context-aware responses.

Figure 7A:
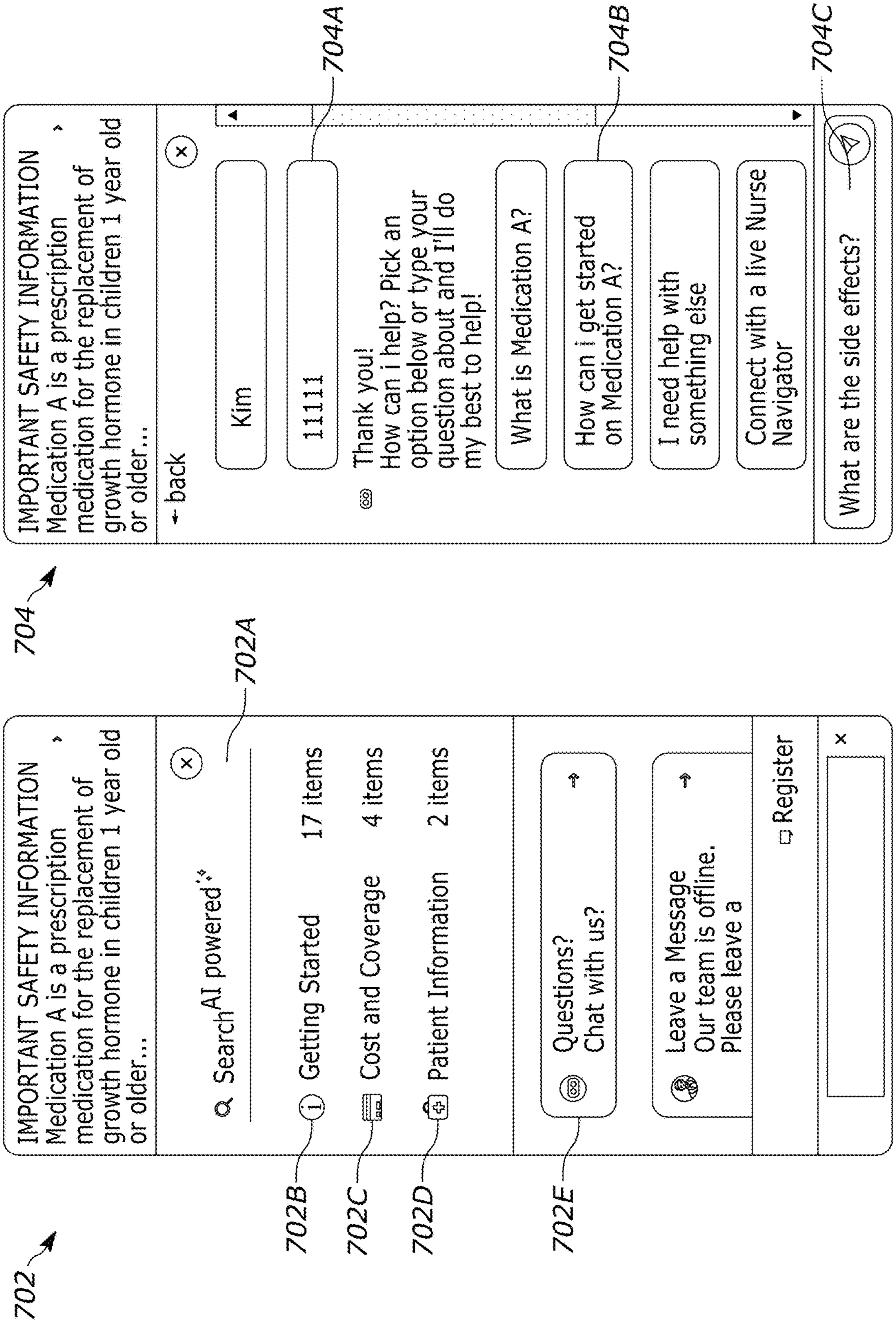
FIG. 7A illustrates an example chatbot interface, according to some embodiments.

FIGS. 7A-7E illustrate example chatbot interfaces (e.g., graphical user interfaces (GUIs)) including information (e.g., search responses) from the search server, with which a user may interact. FIG. 7A displays a start screen 702 and a conversation screen 704. In some embodiments, the user can access their profile information by connecting to an external server that stores this data, enabling the chatbot (or the search server 302) to utilize the profile information for a more personalized experience. The start screen 702 may include a search engine 702A, where the user can enter an initial input (e.g., a query) to initiate their interaction with the chatbot. The start screen 702 may provide various options, including a Getting Started option 702B, which offers basic guidance on navigating the chatbot; a Cost and Coverage option 702C, which displays information about costs and coverage that may be relevant to the user; and a Patient Information option 702D, which allows the user to input additional personal information or display current patient information. Additionally, the start screen 702 may include a Chat with Representative option 702E, enabling the user to connect with a human representative for direct assistance with their queries. The conversation screen 704 may comprise a search engine 704C that the user can enter its initial input (e.g., a query) to interact with the chatbot. The user's response may be illustrated in user messages 704A and the chatbot responses may be illustrated in chatbot messages 704B.

Figure 7B:
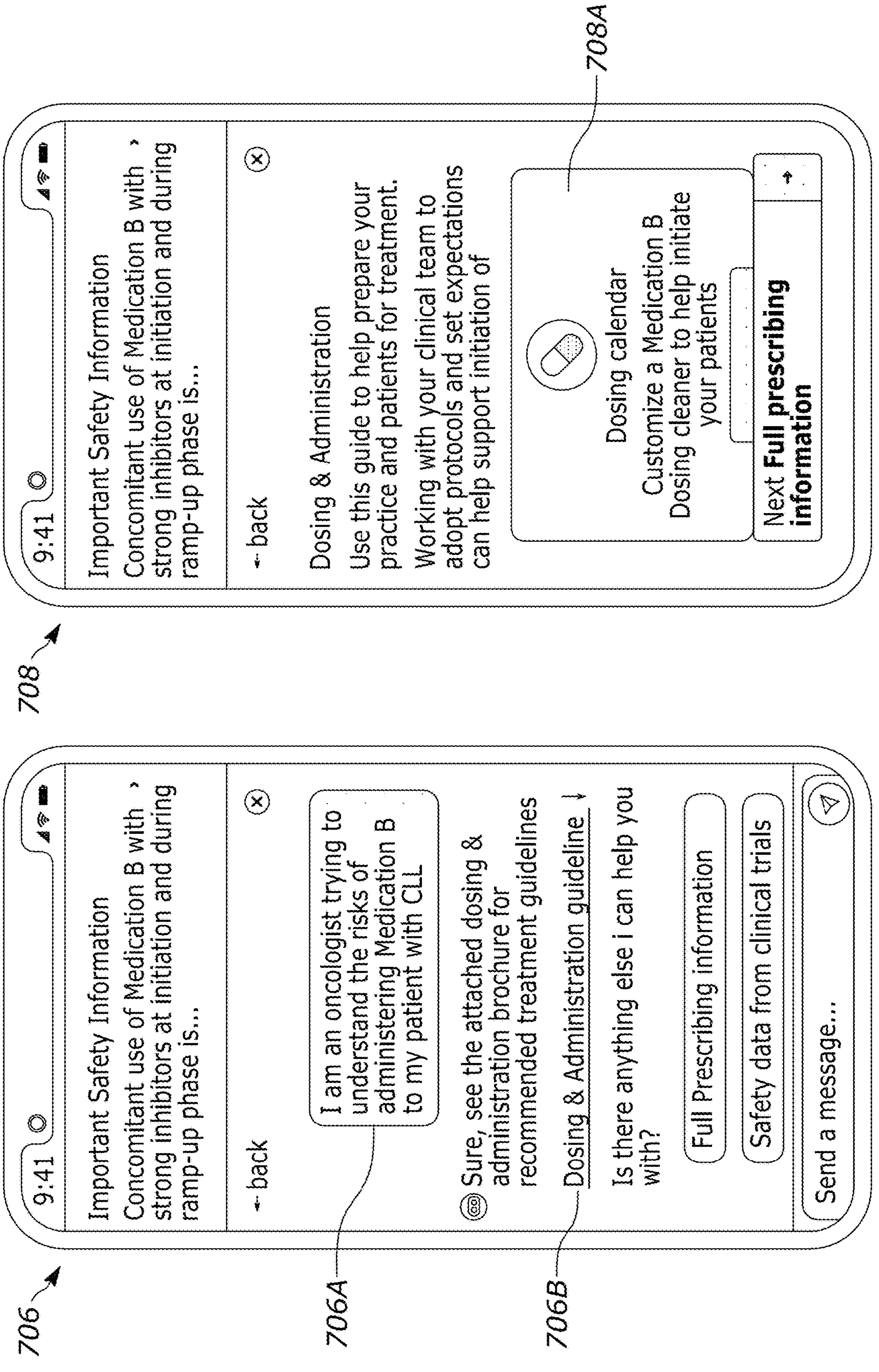
FIG. 7B illustrates an example chatbot interface for a provider, according to some embodiments.

FIG. 7B illustrates example chatbot conversation screens for a provider (e.g., doctor) using the chatbot. The conversation screen 706 shows an oncologist inputting an initial query 706A asking about the risks of administering a specific drug to a patient. Upon receiving the query, the chatbot provides a search response 706B with relevant articles addressing the query. To access these articles, the user can click on the search response 706B, which directs them to a detailed conversation screen 708 displaying the content of the selected article 708A.

Figure 7C:
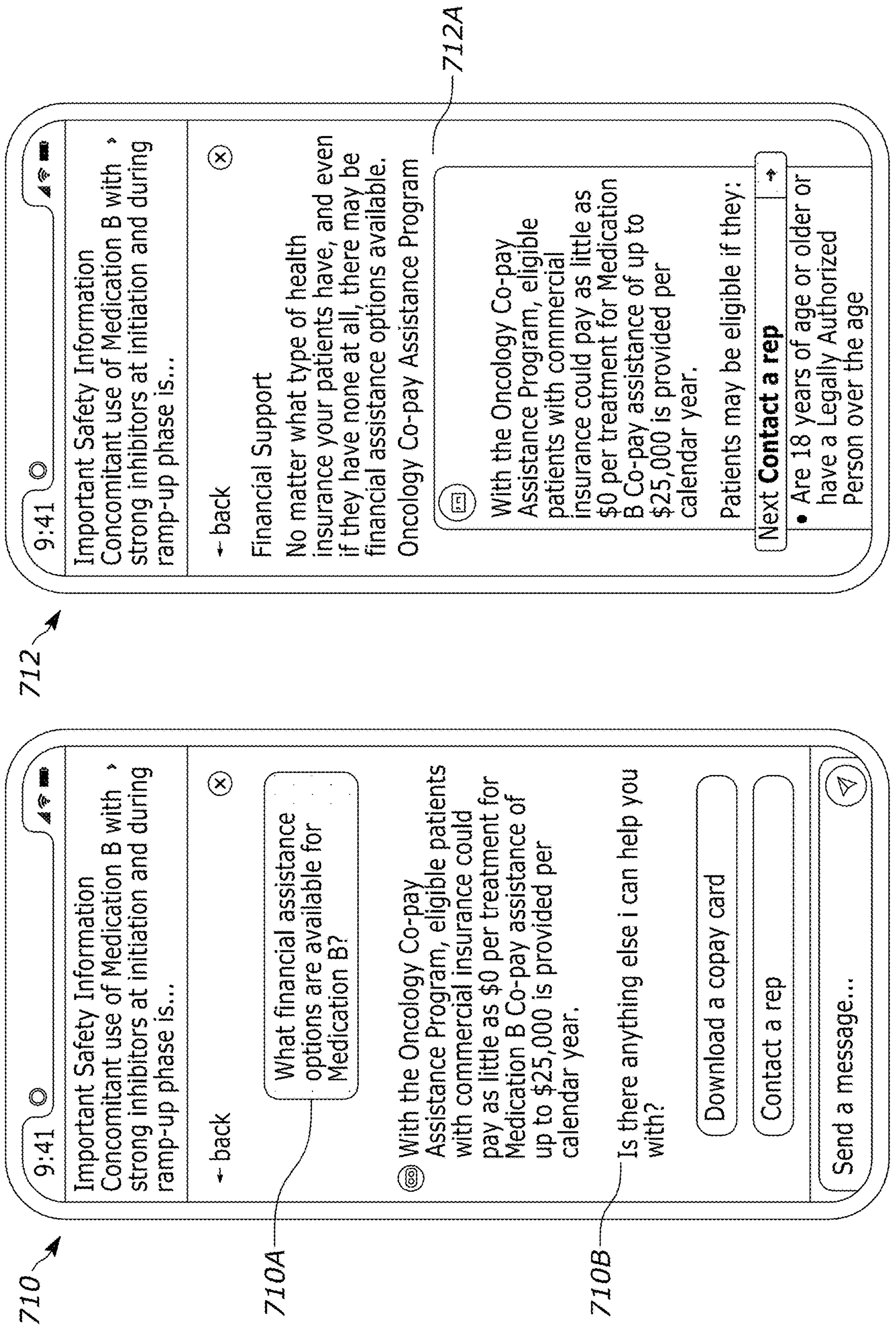
FIG. 7C illustrates an example chatbot interface for a plan administrator, according to some embodiments.

FIG. 7C depicts example chatbot conversation screens for a plan administrator using the chatbot. The conversation screen 710 shows a financial administrative assistant inputting an initial query 710A to inquire about financial assistance options for a specific drug. In response, the chatbot provides a brief summary of the available options along with a reference to the article used to generate the response (e.g., search response). Upon clicking the referenced article, the assistant is directed to a conversation screen 712 that displays the full content of the article 712A.

Figure 7D:
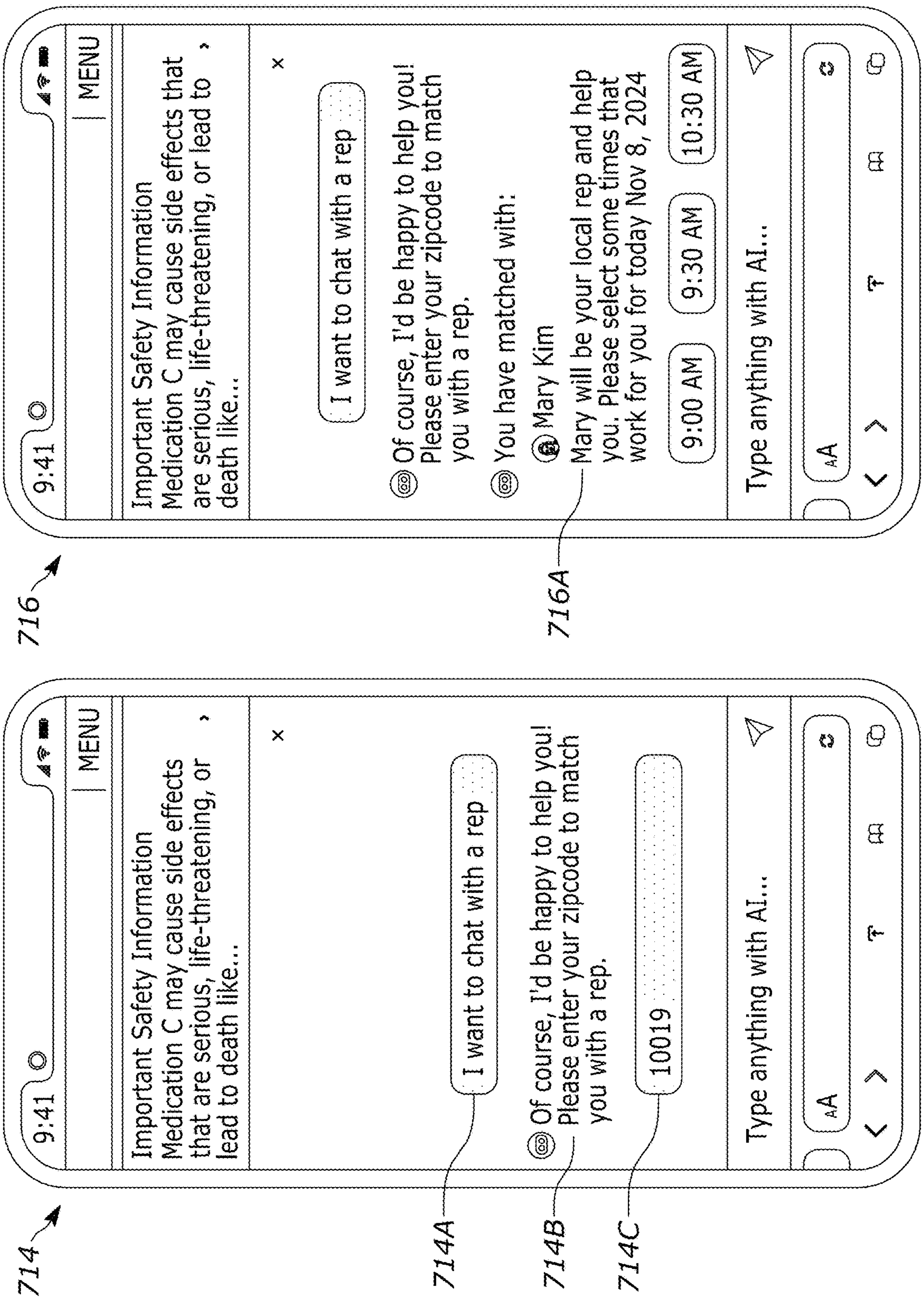
FIGS. 7D and 7E illustrates an example chatbot interface for a patient, according to some embodiments.
Figure 7E:
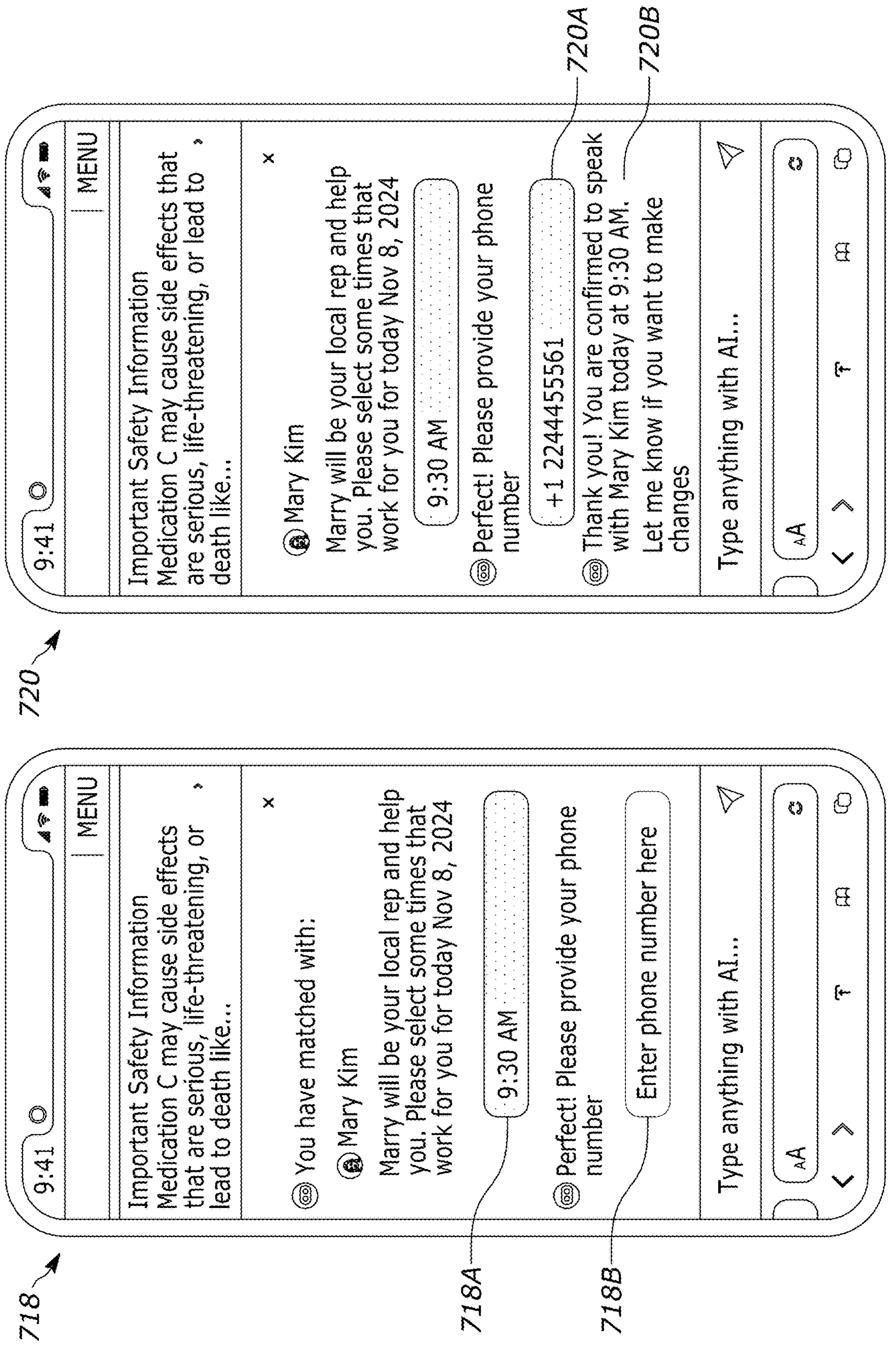

FIGS. 7D and 7E illustrate example chatbot conversation screens for a patient interacting with the chatbot. In conversation screen 714, the patient inputs an initial query 714A asking to connect with a representative. The chatbot processes this request and asks for the patient's zip code (714B). Upon receiving the zip code 714C from the patient, the chatbot matches the user with a local representative and provides potential times in which the patient can schedule in response 716A, as shown in conversation screen 716. The conversation may continue on conversation screen 718, where the patient provides a time for the appointment via message 718A. The chatbot then responds with a request for the user's phone number in message 718B. In conversation screen 720, the patient supplies their phone number via message 720A, and the chatbot schedules the appointment, providing a confirmation message 720B.

As demonstrated in FIGS. 7A-7E, the chatbot offers flexibility to respond to initial inputs (e.g., queries) from a diverse range of users, including medical professionals, administrative staff, and patients. This adaptability may be at least partially enabled by the search server's orchestration module (e.g., orchestration module 310), which may direct each initial input to a matching agent capable of generating a relevant and accurate response tailored to the user's needs.

Figure 8:
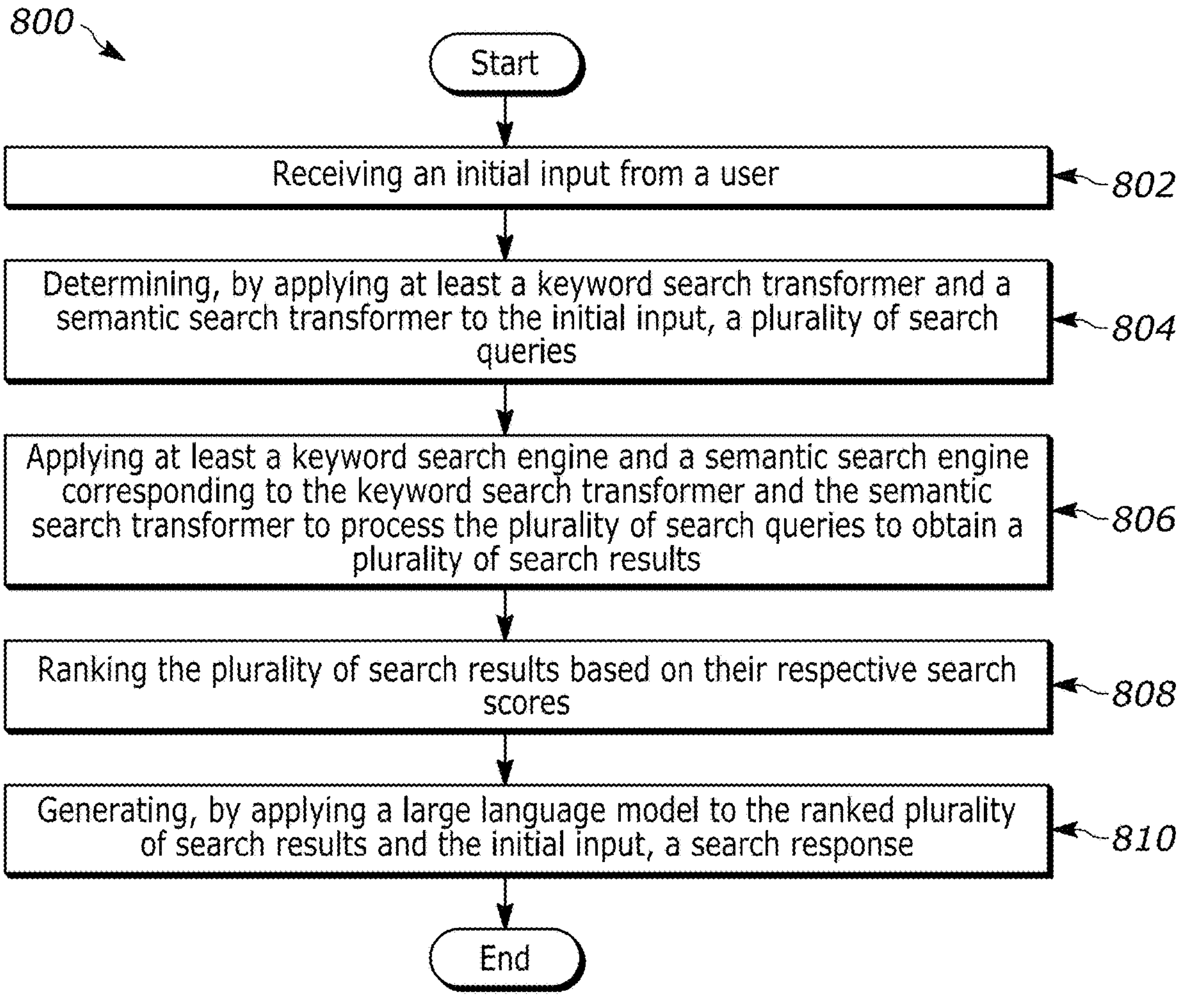
FIG. 8 is a flow diagram of an example method for improving generation of a search response, according to some embodiments.

FIG. 8 is a flow diagram of an example method for improving generation of a search response, according to some embodiments. The method 800 may be implemented by one or more processors of the one or more servers of the example comprehensive search system 100.

The method 800 includes receiving an initial input from a user (block 802). The method 800 further includes determining, by applying at least a keyword search transformer and a semantic search transformer to the initial input, a plurality of search queries (block 804). The method 800 further includes applying at least a keyword search engine and a semantic search engine corresponding to the keyword search transformer and the semantic search transformer to process the plurality of search queries to obtain a plurality of search results (block 806). Each search engine may have differently tuned parameters to output a search score for a search result.

The method 800 further includes ranking the plurality of search results based on their respective search scores (block 808). The method 800 further includes generating, by applying a large language model to the ranked plurality of search results and the initial input, a search response (block 810). The keyword search engine and the semantic search engine may operate independently from the large language model.

In some embodiments, the method 800 further comprises applying a preprocessing engine to the initial input to obtain a preprocessed query. In some embodiments, applying the preprocessing engine to the initial input to obtain the preprocessing query of method 800 may further comprise applying a profanity filtering engine to the initial input to remove a predefined list of offensive terms to obtain the preprocessed query. In some other embodiments, applying the preprocessing engine to the initial input to obtain the preprocessing query of method 800 may further comprise converting abbreviations, synonyms, or domain-specific slang words in the initial input into corresponding full words using a predefined mapping to obtain the preprocessed query. The method 800 may further comprise expanding the predefined mapping based on specific domain knowledge and/or users'frequently used terminologies. In further embodiments, applying the preprocessing engine to the initial input to obtain the preprocessing query of method 800 may further comprise truncating the initial input to a predefined word limit to obtain the preprocessed query. In some further embodiments, determining the plurality of search queries of method 800 further comprises determining, by applying at least the keyword search transformer and the semantic search transformer to the preprocessed query, the plurality of search queries.

In some embodiments, determining the plurality of search queries of method 800 further comprises determining, by applying a plurality of search transformers comprising at least the keyword search transformer and the semantic search transformer to the initial input, the plurality of search queries. In some embodiments, the plurality of search transformers of method 800 further comprises a faceted search transformer, geographic search transformer, a temporal search transformer, and/or an image-based search transformer. In some other embodiments, applying at least the keyword search engine and the semantic search engine of method 800 further comprises applying a plurality of search engines comprising at least the keyword search engine and the semantic search engine corresponding to the plurality of search transformers to process the plurality of search queries to obtain the plurality of search results.

In some embodiments, at least the keyword search engine and the semantic search engine of method 800 obtain the plurality of search results based on pre-approved data, and the generation of the search response may further comprise selecting one or more results by the large language model from the ranked plurality of search results. The pre-approved data and the selection may eliminate incorrect information in the generation of the search response. The pre-approved data of method 800 may comprise a plurality of articles, wherein each article in the plurality of articles includes different article components. The different article components of method 800 may be assigned with different parameters used by the each search engine to output the search score for a search result.

In some embodiments, the method 800 further includes employing the pre-approved data to the keyword search transformer to determine keyword search data and storing the keyword search data to a keyword search database. The method 800 may further comprise applying the keyword search engine to a keyword search query to obtain one or more keyword search results. The keyword search engine may utilize the keyword search database to obtain the one or more keyword search results.

In some embodiments, the method 800 may further comprise employing the pre-approved data to the semantic search transformer to determine semantic search data and storing the semantic search data to a semantic search database. The method 800 may further comprise applying the semantic search engine to a semantic search query to obtain one or more semantic search results. The semantic search engine utilizes the semantic search database to obtain the one or more semantic search results.

In some embodiments, after receiving the initial input and before determining the plurality of search queries of method 800 further comprises applying another large language model to validate the initial input by determining its contextual relevance with respect to the pre-approved data. The method 800 further comprises determining that the initial input is not contextually relevant to the pre-approved data and generating the search response indicating that the initial input is not contextually relevant.

In some embodiments, the pre-approved data of method 800 is periodically updated with newly approved data. The method 800 may further comprise transmitting a request for newly approved data to an external server based on user analytics. The method 800 may further comprise receiving the newly approve data from the external server and updating the pre-approved data with the newly approved data from the external server.

In some embodiments, the keyword search transformer of method 800 uses the large language model to determine a keyword search query. The keyword search query comprises one or more keywords relevant to the initial input. The keyword search engine may obtain one or more keyword search results based on a frequency of the one or more keywords in the pre-approved data.

In some embodiments, the semantic search transformer uses the large language model to determine a semantic search query, wherein the semantic search query comprises a vector embedding of the initial input. The semantic search engine of method 800 may obtain one or more semantic search results based on semantic similarity to the pre-approved data.

In some embodiments, the keyword search engine of method 800 may comprise keyword search parameters including: (i) a fuzziness parameter, (ii) a zero terms query parameter, (iii) an word match operator parameter, (iv) a scoring mechanism parameter, (v) a max expansion parameter, and (vi) a prefix length parameter that are used to determine a keyword search score for a keyword search result.

In some embodiments, the ranked plurality of search results of method 800 is a ranked plurality of articles pertaining to the initial input. The large language model may summarize or obtain a direct answer to the initial input from the ranked plurality of articles. In some embodiments, the method 800 may further comprise obtaining a user profile data of the user from an external server. Applying the large language model of method 800 may further include applying the large language model to the ranked plurality of search results, the initial input, and the user profile data to generate the search response. The user may approve obtaining the user profile data from the external server.

In some embodiments, applying the large language model to the ranked plurality of search results and the initial input to generate the search response of method 800 further comprises utilizing one or more third party APIs to perform one or more tasks based on the ranked plurality of search results. The one or more tasks may include scheduling an appointment with a doctor, finding an appropriate provider, or locating suitable pharmacy.

In some embodiments, the method 800 further comprises tuning the different parameters in the each search engine based on training data comprising a plurality of initial inputs and corresponding search results. The different parameters may be manually configured or automatically updated using a simulation tool until the each search engine outputs the corresponding search results for the plurality of initial inputs.

In some embodiments, the differently tuned parameters of method 800 are tuned with different weights or different options.

In some embodiments, the method 800 further comprises applying an orchestration layer configured to orchestrate a plurality of AI agents, wherein each AI agent individually performs at least a subset of: (i) determining the plurality of search queries, (ii) applying at least the keyword search engine and the semantic search engine to process the plurality of search queries to obtain the plurality of search results, (iii) . . . using a different set of tuned parameters for the plurality of search engines. The orchestration layer may choose an AI agent among the plurality of AI agents to generate the search response by analyzing the initial input. The plurality of AI agents may comprise a scheduling agent, a conversational agent, a recommendation agent, a coverage checking agent, a patient support agent, a doctor finding agent, a pharmacy finding agent, and a discussion guide agent.

In some embodiments, the method 800 may further comprise displaying the search response in a chat interface, wherein the chat interface includes a chat history of the user. In some embodiments, the chat history may be current chat history data of a user in current chat session. The method 800 may further comprise applying at least the keyword search engine and the semantic search engine further includes applying at least the keyword search engine and the semantic search engine to process the plurality of search queries and the chat history to obtain the plurality of search results. The method 800 may further comprise applying the large language model further includes applying the large language model to the ranked plurality of search results and the chat history to generate the search response.

Figure 9:
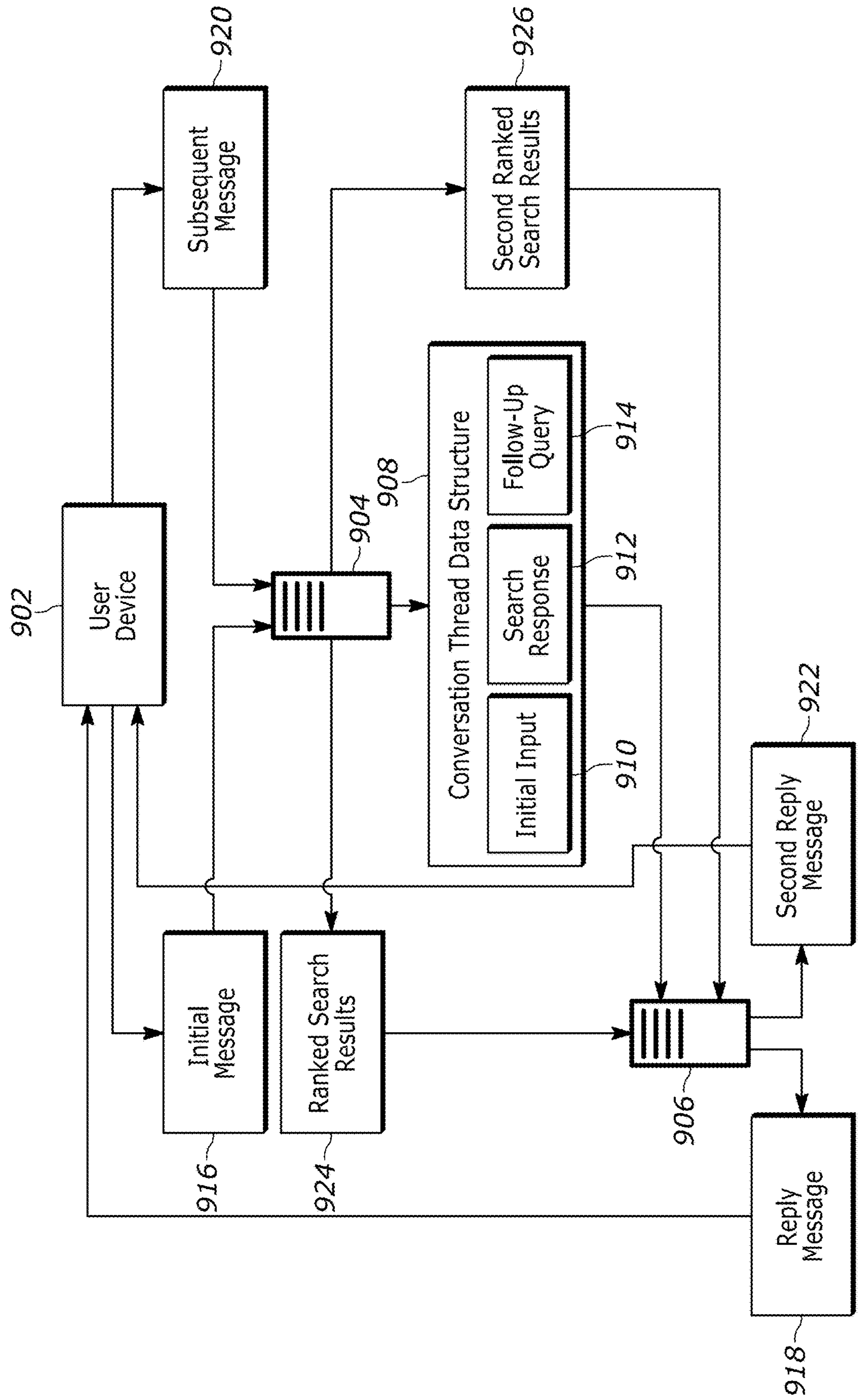
FIG. 9 is a block diagram of a search system architecture across one or more communication modalities, according to some embodiments.

FIG. 9 depicts a block diagram for a search system architecture enabling query processing and response generation through communications across one or more of the various communication modalities described herein (e.g., email). While the architecture depicted in FIG. 9 is described primarily in terms of email communications, this is for purposes of simplicity and discussion only. The architecture described herein may be applied and/or otherwise utilized across any suitable communication protocols, such as SMS text messaging, web-based chat interfaces, email, voice communications, instant messaging platforms, and/or other communication modalities. In some embodiments, the search server 904 and language model server 906 may be configured to receive initial inputs and transmit search responses through multiple communication channels simultaneously or interchangeably, with the conversation thread data structure 908 maintaining context across these different modalities. The techniques described with reference to FIG. 9 may thus be adapted to accommodate various user preferences and communication environments without departing from the principles disclosed herein.

The architecture includes a user device 902, a search server 904, and a language model server 906, which may be communicatively coupled to process queries and generate search responses. The user device 902 may correspond to any of the client devices 106-116 described with reference to FIG. 1, and may transmit an initial input via a message to a designated device (e.g., the search server 904) associated with a corresponding address/account across the relevant communication modality (e.g., an email address). The search server 904 may correspond to the various search servers described herein (e.g., 302), and may receive the message, parse the message to extract the initial input, and process the initial input using the plurality of search engines as described with reference to the search engine module 308*d*. The language model server 906 may correspond to the various language model servers described herein (e.g., 202), and may receive the ranked plurality of search results (e.g., 924, 926) from the search server 904 to generate a search response (e.g., 918, 922) using a large language model, as described with reference to the inference module 208C.

The search system architecture of FIG. 9 may enable AI-powered two-way conversations where users, such as HCPs, may ask questions and receive real-time (e.g., in seconds), compliant answers directly on their respective devices (e.g., in an email inbox). The message may include a query from the user, and the search server 904 may process the query through a preprocessing module (e.g., 308*a*), a search transformer module (e.g., 308*c*), and/or a search engine module (e.g., 308*d*) to generate a ranked plurality of search results 924. The language model server 906 may then generate a reply message 918, 922 containing the search response, which may be transmitted back to the user device 902. The architecture may further include a conversation thread data structure 908, which may maintain context across multiple communication channels, such as web, email, voice, text messaging (e.g., SMS), and/or any other suitable communication modality/channel(s) to provide omnichannel engagement. The conversation thread data structure 908 may store, for example, the initial input 910 from the received messages 916, 920, the search response 912 (e.g., included as part of the reply messages 918, 922), and/or any follow-up queries 914 as a linked sequence of communications, enabling the language model server 906 to generate contextually relevant responses based on the conversation history across different communication modalities.

More generally, and as mentioned, the systems of the present disclosure may receive and process user inputs via a plurality of communication modalities. The plurality of communication modalities may include, for example, a web-based chat interface, electronic mail (email) messages, SMS text messages, multimedia messaging service (MMS) messages, rich communication services (RCS) messages, voice communication channels, and/or other messaging platforms such as WhatsApp. Each communication modality may have different characteristics, constraints, and capabilities. For instance, a web-based chat interface may support real-time synchronous interactions with rich media content, while SMS messages may be constrained by character limits and support only plain text. Email messages may support HTML formatting with plain text fallback and may contain additional artifacts such as signatures, threading indicators, and prior reply content that require parsing to extract the user's query. The systems of the present disclosure may maintain conversational continuity across multiple communication modalities, such that a user may initiate a query in one modality (e.g., SMS) and continue the interaction in another modality (e.g., a web application) while preserving conversation context. In some embodiments, the system may encode session identifiers in a uniform resource locator (URL) to maintain session history when transitioning between modalities. The system may also adapt response formatting based on the communication modality, presenting responses in a chat-like form interface for web modality, HTML with plain text fallback for email and RCS, and plain text for SMS.

When a user device 902 transmits an initial message 916 to a designated address (e.g., email address) associated with the search server 904, the search server 904 may receive the initial message 916 and parse the message 916 to extract an initial input 910 from a message body of the message 916. The parsing operation may be performed by a preprocessing module (e.g., 308*a*), which may apply text processing techniques to, e.g., strip headers, reply content, signatures, and/or other formatting artifacts from the initial message 916 to isolate the actual user query contained within the message body. The search server 904 may then process the initial input 910 through a search transformer module (e.g., 308*c*) and a search engine module (e.g., 308*d*) to generate ranked search results 924. The ranked search results 924 may be derived from pre-approved data stored in a database (e.g., 154), where the pre-approved data may include content configured to ensure compliance with regulatory and other requirements in various communications (e.g., pharmaceutical/medical communications). For example, the search server 904 may operate with pre-approved scripts or resource libraries to maintain compliance with pharmaceutical marketing regulations when processing the initial input 910 and generating the ranked search results 924.

The search server 904 may transmit the ranked search results 924 to the language model server 906 for further processing. The language model server 906 may apply a large language model, via an inference module (e.g., 208C), to the ranked search results 924 and the initial input 910 to generate a search response. The search response may enable one-click access to answers by surfacing relevant approved assets or content based on query context, allowing users to quickly access information such as dosing guides, administration information, and/or patient resources. The search server 904 or the language model server 906 may then transmit the search response as a reply message 918 (e.g., a reply email message) to the user device 902, completing the initial query processing flow. Thus, this architecture allows the systems described herein to capture real-time user intent and behavioral insights in workflows across various communication modalities while personalizing touchpoints through compliant, AI/ML-based conversations.

In certain embodiments, the system depicted in FIG. 9 may handle multi-turn conversations (e.g., via email) by detecting, by one or more processors, a subsequent message 920 from the user device 902 in response to the reply message 918. When the user device 902 transmits the subsequent message 920, the search server 904 may receive the subsequent message 920 and extract, by the one or more processors, a follow-up query 914 from the subsequent message 920. The extraction of the follow-up query 914 may be performed by a preprocessing module (e.g., 308*a*), which may parse the subsequent message 920 to isolate the new query content from prior reply content, threading indicators, and/or signatures. The search server 904 may then store, by the one or more processors, the initial input 910, a search response 912, and the follow-up query 914 in a conversation thread data structure 908 that associates the messages as a linked sequence of communications. The conversation thread data structure 908 may maintain context across multiple exchanges, enabling the system to provide consistent virtual navigator access for users to receive support at any time without human intervention.

The search server 904 may process the follow-up query 914 through the search transformer module (e.g., 308*c*) and the search engine module (e.g., 308*d*) to generate second ranked search results 926 corresponding to the follow-up query 914. The language model server 906 may then generate, by applying the large language model to the conversation thread data structure 908 and the second ranked search results 926, a second search response transmitted as a second reply message 922 (e.g., a second reply email message). The search response 912 may surface resources including, e.g., dosing and administration guides, prescribing information, and/or patient brochures based on user context, and the second reply message 922 may similarly provide contextually relevant information that accounts for the conversation history stored in the conversation thread data structure 908.

Figure 10:
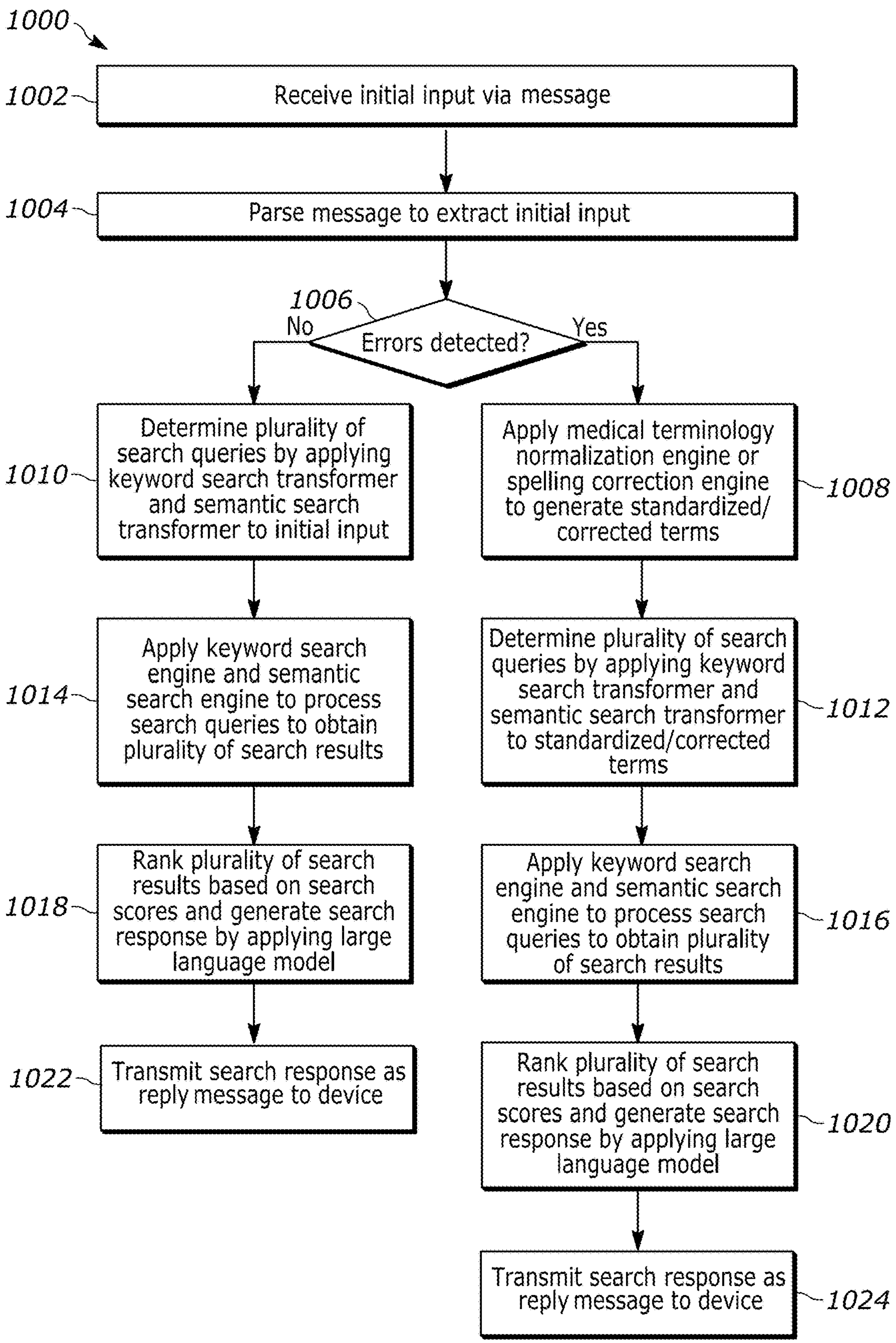
FIG. 10 is a flowchart for a method for processing search queries received via one or more communication modalities, according to some embodiments.

FIG. 10 depicts a flowchart for a method 1000 of processing search queries received via one or more of the communication modalities described herein (e.g., SMS messages) with medical terminology normalization. Thus, while the method 1000 depicted in FIG. 10 is described primarily in terms of SMS communications, this is for purposes of simplicity and discussion only. The architecture and techniques described herein may be applied and/or otherwise utilized across any suitable communication protocols, such as SMS text messaging, web-based chat interfaces, electronic mail, voice communications, instant messaging platforms, and/or other communication modalities. For example, while abbreviations, misspellings, and/or other errors may be commonly present in SMS messages due to the constraints of mobile text input, such abbreviations and/or errors may be present in any other communication modality. Users communicating via web chat interfaces, email, or other channels may similarly employ domain-specific abbreviations, informal language, or typographical errors that benefit from normalization and correction processing. Thus, the techniques described with reference to FIG. 10, including the detection of domain-specific terminology, the application of medical terminology normalization engines, and/or the use of spelling correction engines, may be equally applicable to any of the communication modalities discussed herein.

The method 1000 begins at block 1002, where the system receives an initial input via a message (e.g., an SMS text message) transmitted from a user device. The user device may correspond to any of the client devices (e.g., 106-116) described herein, such as the network-enabled cell phone 108 or the mobile device smart-phone 112, and may be capable of receiving and sending SMS text messages. The method 1000 may further include block 1004, where the one or more processors parse the message to extract the initial input. The parsing operation may be performed by a preprocessing module (e.g., 308*a*), which may apply text processing techniques to isolate the actual user query from the message content. The language model server (e.g., 202, 906) may understand medical terminology and common misspellings to accurately interpret domain-specific queries (e.g., from HCPs) contained within the extracted initial input, enabling the systems described herein to process queries including domain-specific language, abbreviations, and/or typographical errors that are common in communications across various modalities (e.g., SMS, email, voice, web chat, etc.).

Namely, the method 1000 may further include determining whether domain-specific terminology (referenced herein also as "medical" terminology), abbreviations, and/or misspellings (collectively, "errors") are detected in the extracted initial input (block 1006). The detection operation at block 1006 may be performed by a preprocessing module (e.g., 308*a*) or a search engine module (e.g., 308*d*) that utilizes, e.g., a healthcare-tuned AI configured to understand medical context and abbreviations when processing queries from healthcare professionals. When domain-specific terminology, abbreviations, and/or misspellings are detected (Yes branch of block 1006), the method 1000 may proceed to block 1008, where a medical terminology normalization engine and/or a spelling correction engine is applied to generate standardized or corrected terms. The medical terminology normalization engine may convert detected medical terminology and/or abbreviations into standardized terms by referencing a medical terminology dictionary and/or a mapping database. The spelling correction engine may detect a misspelling within the message by comparing terms in the message against the medical terminology dictionary and may generate a corrected term based on the detected misspelling. From block 1008, the method 1000 may continue to block 1012, where the systems described herein determine a plurality of search queries by applying the keyword search transformer and the semantic search transformer to the standardized or corrected terms.

When no domain-specific terminology, abbreviations, and/or misspellings are detected at block 1006 (No branch), the method 1000 may further include determining the plurality of search queries by applying the keyword search transformer and the semantic search transformer to the initial input without normalization or correction (block 1010). The search transformer module (e.g., 308*c*) may perform the operations at block 1010 and block 1012, transforming the initial input or the standardized terms into search queries tailored for the keyword search engine and the semantic search engine. For example, the systems described herein may process SMS-based queries that include domain-specific language common in communications from healthcare professionals, such as abbreviations like "BID" for "twice daily" or "PRN" for "as needed," by normalizing such terms before applying the search transformers to generate accurate and contextually relevant search queries.

The method 1000 may further include processing (e.g., by the keyword search engine and the semantic search engine) the plurality of search queries to obtain a plurality of search results (blocks 1014 and 1016). At block 1014, the search engine module (e.g., 308*d*) may apply the keyword search engine and the semantic search engine to process the plurality of search queries derived from the initial input to obtain the plurality of search results. At block 1016, the search engine module (e.g., 308*d*) may similarly apply the keyword search engine and the semantic search engine to process the plurality of search queries derived from the standardized or corrected terms to obtain the plurality of search results.

The method 1000 may further include ranking the plurality of search results based on search scores and a search response is generated by applying the large language model (blocks 1018 and 1020). At block 1018, the ranking module (e.g., 308*e*) may rank the plurality of search results based on their respective search scores, and the inference module (e.g., 208C) may apply the large language model to the ranked plurality of search results and the initial input to generate the search response. At block 1020, the ranking module (e.g., 308*e*) may similarly rank the plurality of search results, and the inference module (e.g., 208C) may apply the large language model to the ranked plurality of search results and the standardized or corrected terms to generate the search response. The method 1000 may further include transmitting the search response(s) as a reply message (e.g., an SMS text message) to a user device (blocks 1022 and 1024). At block 1022, the search server (e.g., 302, 904) may transmit the search response as a reply message to the user device. At block 1024, the search server (e.g., 302, 904) may similarly transmit the search response as a reply message to the user device.

In certain embodiments, the method 1000 may further comprise storing each message of a plurality of messages exchanged between the user device and a receiving device (e.g., a device associated with a designated telephone number) in a conversation thread data structure that associates the messages with a unique session identifier. The method 1000 may further comprise applying the large language model to a conversation thread data structure (e.g., 908) and the ranked plurality of search results to generate the search response. In certain embodiments, the method 1000 may further comprise generating a follow-up message based on analyzing the conversation thread data structure to identify a user characteristic (e.g., an HCP's practice specialty), determining, based on the user characteristic and a predefined set of characteristic-specific information triggers, that additional information relevant to the user characteristic has not yet been requested by the user, and transmitting the follow-up message to the user device in advance of a subsequent user query. The follow-up message may include the additional information determined to be relevant to the user characteristic. The analytics module (e.g., 314) may analyze the conversation thread data structure to identify the user characteristic and determine that additional information relevant to the user characteristic has not yet been requested, enabling the system to provide proactive follow-up communications based on the user's characteristic and related needs without requiring additional user input.

Generally, the user characteristic may inform personalized responses and proactive engagement. User characteristics for may include, for example, a user's professional specialty (e.g., oncology, cardiology, primary care), geographic location or region, practice type or clinical setting (e.g., hospital, private practice, academic medical center), role or relationship to a patient (e.g., healthcare provider, patient, caregiver, family member), prescribing patterns or treatment preferences, prior interaction history with the system, and/or demographic information. In some embodiments, the systems described herein may infer user characteristics based on the content and context of user queries, the communication modality utilized, and/or behavioral patterns observed across multiple interactions. The systems described herein may utilize identified user characteristics to tailor search responses, prioritize certain search results, determine relevant follow-up information, and/or trigger specialized workflows. For instance, the systems described herein may determine a user is a caregiver rather than a patient based on the nature of their queries, and may accordingly adjust the search response to provide caregiver-specific resources and support information. Similarly, the systems described herein may identify a user's geographic region to provide location-relevant information such as nearby providers, regional formulary considerations, and/or locally available patient assistance programs.

Figure 11:
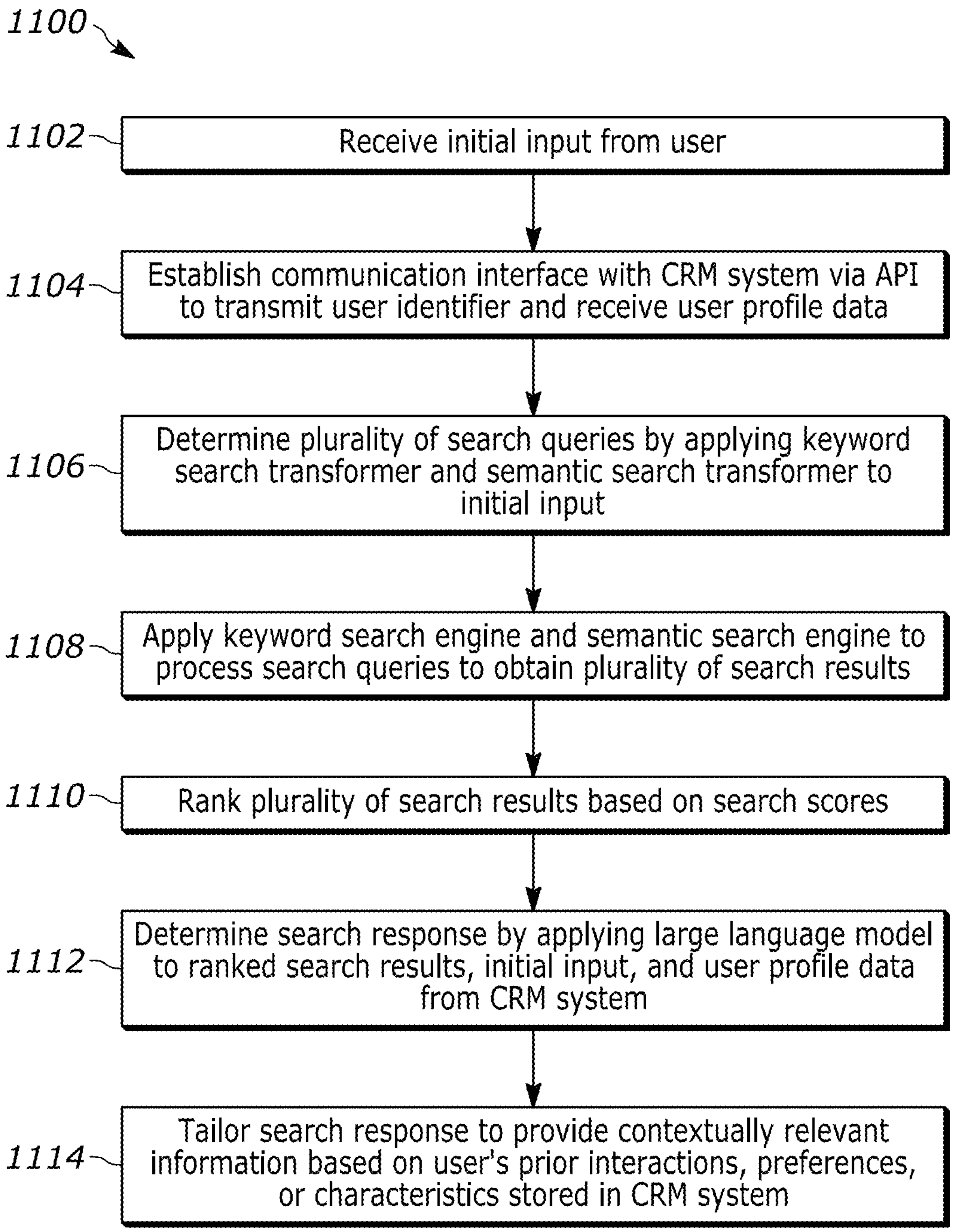
FIG. 11 is a flowchart for a method for processing user input with CRM integration, according to some embodiments.

FIG. 11 depicts a flowchart for a method 1100 of processing user input with CRM integration and search response generation. The method 1100 may include the system receiving an initial input from a user, which may be received via any of the communication modalities described herein, including web-based chat interfaces, electronic mail messages, and/or SMS messages transmitted from client devices (e.g., 106-116) (block 1002). The method 1100 may further include the system establishing a communication interface with a CRM system via an API to transmit a user identifier and receive, in response, user profile data associated with the user (block 1004). For example, the search server 904 may transmit an HTTP request containing the user identifier to a RESTful API endpoint exposed by the CRM system and receive a JSON response containing the user profile data, including the user's role, specialty, prior interaction history, other relevant characteristics, and communication preferences.

Various components described herein may establish the communication interface (e.g., 302, 904) communicating with an external server (e.g., 402) that maintains user profile data, where the external server 402 may store and manage user profile data via a database (e.g., 158). The user profile data may include preferences, previous chat history, contextual information, demographic details, and/or any other context relevant to personalizing the response, as described with reference to the orchestration module 310 and the analytics module 314. This CRM integration may allow the system to capture behavioral insights and intent signals from user interactions, understand user interactions, and suggest next best actions for professionals (e.g., HCPs) or other users (e.g., patients) based on the user profile data retrieved from the CRM system.

The method 1100 may further include determining by a search transformer module (e.g., 308*c*) a plurality of search queries by applying a keyword search transformer and a semantic search transformer to the initial input (block 1006). The method 1100 may further include the search engine module (e.g., 308*d*) applying a keyword search engine and a semantic search engine to process the plurality of search queries to obtain a plurality of search results (block 1008). Thereafter, a ranking module (e.g., 308*e*) may rank the plurality of search results based on their respective search scores (block 1010), and an inference module (e.g., 208C) may generate a search response by applying the large language model to the ranked plurality of search results, the initial input, and the user profile data retrieved from the CRM system (block 1112). The systems described herein may personalize the search response based on the user profile data, where the user profile data may include information such as the user's role (e.g., HCP specialty), context, intent, and other relevant characteristics (e.g., prescribing indication, advertising campaign) to tailor content delivery. The system may also personalize experiences based on user role (e.g., HCP), context, intent, and other relevant characteristics (e.g., prescribing indication, advertising campaign) to tailor content delivery to the user. For example, if the user profile data indicates the user is an oncologist who has previously inquired about dosing information for a particular chemotherapy agent, the system may prioritize search results related to oncology-specific administration guidelines and may present the search response using terminology and detail levels appropriate for a specialist physician rather than a general practitioner.

The method 1100 may further include generating the search response at least in part by tailoring the search response to provide contextually relevant information based on the user's prior interactions, preferences, and/or characteristics stored in the CRM system (block 1114). The system may adapt responses based on user behavior patterns to personalize subsequent interactions and content delivery, where the analytics module (e.g., 314) may track and analyze user engagement patterns over time. The analytics module (e.g., 314) may provide analytics dashboards revealing HCP engagement patterns and content preferences to refine the system's personalization capabilities based on aggregated behavioral insights. Thus, by incorporating the user profile data into the tailored search response generation process, the method 1100 may deliver responses accounting for the user's historical engagement patterns and stored profile attributes, enhancing the relevance and utility of the search response.

Figure 12:
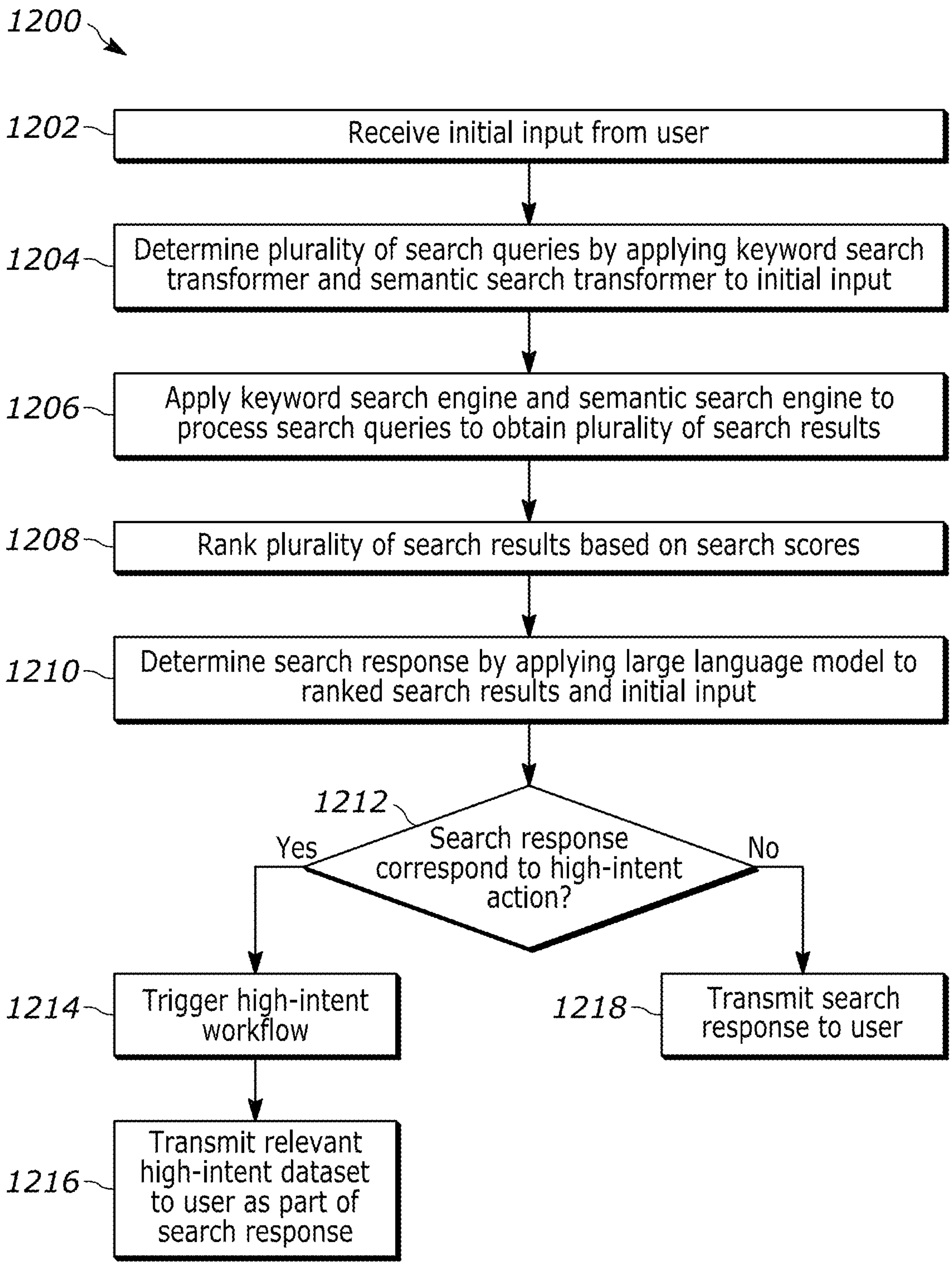
FIG. 12 is a flowchart for a method for processing user search queries with high-intent workflows, according to some embodiments.

FIG. 12 depicts a flowchart for a method 1200 of processing user search queries and conditionally triggering high-intent workflow based on high-intent action indicators. Generally, the systems of the present disclosure may detect high-intent actions based on analyzing user inputs against a predefined set of high-intent action indicators. High-intent actions may correspond to user queries or behaviors that indicate readiness to engage in a follow-on action beyond receiving informational search responses. The systems of the present disclosure may maintain a high-intent dataset associating high-intent action indicators with corresponding follow-on actions or workflows. Follow-on actions may include providing/performing, for example, representative contact forms, scheduling interfaces for appointments or consultations, sample request submissions, payment or financial assistance applications, patient enrollment forms, prescription refill requests, clinical trial inquiry forms, and/or other relevant actions or workflows tailored to the user's expressed intent.

The method 1200 may include receiving an initial input from a user, which may be received via any of the communication modalities described herein, including web-based chat interfaces, electronic mail messages, and/or SMS messages transmitted from client devices (e.g., 106-116) (block 1202). The method 1200 may further include determining, by a search transformer module (e.g., 308*c*), a plurality of search queries by applying a keyword search transformer and a semantic search transformer to the initial input (block 1204), and applying a keyword search engine and a semantic search engine to process the plurality of search queries to obtain a plurality of search results (block 1206). A ranking module (e.g., 308*e*) may then rank the plurality of search results based on their respective search scores (block 1208), and an inference module (e.g., 208C) may generate a search response by applying a large language model to the ranked plurality of search results and the initial input (block 1210). The search response may include, e.g., doctor discussion guides and may facilitate appointment booking to guide patients toward informed treatment decisions. For example, if a user submits the initial input "I want to talk to my doctor about starting treatment," the ranking module may rank search results containing patient-doctor conversation guides and treatment initiation resources, and the inference module may generate a search response that includes a downloadable discussion guide with suggested questions for the user's next appointment, along with a prompt to schedule a consultation with a healthcare provider.

The method 1200 may further include determining whether the search response corresponds to a high-intent action based on predefined indicators (block 1212). This determination may be performed by an orchestration module (e.g., 310) or an agent specific module (e.g., 308*g*), which may analyze the initial input against a predefined set of high-intent action indicators to identify when users, such as HCPs, show readiness signals indicating intent and/or an interest in taking a specific high-intent action, such as to connect with a representative. The predefined set of high-intent action indicators may include queries related to scheduling appointments, requesting representative contact information, payment assistance, expressing intent to prescribe or recommend a treatment, and/or other high-intent actions and/or other defined actions or activities. For example, if an HCP submits the initial input "I'd like to speak with a sales representative about adding this medication to our formulary," the orchestration module may identify this as a high-intent action based on the explicit request for representative contact combined with prescribing intent language. In another example, the agent specific module may detect high-intent indicators when a user queries "How do I schedule a meeting with your medical science liaison to discuss clinical trial data?", as this combines appointment scheduling language with professional engagement signals.

When the system determines the initial input corresponds to a high-intent action (Yes branch of block 1212), the method 1200 may include triggering a high-intent workflow (block 1214) rather than displaying static options, thereby elevating the relevant actions and associated content and next steps at moments when users demonstrate readiness to engage. For instance, when the orchestration module detects the high-intent action indicator in the query "I'd like to speak with a sales representative about adding this medication to our formulary," the system may dynamically generate a representative connection prompt including the user's geographic region and specialty to facilitate immediate routing to an appropriate field representative, rather than presenting a generic contact form. In another example, when the agent specific module identifies the high-intent query regarding clinical trial data discussion, the system may trigger a scheduling interface pre-populated with available medical science liaison appointment slots based on the user's location and indicated availability preferences extracted from the CRM system. The systems described herein may further transmit the relevant high-intent dataset to the user device as part of the overall search response (block 1216). When the system determines the initial input does not correspond to a high-intent action (No branch of block 1212), the method 1200 may include transmitting the search response to the user without triggering the high-intent workflow (block 1218).

In certain embodiments, triggering/executing the high-intent workflow at block 1214 may comprise evaluating a communication modality associated with the initial input and constraints of the communication modality. The orchestration module 310 or the agent specific module 308*g* may determine, based on the constraints of the communication modality, whether the communication modality supports a specific high-intent dataset, such as providing a representative contact form or a scheduling interface. For example, when the initial input is received via an SMS message, the communication modality may have constraints that prevent rendering interactive forms or calendar-based scheduling interfaces directly within the SMS channel. Similarly, when the initial input is received via an email message, the communication modality may support limited interactivity compared to a web-based chat interface. The system may maintain, e.g., a modality constraint database specifying the capabilities and limitations of each supported communication channel, enabling the orchestration module 310 to determine appropriate response formats and/or overall datasets based on the communication modality through which the initial input was received.

In response to determining the communication modality does not support the relevant high-intent dataset, such as a representative contact form or the scheduling interface, the method 1200 may further comprise generating a uniform resource locator (URL) encoding a session identifier associated with the initial input and routing the user to a web application configured to present the appropriate high-intent dataset, such as a representative contact form or the scheduling interface, while preserving conversation context associated with the session identifier. The agent specific module 308*g* may generate the URL by encoding the session identifier as a query parameter or path segment, where the session identifier corresponds to a unique identifier stored in the conversation thread data structure (e.g., 908). When the user accesses the URL, the web application may retrieve the conversation context from the conversation thread data structure 908 using the encoded session identifier, enabling the further action, such as a representative contact form or scheduling interface, to receive and where relevant utilize or display relevant context from the prior conversation. The method 1200 may further comprise transmitting the URL to the user as part of the search response, where the search response may be transmitted as a reply SMS message or a reply email message, depending on the communication modality.

In certain embodiments, determining the search response may further comprise constraining the large language model to select the one or more results exclusively from the ranked plurality of search results derived from the pre-approved content or data. The inference module 208C may enforce this constraint by configuring the large language model to reference only the ranked plurality of search results when determining the search response, thereby preventing the large language model from generating content based on its general training data. This constraint may ensure the search response remains compliant with applicable regulations and the high-intent workflow operates within the boundaries of pre-approved content.

The following list of examples reflects a variety of the embodiments explicitly contemplated by the present disclosure. Those of ordinary skill in the art will readily appreciate that the examples below are neither limiting of the embodiments disclosed herein, nor exhaustive of all of the embodiments conceivable from the disclosure above, but are instead meant to be exemplary in nature.

EXAMPLES

Example 1. A computer-implemented method for improving generation of a search response, the computer-implemented method comprising: receiving, by one or more processors, an initial input from a user through one of a plurality of communication modalities; determining, by applying at least a keyword search transformer and a semantic search transformer to the initial input, a plurality of search queries; applying, by the one or more processors, at least a keyword search engine and a semantic search engine corresponding to the keyword search transformer and the semantic search transformer to process the plurality of search queries to obtain a plurality of search results, wherein each search engine has differently tuned parameters to output a search score for a search result; ranking, by the one or more processors, the plurality of search results based on their respective search scores; and generating, by applying a large language model to the ranked plurality of search results and the initial input, a search response for transmission through the one of the plurality of communication modalities, wherein the keyword search engine and the semantic search engine operate independently from the large language model.

Example 2. The computer-implemented method of example 1, further comprising: applying, by the one or more processors, a preprocessing engine to the initial input to obtain a preprocessed query.

Example 3. The computer-implemented method of example 2, wherein applying the preprocessing engine to the initial input to obtain the preprocessed query, further comprises: applying, by the one or more processors, a profanity filtering engine to the initial input to remove a predefined list of offensive terms to obtain the preprocessed query.

Example 4. The computer-implemented method of example 2 or 3, wherein applying the preprocessing engine to the initial input to obtain the preprocessed query, further comprises: converting, by the one or more processors, abbreviations, synonyms, or domain-specific slang words in the initial input into corresponding full words using a predefined mapping to obtain the preprocessed query.

Example 5. The computer-implemented method of example 4, further comprising: expanding, by the one or more processors, the predefined mapping based on specific domain knowledge and/or users'frequently used terminologies.

Example 6. The computer-implemented method of any of examples 2 through 5, wherein applying the preprocessing engine to the initial input to obtain the preprocessed query, further comprises: truncating, by the one or more processors, the initial input to a predefined word limit to obtain the preprocessed query.

Example 7. The computer-implemented method of any of examples 2 through 6, wherein determining the plurality of search queries further comprises determining, by applying at least the keyword search transformer and the semantic search transformer to the preprocessed query, the plurality of search queries.

Example 8. The computer-implemented method of any of examples 1 through 7, wherein determining the plurality of search queries further comprises determining, by applying a plurality of search transformers comprising at least the keyword search transformer and the semantic search transformer to the initial input, the plurality of search queries.

Example 9. The computer-implemented method of example 8, wherein the plurality of search transformers further comprises a faceted search transformer, geographic search transformer, a temporal search transformer, and/or an image-based search transformer.

Example 10. The computer-implemented method of example 8 or 9, wherein applying at least the keyword search engine and the semantic search engine further comprises applying a plurality of search engines comprising at least the keyword search engine and the semantic search engine corresponding to the plurality of search transformers to process the plurality of search queries to obtain the plurality of search results.

Example 11. The computer-implemented method of examples 1 through 10, wherein at least the keyword search engine and the semantic search engine obtain the plurality of search results based on pre-approved data, wherein the generation of the search response further comprises selecting one or more results by the large language model from the ranked plurality of search results, wherein the pre-approved data and the selection eliminates the generation of incorrect information in the generation of the search response.

Example 12. The computer-implemented method of example 11, wherein the pre-approved data comprises a plurality of articles, wherein each article in the plurality of articles includes different article components.

Example 13. The computer-implemented method of example 12, wherein the different article components are assigned with different parameters used by the each search engine to output the search score for a search result.

Example 14. The computer-implemented method of examples 11 through 13, further comprising: employing, by the one or more processors, the pre-approved data to the keyword search transformer to determine keyword search data; and storing, by the one or more processors, the keyword search data to a keyword search database.

Example 15. The computer-implemented method of example 14, further comprising: applying, by the one or more processors, the keyword search engine to a keyword search query to obtain one or more keyword search results, wherein the keyword search engine utilizes the keyword search database to obtain the one or more keyword search results.

Example 16. The computer-implemented method of examples 11 through 15, further comprising: employing, by the one or more processors, the pre-approved data to the semantic search transformer to determine semantic search data; and storing, by the one or more processors, the semantic search data to a semantic search database.

Example 17. The computer-implemented method of example 16, further comprising: applying, by the one or more processors, the semantic search engine to a semantic search query to obtain one or more semantic search results, wherein the semantic search engine utilizes the semantic search database to obtain the one or more semantic search results.

Example 18. The computer-implemented method of examples 11 through 17, after receiving the initial input and before determining the plurality of search queries, further comprising: applying, by the one or more processors, another large language model to validate the initial input by determining its contextual relevance with respect to the pre-approved data.

Example 19. The computer-implemented method of example 18, further comprising: determining, by the one or more processors, that the initial input is not contextually relevant to the pre-approved data; and generating, by the one or more processors, the search response indicating that the initial input is not contextually relevant.

Example 20. The computer-implemented method of examples 11 through 19, wherein the pre-approved data is periodically updated with newly approved data.

Example 21. The computer-implemented method of example 20, further comprising: transmitting, by the one or more processors, a request for newly approved data to an external server based on user analytics.

Example 22. The computer-implemented method of example 21, further comprising: receiving, by the one or more processors, the newly approved data from the external server; and updating, by the one or more processors, the pre-approved data with the newly approved data from the external server.

Example 23. The computer-implemented method of example 11 through 22, wherein the keyword search transformer uses the large language model to determine a keyword search query, wherein the keyword search query comprises one or more keywords relevant to the initial input.

Example 24. The computer-implemented method of example 23, wherein the keyword search engine obtains one or more keyword search results based on a frequency of the one or more keywords in the pre-approved data.

Example 25. The computer-implemented method of example 11 through 24, wherein the semantic search transformer uses the large language model to determine a semantic search query, wherein the semantic search query comprises a vector embedding of the initial input.

Example 26. The computer-implemented method of example 25, wherein the semantic search engine obtains one or more semantic search results based on semantic similarity to the pre-approved data.

Example 27. The computer-implemented method of examples 1 through 26, wherein the keyword search engine comprises keyword search parameters including: (i) a fuzziness parameter, (ii) a zero terms query parameter, (iii) an word match operator parameter, (iv) a scoring mechanism parameter, (v) a max expansion parameter, and (vi) a prefix length parameter that are used to determine a keyword search score for a keyword search result.

Example 28. The computer-implemented method of claim 1, wherein the ranked plurality of search results is a ranked plurality of articles pertaining to the initial input.

Example 29. The computer-implemented method of example 28, wherein the large language model summarizes or obtains a direct answer to the initial input from the ranked plurality of articles.

Example 30. The computer-implemented method of examples 1 through 29, further comprising: obtaining, by the one or more processors, a user profile data of the user from an external server; and applying the large language model further includes applying the large language model to the ranked plurality of search results, the initial input, and the user profile data to generate the search response.

Example 31. The computer-implemented method of example 30, wherein the user approves obtaining the user profile data from the external server.

Example 32. The computer-implemented method of examples 1 through 31, wherein applying the large language model to the ranked plurality of search results and the initial input to generate the search response further comprises: utilizing, by the one or more processors, one or more third party APIs to perform one or more tasks based on the ranked plurality of search results.

Example 33. The computer-implemented method of example 32, wherein the one or more tasks includes scheduling an appointment with a doctor, finding an appropriate provider, or locating suitable pharmacy.

Example 34. The computer-implemented method of examples 1 through 33, further comprising: tuning, by the one or more processors, the different parameters in the each search engine based on training data comprising a plurality of initial inputs and corresponding search results.

Example 35. The computer-implemented method of example 34, wherein the different parameters are manually configured or automatically updated using a simulation tool until the each search engine outputs the corresponding search results for the plurality of initial inputs.

Example 36. The computer-implemented method of examples 1 through 35, wherein the differently tuned parameters are tuned with different weights or different options.

Example 37. The computer-implemented method of examples 1 through 36, further comprising: applying, by the one or more processors, an orchestration layer configured to orchestrate a plurality of AI agents, wherein each AI agent individually performs at least a subset of: (i) determining the plurality of search queries, (ii) applying at least the keyword search engine and the semantic search engine to process the plurality of search queries to obtain the plurality of search results, (iii) . . . using a different set of tuned parameters for the plurality of search engines.

Example 38. The computer-implemented method of example 37, wherein the orchestration layer chooses an AI agent among the plurality of AI agents to generate the search response by analyzing the initial input.

Example 39. The computer-implemented method of example 38, wherein the plurality of AI agents comprises a scheduling agent, a conversational agent, a recommendation agent, a coverage checking agent, a patient support agent, a doctor finding agent, a pharmacy finding agent, and a discussion guide agent.

Example 40. The computer-implemented method of examples 1 through 39, further comprising: displaying, by the one or more processors, the search response in a chat interface, wherein the chat interface includes a chat history of the user.

Example 41. The computer-implemented method of example 40, wherein the chat history is current chat history data of a user in current chat session.

Example 42. The computer-implemented method of example 40-41, further comprising: applying at least the keyword search engine and the semantic search engine further includes applying at least the keyword search engine and the semantic search engine to process the plurality of search queries and the chat history to obtain the plurality of search results.

Example 43. The computer-implemented method of example 42, further comprising: applying the large language model further includes applying the large language model to the ranked plurality of search results and the chat history to generate the search response.

Example 44. The computer-implemented method of example 1 through 43, after receiving the initial input and before determining the plurality of search queries, further comprising: applying, by the one or more processors, a preprocessing engine to the initial input and a chat history to determine a user intent of the initial input, wherein the preprocessing engine comprises a user interaction prompt template that utilizes the large language model to determine the user intent, wherein determining the plurality of search queries further comprises determining, by applying a search transformer to the user intent and the chat history to determine the plurality of search queries, wherein the search transformer is based on a search query prompt template that utilizes the large language model to determine the plurality of search queries, wherein ranking the plurality of search results further comprises ranking the plurality of search results based on a relevance ranking prompt template utilizing at least the chat history, wherein generating the search response further comprises generating, by applying a response selection prompt template to the user intent, the chat history, and the ranked plurality of search results to determine the search response, wherein the response selection prompt template utilizes the large language model to determine the search response.

Example 45. The computer-implemented method of any of examples 1 through 44, further comprising: receiving, by the one or more processors, the initial input via an electronic mail message transmitted from a user device to a designated electronic mail address; parsing, by the one or more processors, the electronic mail message to extract the initial input from a message body of the electronic mail message; and transmitting, by the one or more processors, the search response as a reply electronic mail message to the user device.

Example 46. The computer-implemented method of example 45, further comprising: detecting, by the one or more processors, a subsequent electronic mail message from the user device in response to the reply electronic mail message; extracting, by the one or more processors, a follow-up query from the subsequent electronic mail message; storing, by the one or more processors, the initial input, the search response, and the follow-up query in a conversation thread data structure that associates the electronic mail messages as a linked sequence of communications; and determining, by applying the large language model to the conversation thread and a second ranked plurality of search results corresponding to the follow-up query, a second search response transmitted as a second reply electronic mail message.

Example 47. The computer-implemented method of any of examples 1 through 46, further comprising: receiving, by the one or more processors, the initial input via a short message service (SMS) message transmitted from a mobile device; parsing, by the one or more processors, the SMS message to extract the initial input; and transmitting, by the one or more processors, the search response as a reply SMS message to the mobile device.

Example 48. The computer-implemented method of example 47, further comprising: detecting, by the one or more processors, medical terminology or abbreviations within the SMS message; applying, by the one or more processors, a medical terminology normalization engine to convert the detected medical terminology or abbreviations into standardized terms; and determining, by applying at least the keyword search transformer and the semantic search transformer to the standardized terms, the plurality of search queries.

Example 49. The computer-implemented method of example 47, further comprising: detecting, by the one or more processors, a misspelling within the SMS message by comparing terms in the SMS message against a medical terminology dictionary; applying, by the one or more processors, a spelling correction engine to generate a corrected term based on the detected misspelling; and determining, by applying at least the keyword search transformer and the semantic search transformer to the corrected term, the plurality of search queries.

Example 50. The computer-implemented method of example 47, further comprising: storing, by the one or more processors, each SMS message of a plurality of SMS messages transmitted by the mobile device in a conversation thread data structure that associates the SMS messages with a unique session identifier; applying, by the one or more processors, the large language model to the conversation thread data structure and the ranked plurality of search results to determine the search response; and determining, by the one or more processors, a follow-up SMS message based on analyzing the conversation thread data structure to identify a user characteristic; determining, based on the user characteristic and a predefined set of characteristic-specific information triggers, that additional information relevant to the user characteristic has not yet been requested by the user; and transmitting, by the one or more processors, the follow-up SMS message to the mobile device in advance of a subsequent user query, wherein the follow-up SMS message includes the additional information determined to be relevant to the user characteristic.

Example 51. The computer-implemented method of any of examples 1 through 50, further comprising: establishing, by the one or more processors, a communication interface with a customer relationship management (CRM) system via an application programming interface (API) to transmit a user identifier and receive, in response, user profile data associated with the user; determining, by applying the large language model to the ranked plurality of search results, the initial input, and the user profile data retrieved from the CRM system, the search response, wherein the search response is personalized based on the user profile data; and wherein determining the search response further comprises tailoring the search response to provide contextually relevant information based on prior interactions of the user, preferences, or characteristics stored in the CRM system.

Example 52. The computer-implemented method of any of examples 1 through 51, further comprising: determining, by the one or more processors, that the initial input corresponds to a high-intent action based on analyzing the initial input against a predefined set of high-intent action indicators; and in response to determining that the initial input corresponds to the high-intent action, executing, by the one or more processors, a high-intent workflow, wherein executing the high-intent workflow comprises: evaluating a communication modality associated with the initial input and constraints of the communication modality, determining, based on the constraints of the communication modality, whether the communication modality supports a high-intent dataset corresponding with the high-intent action, in response to determining that the communication modality does not support the high-intent dataset, generating a uniform resource locator (URL) that encodes a session identifier associated with the initial input and routes the user to a web application configured to present the high-intent dataset while preserving conversation context associated with the session identifier, and transmitting, by the one or more processors, the URL to the user as part of the search response.

Example 53. The computer-implemented method of any of examples 1 through 52, wherein determining the search response further comprises: constraining, by the one or more processors, the large language model to determine the search response based exclusively on the ranked plurality of search results derived from pre-approved data Example 54. A computer system for improving generation of a search response, the computer system comprising: one or more processors; and a non-transitory program memory coupled to the one or more processors and storing executable instructions that, when executed by the one or more processors, causes the computer system to perform operations comprising: receiving an initial input from a user through one of a plurality of communication modalities; determining, by applying at least a keyword search transformer and a semantic search transformer to the initial input, a plurality of search queries; applying at least a keyword search engine and a semantic search engine corresponding to the keyword search transformer and the semantic search transformer to process the plurality of search queries to obtain a plurality of search results, wherein each search engine has differently tuned parameters to output a search score for a search result; ranking the plurality of search results based on their respective search scores; and determining, by applying a large language model to the ranked plurality of search results and the initial input, a search response for transmission through the one of the plurality of communication modalities, wherein the keyword search engine and the semantic search engine operate independently from the large language model.

Example 55. The computer system of example 54, wherein the executable instructions, when executed by the one or more processors, cause the computer system to perform operations comprising: receiving, by the one or more processors, the initial input via an electronic mail message transmitted from a user device to a designated electronic mail address; parsing, by the one or more processors, the electronic mail message to extract the initial input from a message body of the electronic mail message; and transmitting, by the one or more processors, the search response as a reply electronic mail message to the user device.

Example 56. The computer system of example 55, wherein the executable instructions, when executed by the one or more processors, cause the computer system to perform operations comprising: detecting, by the one or more processors, a subsequent electronic mail message from the user device in response to the reply electronic mail message; extracting, by the one or more processors, a follow-up query from the subsequent electronic mail message; storing, by the one or more processors, the initial input, the search response, and the follow-up query in a conversation thread data structure that associates the electronic mail messages as a linked sequence of communications; and determining, by applying the large language model to the conversation thread and a second ranked plurality of search results corresponding to the follow-up query, a second search response transmitted as a second reply electronic mail message.

Example 57. The computer system of example 54, wherein the executable instructions, when executed by the one or more processors, cause the computer system to perform operations comprising: receiving, by the one or more processors, the initial input via a short message service (SMS) message transmitted from a mobile device; parsing, by the one or more processors, the SMS message to extract the initial input; and transmitting, by the one or more processors, the search response as a reply SMS message to the mobile device.

Example 58. The computer system of example 57, wherein the executable instructions, when executed by the one or more processors, cause the computer system to perform operations comprising: detecting, by the one or more processors, medical terminology or abbreviations within the SMS message; applying, by the one or more processors, a medical terminology normalization engine to convert the detected medical terminology or abbreviations into standardized terms; and determining, by applying at least the keyword search transformer and the semantic search transformer to the standardized terms, the plurality of search queries.

Example 59. The computer system of example 57, wherein the executable instructions, when executed by the one or more processors, cause the computer system to perform operations comprising: detecting, by the one or more processors, a misspelling within the SMS message by comparing terms in the SMS message against a medical terminology dictionary; applying, by the one or more processors, a spelling correction engine to generate a corrected term based on the detected misspelling; and determining, by applying at least the keyword search transformer and the semantic search transformer to the corrected term, the plurality of search queries.

Example 60. The computer system of example 57, wherein the executable instructions, when executed by the one or more processors, cause the computer system to perform operations comprising: storing, by the one or more processors, each SMS message of a plurality of SMS messages transmitted by a mobile device in a conversation thread data structure that associates the SMS messages with a unique session identifier; applying, by the one or more processors, the large language model to the conversation thread data structure and the ranked plurality of search results to determine the search response; and determining, by the one or more processors, a follow-up SMS message based on analyzing the conversation thread data structure to identify a user characteristic; determining, based on the user characteristic and a predefined set of characteristic-specific information triggers, that additional information relevant to the user characteristic has not yet been requested by the user; and transmitting, by the one or more processors, the follow-up SMS message to the mobile device in advance of a subsequent user query, wherein the follow-up SMS message includes the additional information determined to be relevant to the user characteristic.

Example 61. The computer system of example 54, wherein the executable instructions, when executed by the one or more processors, cause the computer system to perform operations comprising: establishing, by the one or more processors, a communication interface with a customer relationship management (CRM) system via an application programming interface (API) to transmit a user identifier and receive, in response, user profile data associated with the user; determining, by applying the large language model to the ranked plurality of search results, the initial input, and the user profile data retrieved from the CRM system, the search response, wherein the search response is personalized based on the user profile data; and wherein determining the search response further comprises tailoring the search response to provide contextually relevant information based on prior interactions of the user, preferences, or characteristics stored in the CRM system.

Example 62. The computer system of example 54, wherein the executable instructions, when executed by the one or more processors, cause the computer system to perform operations comprising: determining, by the one or more processors, that the initial input corresponds to a high-intent action based on analyzing the initial input against a predefined set of high-intent action indicators; and in response to determining that the initial input corresponds to the high-intent action, executing, by the one or more processors, a high-intent workflow, wherein executing the high-intent workflow comprises: evaluating a communication modality associated with the initial input and constraints of the communication modality, determining, based on the constraints of the communication modality, whether the communication modality supports a high-intent dataset corresponding with the high-intent action, in response to determining that the communication modality does not support the high-intent dataset, generating a uniform resource locator (URL) that encodes a session identifier associated with the initial input and routes the user to a web application configured to present the high-intent dataset while preserving conversation context associated with the session identifier, and transmitting, by the one or more processors, the URL to the user as part of the search response.

Example 63. A tangible, non-transitory computer-readable medium storing executable instructions for improving generation of a search response, the executable instructions, when executed by one or more processors of a computer system, cause the computer system to perform operations comprising: receiving an initial input from a user through one of a plurality of communication modalities; determining, by applying at least a keyword search transformer and a semantic search transformer to the initial input, a plurality of search queries; applying at least a keyword search engine and a semantic search engine corresponding to the keyword search transformer and the semantic search transformer to process the plurality of search queries to obtain a plurality of search results, wherein each search engine has differently tuned parameters to output a search score for a search result; ranking the plurality of search results based on their respective search scores; and determining, by applying a large language model to the ranked plurality of search results and the initial input, a search response for transmission through the one of the plurality of communication modalities, wherein the keyword search engine and the semantic search engine operate independently from the large language model.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for evaluating reliability of a response generated by a language model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for improving generation of a search response, the computer-implemented method comprising:

receiving, by one or more processors, an initial input from a user through one of a plurality of communication modalities;

receiving, by the one or more processors, the initial input via a short message service (SMS) message transmitted from a mobile device;

parsing, by the one or more processors, the SMS message to extract the initial input;

determining, by applying at least a keyword search transformer and a semantic search transformer to the initial input, a plurality of search queries;

applying, by the one or more processors, at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking, by the one or more processors, the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model; and transmitting, by the one or more processors, the search response as a reply SMS message to the mobile device.

2. The computer-implemented method of claim 1, further comprising:

detecting, by the one or more processors, medical terminology or abbreviations within the SMS message;

applying, by the one or more processors, a medical terminology normalization engine to convert the detected medical terminology or abbreviations into standardized terms; and determining, by applying at least the keyword search transformer and the semantic search transformer to the standardized terms, the plurality of search queries.

3. The computer-implemented method of claim 1, further comprising:

detecting, by the one or more processors, a misspelling within the SMS message by comparing terms in the SMS message against a medical terminology dictionary;

applying, by the one or more processors, a spelling correction engine to generate a corrected term based on the detected misspelling; and determining, by applying at least the keyword search transformer and the semantic search transformer to the corrected term, the plurality of search queries.

4. The computer-implemented method of claim 1, further comprising:

storing, by the one or more processors, each SMS message of a plurality of SMS messages transmitted by a mobile device in a conversation thread data structure that associates the SMS messages with a unique session identifier;

applying, by the one or more processors, the large language model to the conversation thread data structure and the ranked plurality of search results to determine the search response; and determining, by the one or more processors, a follow-up SMS message based on analyzing the conversation thread data structure to identify a user characteristic;

determining, based on the user characteristic and a predefined set of characteristic-specific information triggers, that additional information relevant to the user characteristic has not yet been requested by the user; and transmitting, by the one or more processors, the follow-up SMS message to the mobile device in advance of a subsequent user query, wherein the follow-up SMS message includes the additional information determined to be relevant to the user characteristic.

5. The computer-implemented method of claim 1, further comprising:

establishing, by the one or more processors, a communication interface with a customer relationship management (CRM) system via an application programming interface (API) to transmit a user identifier and receive, in response, user profile data associated with the user;

determining, by applying the large language model to the ranked plurality of search results, the initial input, and the user profile data retrieved from the CRM system, the search response, wherein the search response is personalized based on the user profile data; and wherein determining the search response further comprises tailoring the search response to provide contextually relevant information based on prior interactions of the user, preferences, or characteristics stored in the CRM system.

6. The computer-implemented method of claim 1, further comprising:

determining, by the one or more processors, that the initial input corresponds to a high-intent action based on analyzing the initial input against a predefined set of high-intent action indicators; and in response to determining that the initial input corresponds to the high-intent action, executing, by the one or more processors, a high-intent workflow, wherein executing the high-intent workflow comprises:

evaluating a communication modality associated with the initial input and constraints of the communication modality, determining, based on the constraints of the communication modality, whether the communication modality supports a high-intent dataset corresponding with the high-intent action, in response to determining that the communication modality does not support the high-intent dataset, generating a uniform resource locator (URL) that encodes a session identifier associated with the initial input and routes the user to a web application configured to present the high-intent dataset while preserving conversation context associated with the session identifier, and transmitting, by the one or more processors, the URL to the user as part of the search response.

7. The computer-implemented method of claim 1, wherein generating the search response further comprises:

constraining, by the one or more processors, the large language model to generate the search response based exclusively on the ranked plurality of search results derived from pre-approved data or content.

8. A computer system for improving generation of a search response, the computer system comprising:

one or more processors; and a non-transitory program memory coupled to the one or more processors and storing executable instructions that, when executed by the one or more processors, causes the computer system to perform operations comprising:

receiving an initial input from a user through one of a plurality of communication modalities;

receiving the initial input via a short message service (SMS) message transmitted from a mobile device;

parsing the SMS message to extract the initial input;

determining, by applying at least a keyword search transformer and a semantic search transformer to the initial input, a plurality of search queries;

applying at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model; and transmitting the search response as a reply SMS message to the mobile device.

9. The computer system of claim 8, wherein the executable instructions, when executed by the one or more processors, cause the computer system to perform operations comprising:

detecting, by the one or more processors, medical terminology or abbreviations within the SMS message;

applying, by the one or more processors, a medical terminology normalization engine to convert the detected medical terminology or abbreviations into standardized terms; and determining, by applying at least the keyword search transformer and the semantic search transformer to the standardized terms, the plurality of search queries.

10. The computer system of claim 8, wherein the executable instructions, when executed by the one or more processors, cause the computer system to perform operations comprising:

detecting, by the one or more processors, a misspelling within the SMS message by comparing terms in the SMS message against a medical terminology dictionary;

applying, by the one or more processors, a spelling correction engine to generate a corrected term based on the detected misspelling; and determining, by applying at least the keyword search transformer and the semantic search transformer to the corrected term, the plurality of search queries.

11. The computer system of claim 8, wherein the executable instructions, when executed by the one or more processors, cause the computer system to perform operations comprising:

storing, by the one or more processors, each SMS message of a plurality of SMS messages transmitted by a mobile device in a conversation thread data structure that associates the SMS messages with a unique session identifier;

applying, by the one or more processors, the large language model to the conversation thread data structure and the ranked plurality of search results to determine the search response;

determining, by the one or more processors, a follow-up SMS message based on analyzing the conversation thread data structure to identify a user characteristic;

determining, based on the user characteristic and a predefined set of characteristic-specific information triggers, that additional information relevant to the user characteristic has not yet been requested by the user; and transmitting, by the one or more processors, the follow-up SMS message to the mobile device in advance of a subsequent user query, wherein the follow-up SMS message includes the additional information determined to be relevant to the user characteristic.

12. The computer system of claim 8, wherein the executable instructions, when executed by the one or more processors, cause the computer system to perform operations comprising:

establishing, by the one or more processors, a communication interface with a customer relationship management (CRM) system via an application programming interface (API) to transmit a user identifier and receive, in response, user profile data associated with the user;

determining, by applying the large language model to the ranked plurality of search results, the initial input, and the user profile data retrieved from the CRM system, the search response, wherein the search response is personalized based on the user profile data; and wherein determining the search response further comprises tailoring the search response to provide contextually relevant information based on prior interactions of the user, preferences, or characteristics stored in the CRM system.

13. The computer system of claim 8, wherein the executable instructions, when executed by the one or more processors, cause the computer system to perform operations comprising:

determining, by the one or more processors, that the initial input corresponds to a high-intent action based on analyzing the initial input against a predefined set of high-intent action indicators; and in response to determining that the initial input corresponds to the high-intent action, executing, by the one or more processors, a high-intent workflow, wherein executing the high-intent workflow comprises:

evaluating a communication modality associated with the initial input and constraints of the communication modality, determining, based on the constraints of the communication modality, whether the communication modality supports a high-intent dataset corresponding with the high-intent action, in response to determining that the communication modality does not support the high-intent dataset, generating a uniform resource locator (URL) that encodes a session identifier associated with the initial input and routes the user to a web application configured to present the high-intent dataset while preserving conversation context associated with the session identifier, and transmitting, by the one or more processors, the URL to the user as part of the search response.

14. A tangible, non-transitory computer-readable medium storing executable instructions for improving generation of a search response, the executable instructions, when executed by one or more processors of a computer system, cause the computer system to perform operations comprising:

receiving an initial input from a user through one of a plurality of communication modalities;

receiving the initial input via a short message service (SMS) message transmitted from a mobile device;

parsing the SMS message to extract the initial input;

determining, by applying at least a keyword search transformer and a semantic search transformer to the initial input, a plurality of search queries;

applying at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model; and transmitting the search response as a reply SMS message to the mobile device.

15. A computer-implemented method for improving generation of a search response, the computer-implemented method comprising:

receiving, by one or more processors, an initial input from a user through one of a plurality of communication modalities;

receiving, by the one or more processors, the initial input via an electronic mail message transmitted from a user device to a designated electronic mail address;

parsing, by the one or more processors, the electronic mail message to extract the initial input from a message body of the electronic mail message;

determining, by applying at least a keyword search transformer and a semantic search transformer to the initial input, a plurality of search queries;

applying, by the one or more processors, at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking, by the one or more processors, the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model;

transmitting, by the one or more processors, the search response as a reply electronic mail message to the user device;

detecting, by the one or more processors, a subsequent electronic mail message from the user device in response to the reply electronic mail message;

extracting, by the one or more processors, a follow-up query from the subsequent electronic mail message;

storing, by the one or more processors, the initial input, the search response, and the follow-up query in a conversation thread data structure that associates the electronic mail messages as a linked sequence of communications; and determining, by applying the large language model to the conversation thread and a second ranked plurality of search results corresponding to the follow-up query, a second search response transmitted as a second reply electronic mail message.

16. A computer system for improving generation of a search response, the computer system comprising:

one or more processors; and a non-transitory program memory coupled to the one or more processors and storing executable instructions that, when executed by the one or more processors, causes the computer system to perform operations comprising:

receiving an initial input from a user through one of a plurality of communication modalities;

receiving the initial input via an electronic mail message transmitted from a user device to a designated electronic mail address;

parsing the electronic mail message to extract the initial input from a message body of the electronic mail message;

determining, by applying at least a keyword search transformer and a semantic search transformer to the initial input, a plurality of search queries;

applying at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model;

transmitting the search response as a reply electronic mail message to the user device;

detecting a subsequent electronic mail message from the user device in response to the reply electronic mail message;

extracting a follow-up query from the subsequent electronic mail message;

storing the initial input, the search response, and the follow-up query in a conversation thread data structure that associates the electronic mail messages as a linked sequence of communications; and determining, by applying the large language model to the conversation thread and a second ranked plurality of search results corresponding to the follow-up query, a second search response transmitted as a second reply electronic mail message.

17. A tangible, non-transitory computer-readable medium storing executable instructions for improving generation of a search response, the executable instructions, when executed by one or more processors of a computer system, cause the computer system to perform operations comprising:

receiving, by one or more processors, an initial input from a user through one of a plurality of communication modalities;

receiving, by the one or more processors, the initial input via an electronic mail message transmitted from a user device to a designated electronic mail address;

parsing, by the one or more processors, the electronic mail message to extract the initial input from a message body of the electronic mail message;

determining, by applying at least a keyword search transformer and a semantic search transformer to the initial input, a plurality of search queries;

applying, by the one or more processors, at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking, by the one or more processors, the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model;

transmitting, by the one or more processors, the search response as a reply electronic mail message to the user device;

detecting, by the one or more processors, a subsequent electronic mail message from the user device in response to the reply electronic mail message;

extracting, by the one or more processors, a follow-up query from the subsequent electronic mail message;

storing, by the one or more processors, the initial input, the search response, and the follow-up query in a conversation thread data structure that associates the electronic mail messages as a linked sequence of communications; and determining, by applying the large language model to the conversation thread and a second ranked plurality of search results corresponding to the follow-up query, a second search response transmitted as a second reply electronic mail message.

18. A computer-implemented method for improving generation of a search response, the computer-implemented method comprising:

receiving, by one or more processors, an initial input from a user through one of a plurality of communication modalities;

determining, by applying at least a keyword search transformer and a semantic search transformer to the initial input, a plurality of search queries;

applying, by the one or more processors, at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking, by the one or more processors, the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model;

transmitting, by the one or more processors, the search response to a user device through the one of the plurality of communication modalities;

detecting, by the one or more processors, a subsequent message from the user device received through the one of the plurality of communication modalities;

extracting, by the one or more processors, a follow-up query from the subsequent message;

storing, by the one or more processors, the initial input, the search response, and the follow-up query in a conversation thread data structure that associates messages exchanged through the one of the plurality of communication modalities as a linked sequence of communications; and determining, by applying the large language model to the conversation thread data structure and a second ranked plurality of search results corresponding to the follow-up query, a second search response for transmission to the user device through the one of the plurality of communication modalities.

19. A computer system for improving generation of a search response, the computer system comprising:

one or more processors; and a non-transitory program memory coupled to the one or more processors and storing executable instructions that, when executed by the one or more processors, causes the computer system to perform operations comprising:

receiving an initial input from a user through one of a plurality of communication modalities;

determining, by applying at least a keyword search transformer and a semantic search transformer to the initial input, a plurality of search queries;

applying at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model;

transmitting the search response to a user device through the one of the plurality of communication modalities;

detecting a subsequent message from the user device received through the one of the plurality of communication modalities;

extracting a follow-up query from the subsequent message;

storing the initial input, the search response, and the follow-up query in a conversation thread data structure that associates messages exchanged through the one of the plurality of communication modalities as a linked sequence of communications; and determining, by applying the large language model to the conversation thread data structure and a second ranked plurality of search results corresponding to the follow-up query, a second search response for transmission to the user device through the one of the plurality of communication modalities.

20. A tangible, non-transitory computer-readable medium storing executable instructions for improving generation of a search response, the executable instructions, when executed by one or more processors of a computer system, cause the computer system to perform operations comprising:

receiving, by one or more processors, an initial input from a user through one of a plurality of communication modalities;

determining, by applying at least a keyword search transformer and a semantic search transformer to the initial input, a plurality of search queries;

applying, by the one or more processors, at least a keyword search engine and a semantic search engine corresponding to the keyword search transformer and the semantic search transformer to process the plurality of search queries to obtain a plurality of search results, wherein each search engine has differently tuned parameters to output a search score for a search result;

ranking, by the one or more processors, the plurality of search results based on their respective search scores;

determining, by applying a large language model to the ranked plurality of search results and the initial input, a search response for transmission through the one of the plurality of communication modalities, wherein the keyword search engine and the semantic search engine operate independently from the large language model;

transmitting, by the one or more processors, the search response to a user device through the one of the plurality of communication modalities;

detecting, by the one or more processors, a subsequent message from the user device received through the one of the plurality of communication modalities;

extracting, by the one or more processors, a follow-up query from the subsequent message;

storing, by the one or more processors, the initial input, the search response, and the follow-up query in a conversation thread data structure that associates messages exchanged through the one of the plurality of communication modalities as a linked sequence of communications; and determining, by applying the large language model to the conversation thread data structure and a second ranked plurality of search results corresponding to the follow-up query, a second search response for transmission to the user device through the one of the plurality of communication modalities.

* * * * *